(12) United States Patent
Ding et al.

(10) Patent No.: US 7,531,620 B2
(45) Date of Patent: May 12, 2009

(54) CROSS-LINKABLE HIGHLY FLUORINATED POLY(ARYLENE ETHERS) FOR OPTICAL WAVEGUIDE APPLICATIONS

(75) Inventors: Jianfu Ding, Ottawa (CA); Michael Day, Gloucester (CA); Tyler B. Norsten, Gatineau (CA); Yinghua Qi, Ottawa (CA); Claire L. Callender, Nepean (CA); Jia Jiang, Kanata (CA)

(73) Assignee: Her Majesty the Queen in Right et al., Ottawa (CA)

( * ) Notice: Subject to any disclaimer, the term of this patent is extended or adjusted under 35 U.S.C. 154(b) by 557 days.

(21) Appl. No.: 11/132,240

(22) Filed: May 19, 2005

(65) Prior Publication Data

US 2005/0288483 A1 Dec. 29, 2005

Related U.S. Application Data

(60) Provisional application No. 60/572,113, filed on May 19, 2004.

(51) Int. Cl.
*C08G 61/00* (2006.01)
*C08G 73/08* (2006.01)
*C08G 73/00* (2006.01)

(52) U.S. Cl. ............ 528/401; 528/397; 528/425; 528/486

(58) Field of Classification Search ........... 528/401, 528/486, 397, 425
See application file for complete search history.

(56) References Cited

U.S. PATENT DOCUMENTS

| | | | |
|---|---|---|---|
| 6,136,929 | A | 10/2000 | Han et al. |
| 6,801,703 | B2 | 10/2004 | Gao et al. |
| 2002/0057882 | A1 | 5/2002 | Kim et al. |

FOREIGN PATENT DOCUMENTS

| | | |
|---|---|---|
| WO | WO03/099902 A1 | 12/2003 |
| WO | WO03/099907 A1 | 12/2003 |

OTHER PUBLICATIONS

Y.H. Min et al., "Polymeric 16 × 16 Arrayed-Waveguide Grating Router Using Fluorinated Polyethers Operating Around 1550 nm", *IEEE J. Selected Topics in Quantum Electronics*, vol. 7, No. 5, Sep./Oct. 2001, pp. 806-811.
Smit et al., "PHASAR-based WDM-Devices: Principles, Design and Applications", *IEEE J. Selected Topics in Quant. Electronics*, vol. 2, No. 2, Jun. 1996, pp. 236-250.
Eldada, "Advances in Telecom and Datacom Opitcal Components", Society of Photo-Optical Instrumentation Engineers, Jul. 2001, Optical Engineering, vol. 40, No. 7, pp. 1165-1178.
Ma et al., "Polymer-Based Optical Waveguides: Materials, Processing, and Devices", *Advanced Materials*, 2002, vol. 14, No. 19, pp. 1339-1365.
Blythe et al., "Polymeric materials for Devices in Optical Fibre Systems", *Polymers for Advanced Technologies*, 2000, vol. 11, pp. 601-611.
Zhou, "Low-loss Polymeric Materials for Passive Waveguide Components in Fiber Optical Communications", *Society of Photo-Opitcal Instrumentation Engineers*, Jul. 2002, Optical Engineering, vol. 41, No. 7, pp. 1631-1643.
Liang et al., "Low Loss, Low Refractive Index Fluorinated Self-Crosslinking Polymer Waveguides for Optical Applications", *Optical Materials*, 9, 1998, pp. 230-235.
Pitois et al., "Low-Loss Passive Optical Waveguides Based on Photosensitive Poly(pentafluorostyrene-co-glycidyl methacrylate)", *Macromolecules*, 1999, vol. 32, No. 9, pp. 2903-2909.
Badarau et al., "Synthesis and Optical Properties of Thermally and Photchemically Cross-Linkable Diacetylene-Containting Polymers", *Macromolecules*, 2004, vol. 37, No. 1, pp. 147-153.
Ando et al., "Perfluorinated Polyimide Synthesis", *Macromolecules*, 1992, vol. 25, No. 21, pp. 5858-5860.
Choi et al., "Synthesis and Polymerization of Trifluorovinylether-terminated Imide Oligomers", *Polymer*, 2000, vol. 41, pp. 6213-6221.
Kang et al., "A Hyperbranched Aromatic Fluoropolyester for Photonic Applications", *Macromolecules*, 2003, vol. 36, No. 12, pp. 4355-4359.
Wong et al., "Highly Fluorinated Trifluorovinyl Aryl Ether Monomers and Perfluorocyclobutane Aromatic Ether Polymers for Optical Waveguide Applications", *Macromolecules*, 2003, vol. 36, No. 21, pp. 8001-8007.

Jöhnck et al., "Copolymers of Halogenated Acrylates and Methacrylates for the Application in Optical Telecommunication: Optical Properties, Thermal Analysis and Determination of Unsaturation by Quantitative FT-Raman and FT-IR Spectroscopy", *European. Polymer Journal*. 2000, vol. 36, pp. 1251-1264.
Smith et al., "Perfluorocyclobutyl Copolymers for Microphotonics", *Advanced Materials*, 2002, vol. 14, No. 21, pp. 1585-1589.
Song et al., "Novel Photocurable Multifunctional Acrylate Monomers Containing Perfluorinated Aromatic Units and Their Copolymers for Photonic Applications", *Journal of Polymer Science: Part A: Polymer Chemistry*, 2004, vol. 42, pp. 6375-6383.
Lee et al., "Crosslinkable Fluorinated Poly(arylene ethers) Bearing Phenyl Ethynyl Moiety for Low-Loss Polymer Optical Waveguide Devices", *Journal Polymer Science: Part A: Polymer Chemistry*, 1998, vol. 36, pp. 2881-2887.
Lee et al., "Crosslinkable Polymers for Optical Waveguide Devices. II. Fluorinated Ether Ketone Oligomers Bearing Ethynyl Group at the Chain End", *Journal Polymer Science: Part A: Polymer Chemistry*, 1999, vol. 37, pp. 2355-2361.
Kim et al., "Fluorinated Poly(arylene ether sulfide) for Polymeric Optical Waveguide Devices", *Macromolecules*, 2001, vol. 34, No. 22, pp. 7817-7821.
Kim et al., "Fluorinated Poly(arylene ether sulfone)s for Polymeric Optical Waveguide Devices", *Polymer*, 2003, vol. 44, pp. 4189-4195.
Qi et al., "Cross-Linkable Highly Fluorinated Poly(arylene ether ketones/sulfones) for Optical Waveguiding Applications", *Chemistry Materials*, 2005, vol. 17, No. 3, pp. 676-682.
Ding et al., "Highly Fluorinated Poly(arylene ether ketone) Prepared by a CaH$_2$-Mediated Polycondensation Reaction",*Macromolecular Chemistry and Physics*, 2004, vol. 205, pp. 1070-1079.
Ding et al., "Fluorinated poly(arylene ether ketone)s Bearing Pentafluorostyrene Moietes Prepared by a Modified Polycondensation", *Journal Polymer Science: Part A: Polymer Chemistry*, 2002, vol. 40, pp. 4205-4216.
Liu et al., "Preparation of Highly Fluorinated Poly(ether sulfone)s under Mild Polycondensation Conditions Using Molecular Sieves", *Macromolecular Rapid Communications*, 2002, vol. 23, No. 14, pp. 844-848.
Labadie et al., "Perfluoroalkylene-Activated Poly(aryl ether) Synthesis", *Macromolecules*, 1990, vol. 23, No. 26, pp. 5371-5373.
Attwood et al., "Kinetic Investigation of the Synthesis of a Polyethersulphone", *Br. Polym. J.*, 1972, pp. 391-399.
Chung et al., "Meta-Activated Nucleophilic Aromatic Substitution Reaction: Poly(biphenylene oxide)s with Trifluoromethyl Pendent Groups via Nitro Displacement", *J. Am. Chem. Soc.*, 2001, vol. 123, No. 44, pp. 11071-11072.
James L. Hedrick, "Poly(aryl ether amides)" *Macromolecules*, 1991, vol. 24, No. 3, pp. 812-813.
Mercer et al., "Synthesis and Characterization of Fluorinated Aryl Ethers Prepared from Decafluorobiphenyl", *Journal of Polymer Science: Part A: Polymer Chemistry*, 1992, vol. 30, pp. 1767-1770.
Goodwin et al., "Thermal Behavior of Fluorinated Aromatic Polyethers and Poly(ether ketone)s", *Macromolecules*, 1997, vol. 30, No. 9, pp. 2767-2774.
Mercer et al., "Synthesis and Characterization of Fluorinated Polyetherketones Prepared from Decafluorobenzophenone", *Polymer*, 1997, vol. 38, No. 8, pp. 1989-1995.
Hoffmann et al., "Poly(ether ketone)s by Fluoride Catalyst Systems", *Macromolecules*, 1994, vol. 27, No. 13, pp. 3575-3579.
Kricheldorf et al., "Macrocycles. 18. The Role of Cyclization in Syntheses of Poly(ether-sulfone)s", *Macromolecules*, 2001, vol. 34, No. 26, pp. 8886-8893.
Attwood et al., "Poly(arylene ether sulphones) by Polyetherification: 2. Polycondensations", *Polymer*, 1977, vol. 18, April, pp. 359-364.
Imai et al., "Cesium Fluoride-mediated Synthesis of Aromatic Polysulfides from Aromatic Dithiols and Activated Aromatic Dihalides", *Macromolecular Chemistry Physics*, 1999, vol. 200, No. 1, pp. 95-99.
Imai et al., "A Facile Cesium Fluoride-Mediated Synthesis of Aromatic Polyethers from Bisphenols and Activated Aromatic Dihalides", *J. Polym. Sci. Part A: Polym. Chem.*, 1997, vol. 35, pp. 2055-2061.
Keil et al., "Athermal all-polymer arrayed-waveguide grating multiplexer", *Electronics Letters*, 2001, vol. 37, No. 9, pp. 579-580.
Sakaguchi et al., "Fluorinated polyimide for low-loss optical waveguides at 1.55 μm", *Proceedings of SPIE*, vol. 4653, 2002, pp. 36-44.

*Primary Examiner*—Duc Truong
(74) *Attorney, Agent, or Firm*—David Conn; Borden Ladner Gervais LLP

(57) ABSTRACT

The invention relates to compounds of formula I:

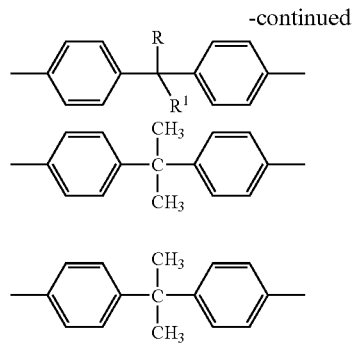
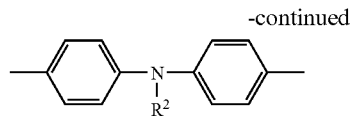
$x+y+z=1$ and $x=0$ to 1, $y=0$ to 1, $z=0$ to 1 and R is $CH_3$ or $CF_3$ and $R^1$ and $R^2$ each represent H or a functional group. These compounds show promise in films and as optical waveguide materials as well as bimodal interference coupler and arrayed waveguide grating demultiplexer materials.
34 Claims, 23 Drawing Sheets

(a) (b)

10μm

CROSS-LINKABLE HIGHLY FLUORINATED POLY(ARYLENE ETHERS) FOR OPTICAL WAVEGUIDE APPLICATIONS

CROSS REFERENCE TO RELATED APPLICATIONS

The present application claims the benefit of priority of U.S. Patent Application Ser. No. 60/572,113, filed on May 19, 2004, which is incorporated herein by reference.

BACKGROUND OF THE INVENTION

Currently, communications based on electronics are being pushed to their limits due to ever-increasing demand for information processing and data transmission, and communications based on photonics are being intensely developed due to their high bandwidth and resultant extremely large information capacity. Limitations, however, exist with the photonic communications in terms of the high cost of critical waveguide devices such as modulators, switches, optical interconnects and splitters that are predominantly based on inorganic materials (e.g., silica, lithium niobate, and III-V semiconductors). The difficulties in processing and integrating these inorganic materials also limit the extensive application of wavelength multiplexing and demultiplexing. Therefore, innovations in novel passive waveguide materials that are cost effective, excellent in optical performances (e.g., high optical transparency, low birefringence, good material stability), readily processable, and can enable the integration with very scale semiconductor are being actively pursued.

Organic polymers represent promising candidates for waveguide devices[1], due to their good processability, inexpensive mass production, and structure-property tunability. Various highly deuterated and halogenated polymers containing the minimum amount of absorptive bonds such as C—H, O—H, and N—H were established and their excellent waveguiding properties were studied[2-5]. However, for practical device applications, challenges still remain in developing polymers that have excellent comprehensive material properties such as good transparency and small birefringence, controlled refractive index, good thin-film forming ability, good material stability (birefringence relaxation and chemical and mechanical stability), and easy processability. Therefore, polymers with high glass transition temperatures and ability to cross-link either thermally or photochemically are highly desirable.

Poly(arylene ethers) which are well known high-performance polymers used in a wide range of demanding applications from aerospace to microelectronics, are characterized by their excellent thermal, mechanical and environmental stabilities, In addition, due to the existence of flexible ether linkages in the backbone, these polymers commonly have a low birefringence.[3e,5] Because of these attractive properties, attention has been drawn to the highly fluorinated poly (arylene ethers) as optical waveguide materials.[6,7] However, their application into photonic devices is limited. One of the reasons for this could come from the difficulties in obtaining structurally well-defined polymers using the traditional polycondensation reactions between the highly active decafluorodiphenyl monomers (i.e., decafluorodiphenyl ketone (DFPK) or decafluorodiphenyl sulfone (DFPSf)) and bisphenol compounds. To explore the potential of these types of polymers in waveguide applications, Ding et al. recently established an efficient synthetic method to the highly fluorinated, high molecular weight, linear fluorinated poly(arylene ether ketones) and poly(arylene ether sulfones) (FPAEKs and FPAESs). All the polymers showed good processability, high glass transition temperature, low optical loss at 1550 nm, and small birefringence.[8,9] Encouraged by these studies, we have developed a systematic approach to the preparation of highly fluorinated FPAEKs and FPAESs waveguide materials that involves the introduction of cross-linking functionality and the fine-tuning of refractive indices of the polymers by the use of cross-linkable tetrafluorostyrol groups as pendant groups and bromo groups into polymer structure.

SUMMARY OF THE INVENTION

According to the present invention there is provided a compound of formula I:

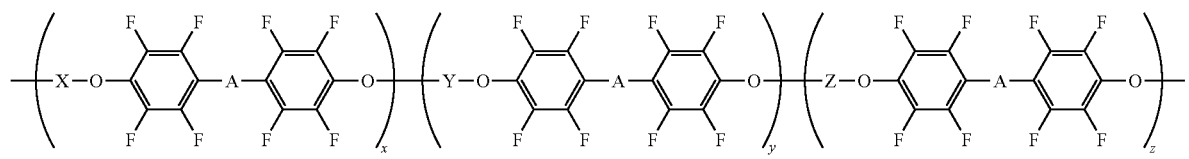

wherein

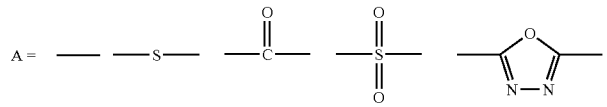

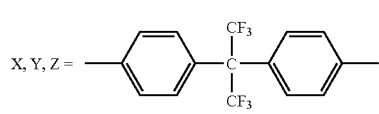
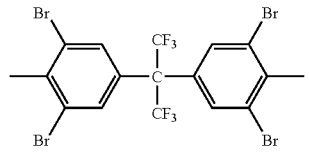
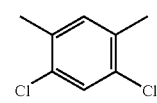

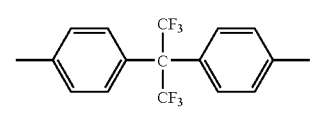
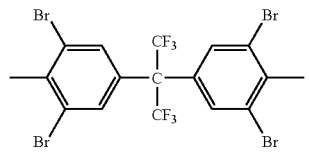

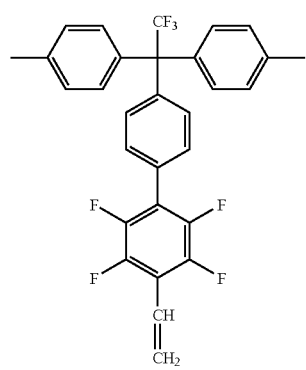

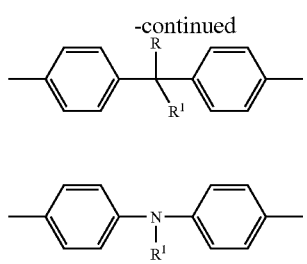

$x+y+z=1$ and $x=0$ to 1, $y=0$ to 1, $z=0$ to 1 and R is $CH_3$ or $CF_3$ and $R^1$ and $R^2$ each represent a functional group.

Among preferred embodiments of the invention there are:

(a) compounds of the invention in which A is selected from

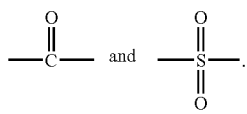

(b) compounds of the invention in which X, Y or Z is

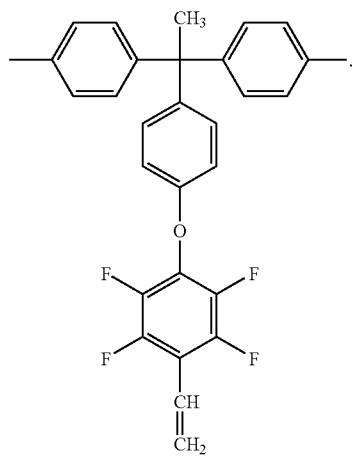

(c) compounds of the invention in which X, Y or Z is selected from the group consisting of

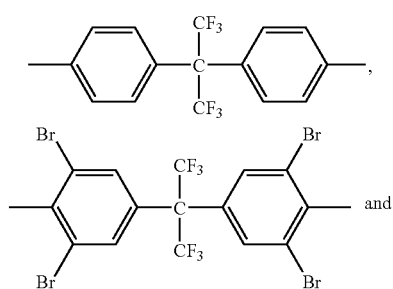

(d) compounds of the invention in which X, Y and Z are selected from the group consisting of

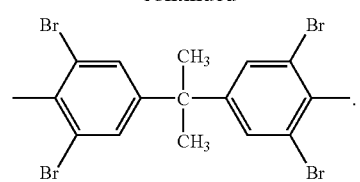

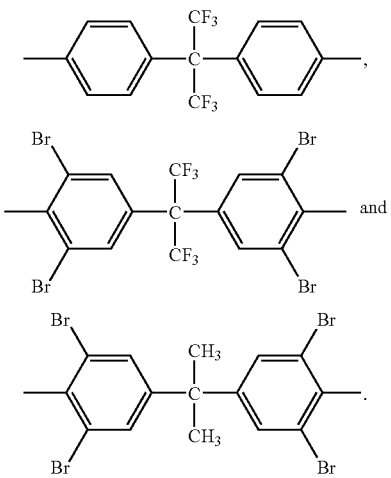

(e) compounds of the invention in which at least one of X, Y and Z is other than

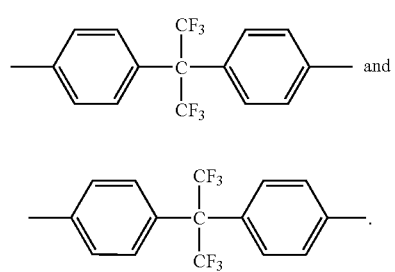

(f) compounds of the invention in which $R^1$ and $R^2$ each represent a functional group selected from the group consisting of a non-linear optical dye, an ionic polymer chain, etc.

(g) compounds of the invention in which the number average molecular weight is between 4,000 and 50,000, preferably between 10,000 and 45,000, more preferably between 15,000 and 45,000, especially between 20,000 and 42,000 or between 30,000 and 50,000.

The compound can be cross-linkable or cross-linked.

According to another aspect of the invention there is provided a process for preparing a compound of formula I:

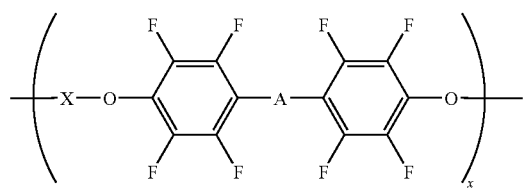

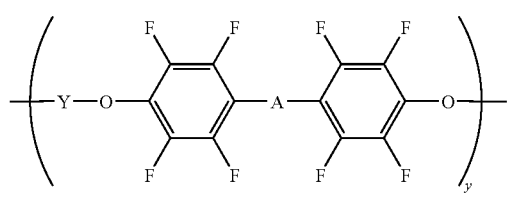

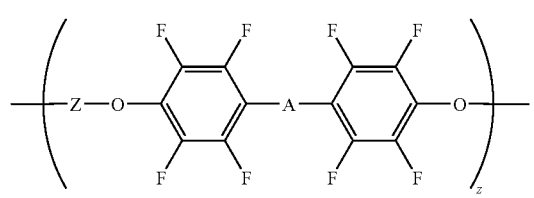

wherein

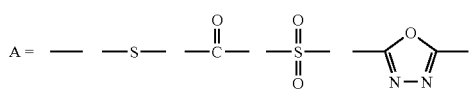

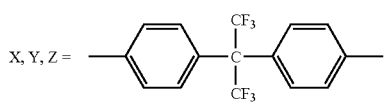

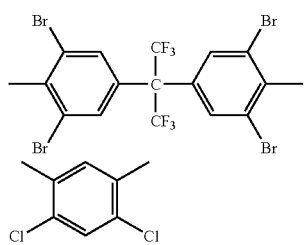

-continued

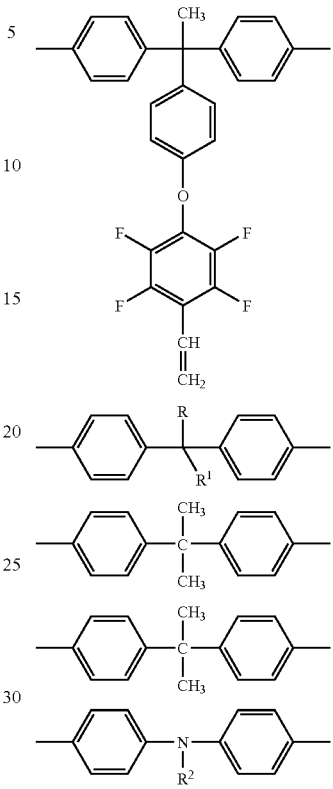

$x+y+z=1$ and $x=0$ to 1, $y=0$ to 1, $z=0$ to 1 and R is $CH_3$ or $CF_3$ and $R^1$ and $R^2$ each represent a functional group, which process comprises reacting at least one bisphenol compound of the formulae HO—X—OH, HO—Y—OH and HO-Z-OH with a decafluorodiphenyl-compound of the formula

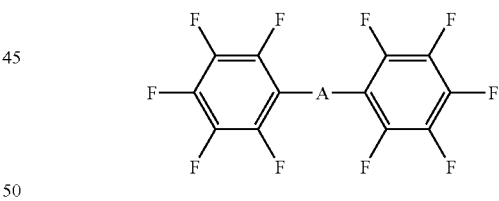

wherein X, Y, Z and A are as defined above in the presence of an alkali metal fluoride or alkali metal carbonate and an aprotic solvent at a temperature of about 20 to 120° C.

Preferably in the process the molar ratio of the reactants (bisphenols/decafluorodiphenyl compounds) is always less than 1 and is preferably in the range of about 0.9 to 1 especially 0.99 to 1 for obtaining products with reasonably high molecular weights.

When potassium fluoride is used as a catalyst the typical amount used is around 2.05 to 3.0 equivalents. If potassium fluoride is used in conjunction with $CaH_2$ then only a trace amount of potassium fluoride (0.05 to 0.2 equivalents) is needed in conjunction with (usually) more than 2.0 (preferably about 3.0) equivalents of $CaH_2$.

Scheme 1. The general reaction scheme for the preparation of Fluorinated poly(arylene ethers) with multiple functionalities

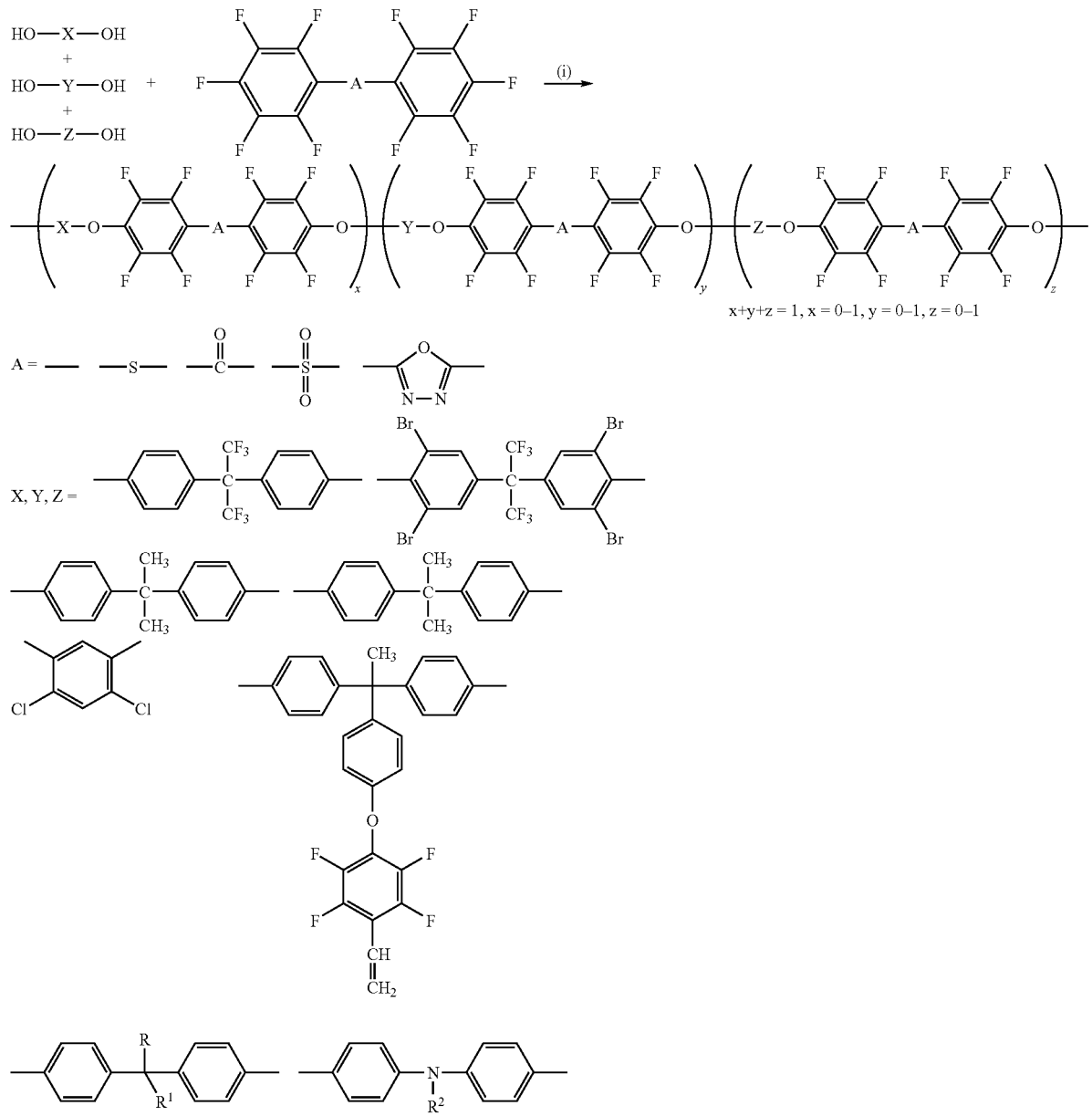

R=CH₃ or CF₃, R¹, R²=functional units including non-linear optical dye, ionic polymer and so on.

(i) Catalyst: two catalyst systems are applied, one is the alkali metal fluoride, or alkali metal carbonate, in an amount larger than 2.05 eq. (relative to bisphenol). 2.5 eq. are preferred. The other is a mixture of alkali metal fluoride, or alkali metal carbonate (>0.05 eq.) and CaH₂ (>2.0 eq.).

Solvent: The solvent is DMAc, other aprotic solvents include DMF, DMSO, NMP, THF, etc are good for the polymerization.

Temperature: The reaction was conducted at a temperature in a range between 20 and 120° C. based on the reactivity of the monomers.

The reaction conditions for the preparation of the polymers as shown in the Scheme 1 in general have been extensively studied. For example, the polycondensation of decafluorodiphenyl sulfone (DFPSf) has been studied by reacting with hexafluorobisphenol A (6F-BPA) for the preparation of fluorinated poly(arylene ether sulfone) (FPAES). For kinetic study, DFPSf was also reacted with a model compound, 4-phenoxylphenol (POPOH). DFPSf displayed a very high reactivity in N,N-dimethylacetamide (DMAc), where the reaction was found to occur at 22° C. even without the use of any catalyst. This reaction is promoted by the addition of a trace amount (0.04 eq related to phenol group) of potassium fluoride (KF) as a catalyst into the solution. Increasing the amount of KF to 1.05 eq enhanced the conversion and the reaction was completed in a short time. In this regarding, KF also played as a base to neutralize HF that was produced from the reaction so that the equilibrium of the condensation was removed. Using calcium hydride (CaH$_2$) to replace KF as a base in this reaction offered a similar effect, but with a slight lower reaction speed, thus a higher temperature (35° C.) is required. The function of KF in this reaction can be replaced by the other alkali metal fluorides and alkali metal carbonates including RbF, CsF, K$_2$CO$_3$, Rb$_2$CO$_3$ and Cs$_2$CO$_3$, which offer a similar or higher reactivity than KF. Applying this reaction to other decafluorodiphenyl monomers such as decafluorodiphenyl ketone (DFPK), decafluorodiphenyl oxadiazole (DFPOx), etc. with the bisphenols will produce other fluorinated polymers (FPAEK, FPAEOx, etc.).

Many functionalities such as crosslinking capability has been introduced into the polymers by copolymerisation as demonstrated in the above Scheme 1, where crosslinking capability of the polymers has been achieved by introducing tetrafluorostyrene moieties into the polymers using the following two methods.

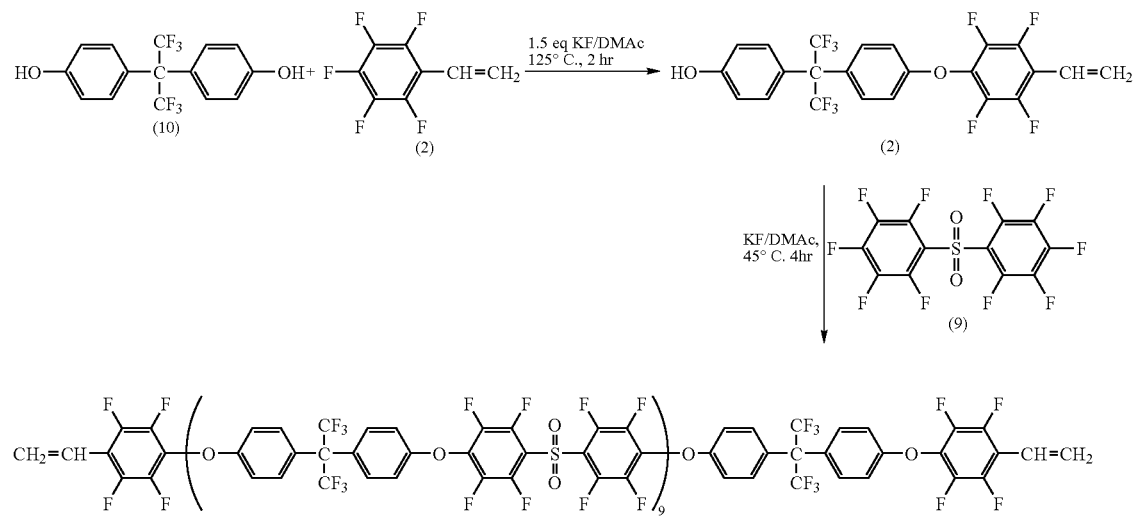

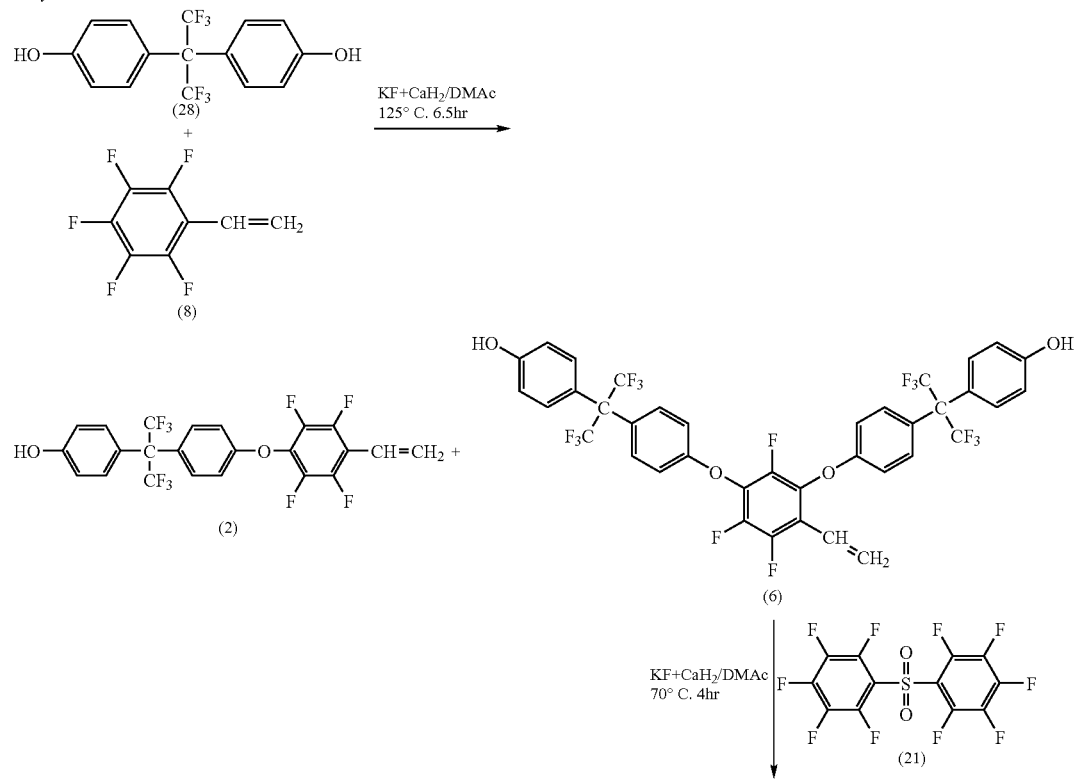

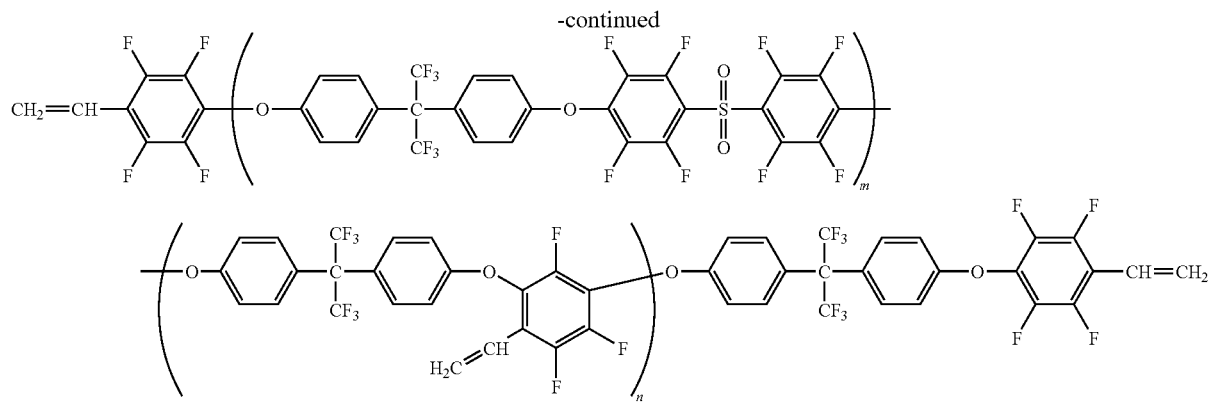

The first approach (direct method) is demonstrated in the Scheme 2, where pentafluorostyrene (FSt) reacted with an excess of 6F–BPA using KF or KF+CaH$_2$ as catalysts at a high temperature (100° C. or 125° C.) to form mono-substituted compound or a mixture of mono- and di-substituted compounds respectively. The formed mixture further reacted with DFPSf to produce a polymer containing a cross-linkable FSt moiety at the chain end, or both at the chain end and inside the chain respectively. The latter offers an opportunity to adjust the molecular weight and the content of FSt independently, so that high molecular weight polymers with high FSt content are possible. In all above reactions, the cross-linked film of this polymer demonstrated an excellent processability and performance for the waveguide application with a refractive index of 1.5061 (TE) and 1.5038 (TM) at 1537 nm.

In second approach (indirect method), the crosslinkable tetrafluorostyrene moiety has been attached to a bisphenol compound to form a tetrafluorostyrol-containing bisphenol, (i.e., 1,1-bis(4-hydroxyphenyl)ethyl-1-phenyl 2,3,5,6-tetrafluorostyrol ether). Then the cross-linkable, highly fluorinated poly(arylene ethers)s have been prepared by copoly-condensation reactions of decafluorodiphenyl compounds with a mixture of 4,4'-(hexafluoroisopropylidene)diphenol and the tetrafluorostyrol-containing bisphenol as illustrated in Scheme 4, at low temperature in the presence of calcium hydride and cesium fluoride. These polymers had a number-average molecular weight in the range of 17,000-36,000, excellent solubility in common organic solvents, high glass transition temperatures of 150-206° C., and good thermal stability (up to 480° C.). Tough, flexible, and transparent thin films of these polymers can be readily prepared by both solution-casting and spin-coating. A dual-mode cross-linking of these polymers has been demonstrated by both thermal heating and UV irradiation. The cross-linked polymer thin films exhibited a low optical loss of ~0.5 dB/cm at 1550 nm and an increased glass transition temperatures. A fine-tuning of refractive index has been achieved through either adjusting the feed ratio of monomers or the introduction of tetrabromo-bisphenols into the polymer structures as demonstrated in Scheme 5. A linear dependence of the refractive indices of polymers on the bromo content was revealed; and the refractive indices of polymers can be tuned in a range of 0.07 without impairing the optical transparency at 1550 nm. These polymers are promising candidates for both core and cladding materials in the waveguiding applications.

Furthermore, other functionalities such as tuneable refractive indices and non-linear optical properties have also been introduced into the polymers by the copolymerisation of such comonomers containing such functional groups with the examples demonstrated in Scheme 1.

Techniques for patterning optical waveguide structures in thin films of the polymers have been developed. These are based either on standard photolithography techniques and reactive ion etching (RIE), or on direct photo-crosslinking of the polymers through a photomask and subsequent removal of unexposed regions by a suitable solvent/etchant. Examples of photonic devices operating on the principle of control of the phase of the propagating light have been designed, fabricated and characterized.

DETAILED DESCRIPTION OF THE INVENTION

Figure 1:
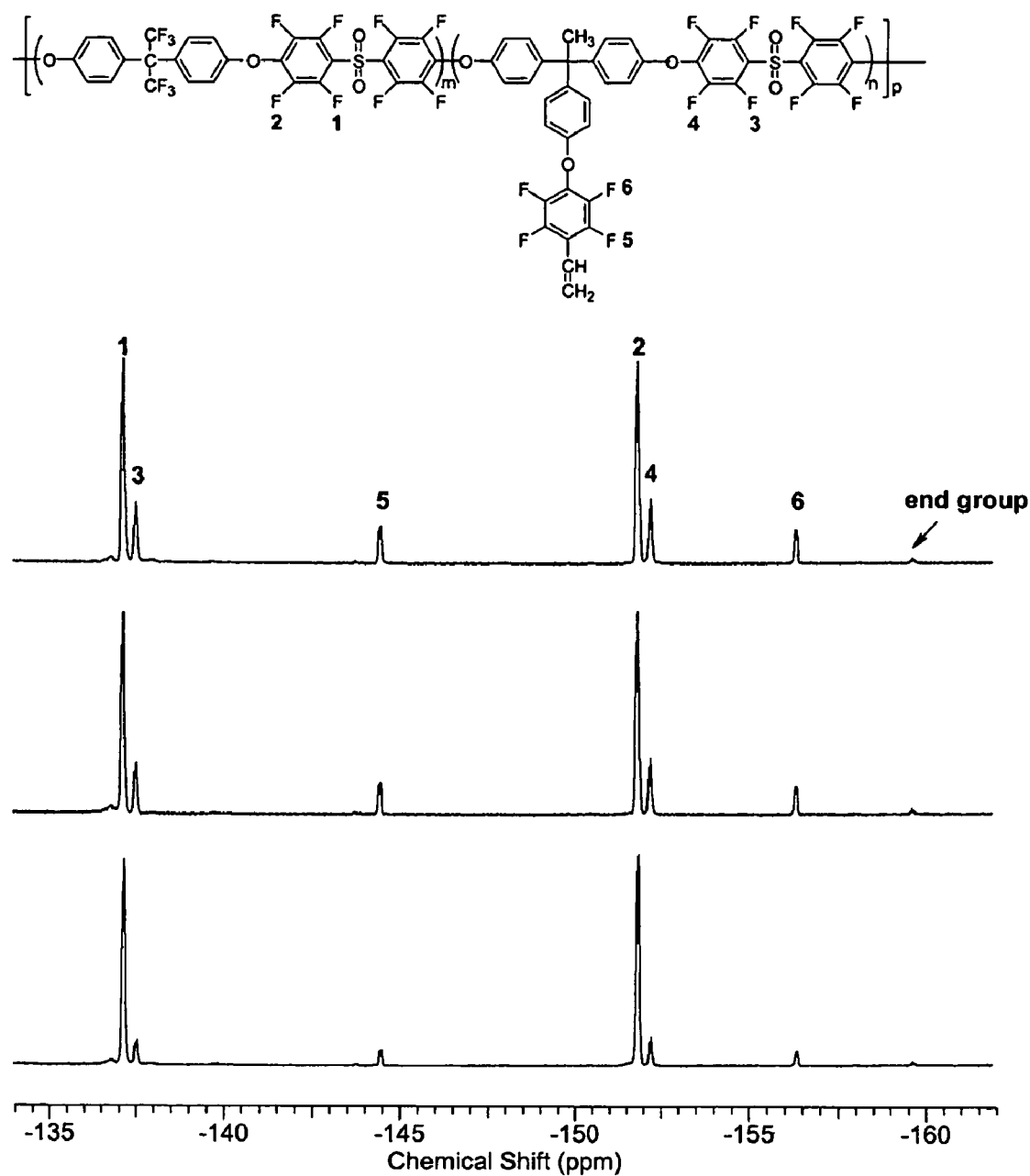
FIG. 1 shows $^{19}$F NMR spectra of cross-linkable fluorinated polyarylene ether sulfones of the invention (FPAES 1-3 (from bottom to top)).

A series of cross-linkable fluorinated poly(arylene ethers) with good solubility, good film-forming ability, high glass transition temperatures, small birefringence, and good optical transparency at 1550 nm were designed and prepared. Both thermal and photo cross-linking reactions have been applied to the spin-coated thin films from these materials to yield films with high chemical resistance and increased glass transition temperatures. Well-defined photo-patterns were achieved using an appropriate photo acid generator. The C—Br bonds were introduced into the polymer structures for tuning the refractive index while sustaining a good optical transparency at telecommunication wavelengths. By varying the bromo content in the polymers, the refractive index of the bromo-fluorinated polymers can be adjusted and controlled over a wide range of 0.07. Therefore, optical waveguide devices including straight waveguides and arrayed waveguide grating (AWG) were fabricated using the bromofluorinated polymers as the core and the non-brominated fluorinated polymers as the cladding. The optical measurement showed that the straight waveguides produced using these materials had low propagation losses of the order of 0.8 dB/cm at 1550 nm. Some other functionalities such as non-linear optical properties have also been introduced into the polymers by the copolymerisation of the relevant comonomers containing such functional groups with the examples demonstrated in Scheme 1.

EXAMPLES

Materials. 4,4'-(Hexafluoroisopropylidene)diphenol (6F-BPA) and 4,4'-isopropylidenebis(2,6-dibromophenol) (4Br-BPA) were purified by recrystallization from toluene. Decafluorodiphenyl ketone was purified by recrystallization from isopropanol. Decafluorodiphenyl sulfone was prepared according to the literature methods.[10] All other chemicals were purchased from Sigma-Aldrich Chemicals and used as received.

Measurements. Nuclear magnetic resonance (NMR) spectra were recorded using a Varian Unity Inova spectrometer at a resonance frequency of 400 MHz for $^1$H, and 376 MHz for $^{19}$F. The chemical shifts relative to tetramethylsilane for $^1$H NMR and CFCl$_3$ for $^{19}$F NMR as internal reference are reported in the ppm scale. Molecular weights of polymers were determined by gel permeation chromatography (GPC) using a Waters 515 HPLC pump, coupled with a Waters 410 differential refractometer detector and a Waters 996 photodiode array detector at a wavelength of 260 nm. IR spectra were collected using a MIDAC FT-IR spectrometer (Model, M1200-SP3) with a resolution of 2 cm$^{-1}$. Thermogravimetric analyses (TGA) and differential scanning calorimetry (DSC) were performed on TA Instruments TGA 2950 and DSC 2920 respectively, at a heating rate of 10° C./min under nitrogen. Photo cross-linking of polymer films was performed using Hanovia Analytic Model UV Lamp with a 310-400 nm filter. Mass spectrometry was carried out by the University of Ottawa Regional Mass Spectrometry Center. Melting point was performed on a Mettler FP1 and is uncorrected. SEM was performed on a JEOL JSM-840A, JEOL 35 CF scanning electron microscopes. Refractive indices at 1537 nm were measured by a prism coupling set-up with an uncertainty of 0.0004. Optical losses of the polymers were measured at 1550 nm on slab waveguide samples using the technique of high index liquid immersion.[11] The propagation losses of straight waveguides at 1550 nm were measured using the cut-back method.

Example 1

Cross-Linkable Bisphenol (BHPFS)

It is well known that introduction of fluorinated groups is an efficient way to increase the optical transparency of polymers in the near infrared telecommunication windows.[3-5] Therefore, highly fluorinated polymers that contain the minimal amount of C—H and O—H bonds are under intense development for their potential applications in waveguide devices. In order to improve the materials' stabilities such as chemical and mechanical stabilities, the polymers are designed to contain either thermally or photochemically reactive groups that can undergo intermolecular reactions under external stimuli to form cross-linked polymer networks. To introduce cross-linking functionality into highly fluorinated PAEKs and PAESs, a fluorinated bisphenol monomer containing a tetrafluorostyrol unit (BHPFS) was designed and prepared via a nucleophilic substitution of 1,1,1-tris(4-hydroxyphenyl)ethane with pentafluorostyrene (Scheme 3). Although the di-substitution reaction and tri-substitution reactions were difficult to be excluded, pure BHPFS can be easily separated from the product mixture by column chromatography in a yield of 35%. The four fluorine atoms in BHPFS were expected to not only lower the optical loss at the telecommunication wavelengths, but also decrease the nucleophilicity of the vinyl moiety significantly due to its strongly electronegative character.[5a] Accordingly, the BHPFS was found to be quite stable to high temperature (e.g., <160° C.) and visible light, which allows the synthesis and purification of BHPFS and polymers derived from it to be carried out under normal reaction conditions. However, with the presence of a suitable initiator, BHPFS-based polymer films are sufficiently reactive to induce the cross-linking reaction of tetrafluorostyrol units when exposed to heat or UV light.[5a]

Synthesis of
1,1-Bis(4-hydroxyphenyl)ethyl-1-phenyl
2,3,5,6-tetrafluorostyrol ether (BHPFS)

To a round-bottomed flask charged with 1,1,1-tris(4-hydroxyphenyl)ethane (10.5 g, 0.034 mol), pentafluorostyrene (5.2 g, 0.027 mol) and DMAc (40 mL) was added calcium hydride (2.1 g, 0.05 mol) and cesium fluoride (0.20 g, 1.32 mmol). The resulting mixture solution was heated to 80° C. and stirred under argon in the dark for 18 h. After cooling to room temperature, a clear solution was separated by filtration, which was then added to hydrochloric acid aqueous solution (300 mL, 0.5 N) and extracted with diethyl ether (150 mL) three times. The ether phases were combined and washed with distilled water until neutral, dried over anhydrous magnesium sulfate, and rotaevaporated to give white powdered crude product. The column chromatograph (ethyl acetate/hexane, 1/3.5, v/v) through silica gel gave the pure product (4.5 g, 35% yield). M.p. 173° C. $^1$H NMR (400 MHz, Acetone-$d_6$): δ8.22 (1H, s); 7.09 (2H, m); 7.01 (2H, m); 6.90 (4H, m); 6.74 (5H, m); 6.09 (1H, d, J=18.4 Hz); 5.80 (1H, d, J=12.00 z); 2.09 (3H, s). $^{19}$F NMR (376 MHz, Acetone-$d_6$): δ−144.57 (2F, dd, J=9.1, 20.6 Hz); −156.36 (2F, dd, J=9.0, 20.6). MS (EI, m/z): 480 (M$^+$, 3.8%); 465 (M-CH$_3$, 100%).

Example 2

Cross-Linkable Fluorinated Polymers

Due to the activation effect of strong electron-withdrawing ketone and sulfone groups, both the para- and ortho-fluorines in the perfluorinated monomers (i.e. decafluorodiphenyl ketone and decafluorodiphenyl sulfone) have shown high reactivity with bisphenols under traditional high-temperature polycondensation reaction conditions. To avoid serious branching or cross-linking reactions that have been observed in several polymer syntheses using traditional polymerization conditions, the polymerization of BHPFS and 6F-BPA with perfluorinated monomers were carried out under a very mild reaction condition established in our group (Scheme 4). This reaction condition involves the use of cesium fluoride and calcium hydride as the catalyst and the base respectively, which have been found to facilitate the formation of the phenolate and enable the polymerization to be performed at a low temperature such as 60° C. This new polymerization condition has been shown to be superior to the traditional high temperature method since it essentially prevents the formation of branched or cross-linked structures associated with reactions taking place at the ortho positions of perfluorinated monomers.

The polymerization reactions were monitored by GPC and were found to be complete in 3 h, producing reasonable high molecular weight polymers with low polydispersities. Table 1 illustrates the synthesis and properties of FPAEK 1-3 and FPAES 1-3 that have different amount of cross-linker BHPFS (from 12.4 to 25.0 mol % relative to the total bisphenols in polymers). The number average molecular weight and polydispersity of polymers ranged from 25,000 to 35,000 and 2.6 to 4.6 respectively. The polymer structures were confirmed by $^1$H NMR and $^{19}$F NMR and were found to be in a good agreement with the feed ratio of bisphenol monomers (FIG. 1). On detailed examination of the $^{19}$F NMR spectra, it was observed that besides the six major peaks that were assigned as shown in FIG. 1, three other small peaks were present. On the basis of previous study, these peaks can be assigned to the three fluorine atoms associated with the phenyl sulfone end groups. No obvious signal related to branching of the polymer chains was observable from the $^{19}$F NMR spectra. In the $^1$H NMR spectra, three resonances at 6.73, 6.08 and 5.78 ppm were observed, attributable to the protons on the vinyl moiety of tetrafluorostyrol groups. No other aliphatic resonance could be found, indicating that the tetrafluorostyrol unit was stable to the polymerization conditions and was successfully introduced into fluorinated polymers.

Figure 2:
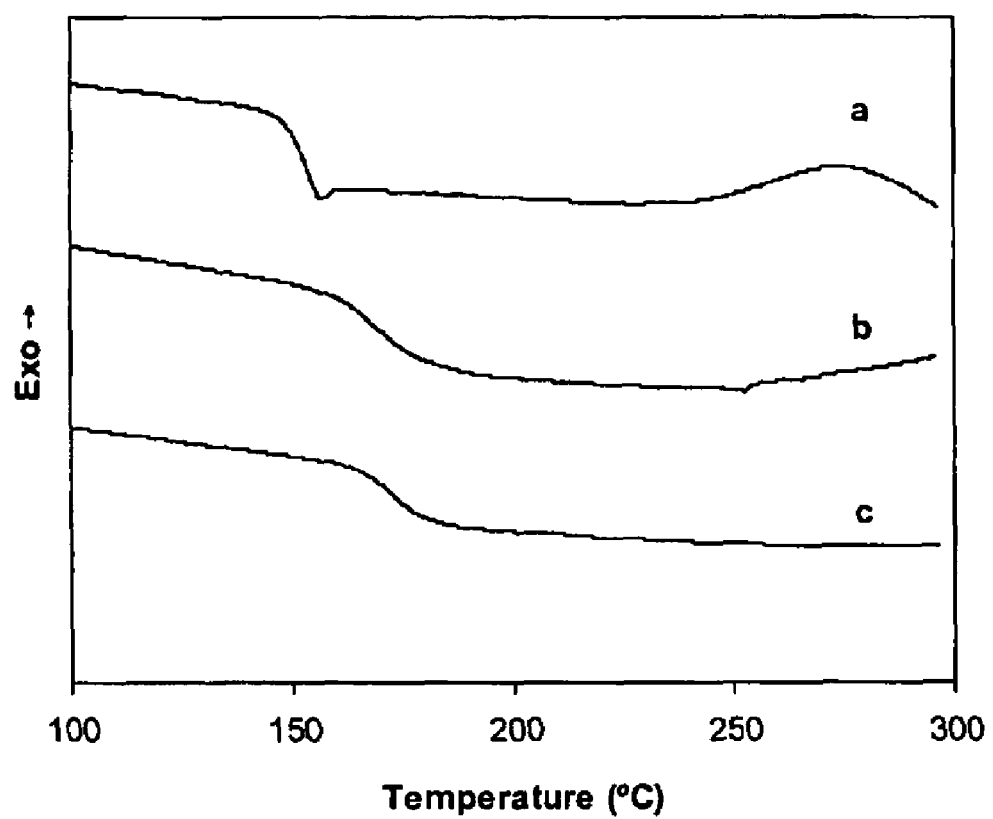
FIG. 2 shows differential scanning calorimetry of a fluorinated polyarylene ether ketone (FPAEK 2) of the invention (a) before cross-linking; (b) after photo cross-linking for 20 min with the presence of 5 wt. % of 2-(4-methoxystyryl)-4,6-bis(trichloromethyl)1,3,5-triazine using UV light with a wavelength of 310-400 nm; (c) after thermal curing at 180° C. for 60 min with 1 wt. % of dicumyl peroxide.

All the polymers were determined to be amorphous by wide-angle X-ray crystallography and DSC. The TGA measurements indicated that these polymers had very high thermal stability as assessed by the temperature of 5% weight loss (e.g., up to 480° C. in nitrogen). A high glass transition temperature ($T_g$) was observed for these polymers by DSC analysis. In the case of the cross-linkable FPAEKs, the $T_g$ was around 153° C. (FIG. 2a), while FPAESs showed a $T_g$ of around 184° C. All the polymers exhibited an exothermic transition around 270° C. on DSC heating flow, which is associated with the thermal cross-linking reactions of tetrafluorostyrol group. The concentration of BHPFS in the polymers appeared to have no effect on $T_g$ and thermal stability. All the polymers had very good solubility in common organic solvents such as acetone, THF, DMAc and dichloromethane and were able to form tough, flexible and transparent films by both casting technique and spin-coating techniques.

Synthesis of Cross-Linkable Fluorinated PAEKs
(FPAEK 1-3)

A typical synthetic procedure of FPAEK 3 is given as follows: To a solution of decafluorodiphenyl ketone (1.1051 g, 3.05 mmol), 6F-BPA (0.7648 g, 2.30 mmol) and BHPFS (0.3643 g, 0.75 mmol) in anhydrous DMAc (18 mL) were added cesium fluoride (0.03 g, 0.20 mmol) and calcium hydride (0.30 g, 7.14 mmol). The mixture solution was stirred at 60° C. under argon in dark for 3 h. After filtration to remove insoluble inorganic salts, the solution was added dropwise into a mixture of methanol (200 ml) and hydrochloric acid (8 mL, 2N). The resulting white precipitate was collected by filtration, washed thoroughly with methanol, and dried at room temperature under vacuum (0.1 mmHg) (1.85 g, 88% yield). FTIR (NaCl, cm$^{-1}$): 1690 (C=O); 1647, 1606 (C=C). $^1$H NMR (400 MHz, Acetone-$d_6$): δ7.48 (12H, d, J=8.8 Hz); 7.34 (12H, d, J=8.8 Hz); 7.09 (12H, m); 6.72 (1H, dd, J=18.0 Hz, 12.0 Hz); 6.07 (1H, d, J=18.0 Hz); 5.78 (1H, d, J=12.0 Hz); 2.08 (3H, s). $^{19}$F NMR (376 MHz, Acetone-d$_6$): δ−63.60 (18F, s); −142.33 (12F, m); −142.56 (4F, m); −144.64 (2F, m); −153.24 (12F, m); −153.56 (4F, m); −156.53 (2F, m).

FPAEK 1: 85% yield. FTIR (NaCl, cm$^{-1}$): 1690 (C=O); 1647, 1606 (C=C). $^1$H NMR (400 MHz, Acetone-d$_6$,): δ7.47 (28H, d, J=8.8 Hz); 7.34 (28H, d, J=8.8 Hz); 7.08 (12H, m); 6.73 (1H, dd, J=18.0 Hz, 12.0 Hz); 6.08 (1H, d, J=18.0 Hz); 5.78 (1H, d, J=12.0 Hz). $^{19}$F NMR (376 MHz, Acetone-d$_6$): δ−63.61 (42F, s); −142.34 (28F, m); −142.59 (4F, m); −144.63 (2F, m); −153.24 (28F, m); −153.58 (4F, m); −156.53 (2F, m).

FPAEK 2: 86% yield. FTIR (NaCl, cm$^{-1}$): 1690 (C=O); 1647, 1605 (C=C). $^1$H NMR (400 MHz, Acetone-d$_6$,): δ7.46 (16H, d, J=8.8 Hz); 7.33 (16H, d, J=8.8 Hz); 7.09 (12H, m); 6.72 (1H, dd, J=20.0 Hz, 12.0 Hz); 6.08 (1H, d, J=18.0 Hz); 5.79 (1H, d, J=12.0 Hz). $^{19}$F NMR (376 MHz, Acetone-d$_6$): δ−63.61 (24F, s); −142.37 (16F, m); −142.66 (4F, m); −144.63 (2F, m); −153.26 (16F, m); −153.58 (4F, m); −156.54 (2F, m).

Synthesis of Cross-Linkable Fluorinated PAESs (FPAES 1-3)

A typical synthetic procedure of FPAES 3 is given as follows: To a solution of decafluorodiphenyl sulfone (1.3895 g, 3.49 mmol), 6F-BPA (0.8823 g, 2.63 mmol) and BHPFS (0.4160 g, 0.86 mmol) in anhydrous DMAc (28 mL) were added cesium fluoride (0.04 g, 0.26 mmol) and calcium hydride (0.35 g, 8.33 mmol). The mixture solution was stirred under argon at 55° C. in dark for 3 h. After filtration to remove insoluble inorganic salts, the solution was added dropwise into a mixture of methanol (200 mL) and hydrochloric acid (8 mL, 2 N). The resulting white precipitate was collected by filtration, washed thoroughly with methanol, and dried at room temperature under vacuum (0.1 mmHg) (2.09 g, 82% yield). FTIR (NaCl, cm$^{-1}$): 1637, 1604 (C=C); 1389, 1297 (O=S=O). $^1$H NMR (400 MHz, Acetone-d$_6$,): δ7.47 (12H, d, J=8.8 Hz); 7.33 (12H, d, J=8.8 Hz); 7.09 (12H, m); 6.73 (1H, dd, J=17.7 Hz, 11.8 Hz); 6.08 (1H, d, J=18.0 Hz); 5.78 (1H, d, J=11.8 Hz); 2.09 (3H, s). $^{19}$F NMR (376 MHz, Acetone-d$_6$): δ−63.62 (18F, s); −137.18 (12F, m); −137.56 (4F, m); −144.53 (2F, m); −151.92 (12F, m); −152.29 (4F, m); −156.44 (2F, m).

FPAES 1: 83% yield. FTIR (NaCl, cm$^{-1}$): 1637, 1605 (C=C); 1389, 1297 (O=S=O). $^1$H NMR (400 MHz, Acetone-d$_6$,): δ7.47 (28H, d, J=8.8 Hz); 7.34 (28H, d, J=8.8 Hz); 7.08 (12H, m); 6.73 (1H, dd, J=18.0 Hz, 12.0 Hz); 6.08 (1H, d, J=16.0 Hz); 5.78 (1H, d, J=12.0 Hz). $^{19}$F NMR (376 MHz, Acetone-d$_6$): δ−63.61 (42F, s); −137.18 (28F, m); −137.56 (4F, m); −144.53 (2F, m); −151.92 (28F, m); −152.31 (4F, m); −156.44 (2F, m).

FPAES 2: 82% yield. FTIR (NaCl, cm$^{-1}$): 1637, 1604 (C=C); 1389, 1297 (O=S=O). $^1$H NMR (400 MHz, Acetone-d$_6$,): δ7.46 (16H, d, J=8.8 Hz); 7.33 (16H, d, J=8.8 Hz); 7.08 (12H, m); 6.72 (1H, dd, J=18.0 Hz, 12.0 Hz); 6.08 (1H, d, J=18.0 Hz); 5.79 (1H, d, J=12.0 Hz); 2.08 (3H, s). $^{19}$F NMR (376 MHz, Acetone-d$_6$): δ−63.62 (24F, s); −137.18 (16F, m); −137.56 (4F, m); −144.54 (2F, m); −151.94 (16F, m); −152.29 (4F, m); −156.46 (2F, m).

Fine Turning of the Refractive Index.

Solutions of cross-linkable fluorinated polymers and 2-(4-methoxystyryl)-4,6-bis(trichloromethyl)-1,3,5-triazine (photo acid generator, 5 wt. %, relative to the polymer) in cyclohexanone were filtered through a Teflon syringe filter (pore size of 0.2 µm) and spin-coated onto a silicon wafer. The films were dried at 50° C. for 4 h and then at 70° C. under vacuum for 12 h. Photo-patterning of the films was performed by exposing the films to the UV light through a mask for 20 min, followed by a post-baking at 140° C. for 1 min and development with tetrahydrofuran (20 s) and acetone (30 s).

Figure 4:
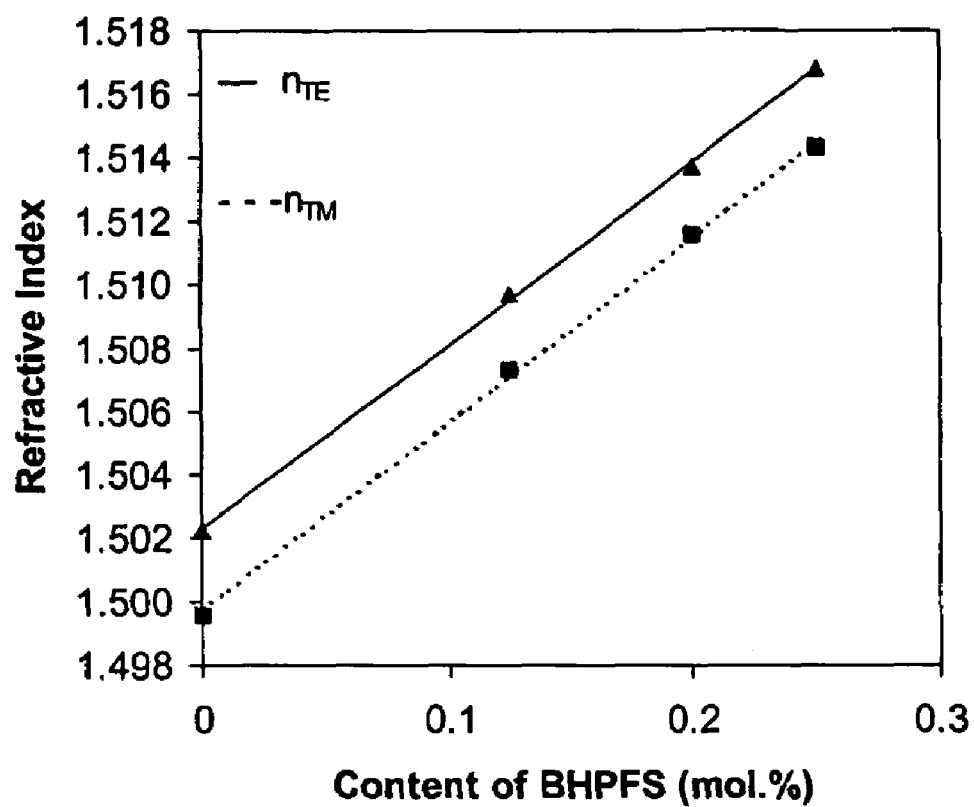
FIG. 4 shows the relationship of refractive index of FPAEKs and the content of 1,1-bis(4-hydroxyphenyl)ethyl-1-phenyl 2,3,5,6-tetrafluorostyrol ether (BHPFS).
Figure 6:
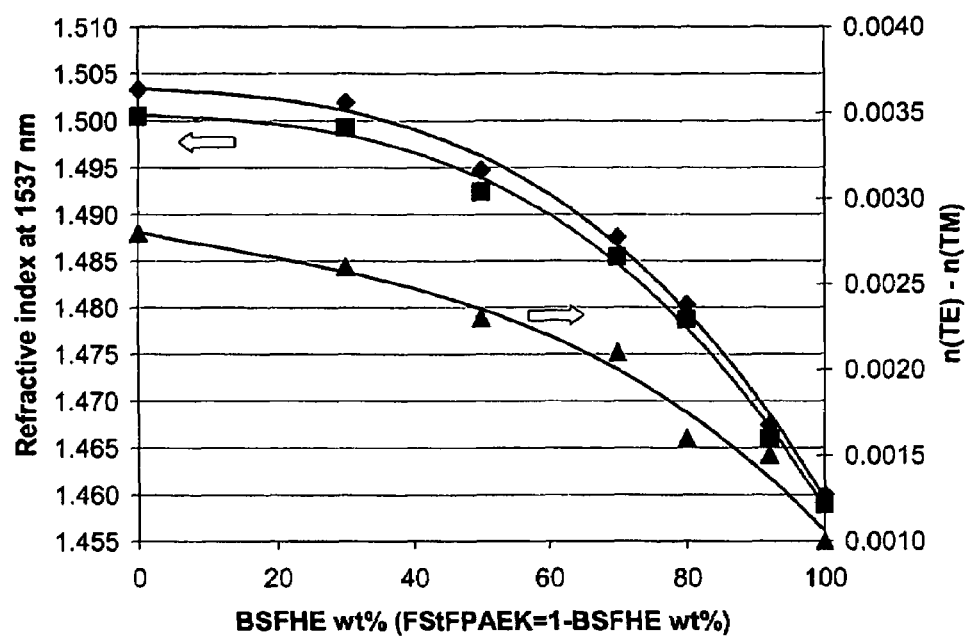
FIG. 6 shows the influence of BSFHE concentration in FPAEK/BSFHE mixtures on the refractive index and birefringence of co-polymerized films ($n_{TM}$, $n_{TE}$, $n_{TE}-n_{TM}$).

Controlled refractive indices (RI) of both n$_{TE}$ and n$_{TM}$ mode (TE represent transverse electric and TM represent transverse magnetic) are very important for optical waveguide materials. The refractive indices of cross-linkable FPAEK 1-3 and FPAES 1-3 were measured by the prism coupler method at 1537 nm on thin films. In order to compare their refractive index, all polymer films were processed with same procedure because refractive index reached a stable value after thermal curing at 200° C. for 2 hrs. These polymers showed relatively low refractive indices (Table 2) due to their high fluorine contents. A linear dependence of the refractive indices (both n$_{TE}$ and n$_{TM}$) of the polymers were revealed on the BHPFS content (see FIG. 4), representing a potential method for fine-tuning the refractive index of these polymers. In comparison between the two types of polymers, the FPAESs containing the more polar sulfone units showed higher refractive indices than the FPAEKs that have the same amount of BHPFS. For example, a difference of 0.003 in the refractive index was found between the n$_{TE}$ of FPAEK 1 (1.5097) and the n$_{TE}$ of FPAES 1 (1.5131). Birefringence indicates the optical anisotropy of a material. The birefringence of thermally cured FPAEKs and FPAESs, as characterized by the difference between the n$_{TE}$ and the n$_{TM}$, were found to be in the range of 2.1-2.5×10$^{-3}$, which are unaffected by the content of cross-linker (BHPFS) and are comparable to the birefringence reported for several fluorinated polyaryl ethers[3e,5,6]. Refractive index tuning was also achieved by mixing fluorinated styrene monomers containing aliphatic chains with the FPAEK polymers and co-polymerizing during thin film processing. An aliphatic monomer containing dual functional groups (BSFHE) was employed, acting as a cross-linker when co-polymerized with FPAEK or FPAES polymers. Consequently, a relatively soft segment in the rigid cross-linked networks is established. The resulting films on silicon substrates exhibited a good quality after complete curing. Using this method, the refractive index of FPAEK/BSFHE films could be adjusted over a range of 0.05, and the birefringence could be reduced to 1.6×10$^{-3}$ by the incorporation of 80 wt % BSFHE into the mixture. FPAEK and BSFHE show high miscibility and can be mixed at any percentage composition without phase separation (FIG. 6).

To evaluate the optical loss of these polymers at 1550 nm, the slab losses of FPAEK(S) 1 and 3 on silica substrate were measured in order to avoid extra optical loss induced by surface and sidewall roughness due to waveguide fabrication processes. Very low optical losses of 0.35-0.55 dB/cm were obtained (Table 2). A dependence of the optical loss on BHPFS contents was revealed for both FPAEKs and FPAESs (0.35 dB/cm for FPAEK 1 and 0.40 dB/cm for FPAEK 3; 0.50 dB/cm for FPAES 1 and 0.55 dB/cm for FPAES 3).

Thermal and Photo Cross-Linking.

The thermal cross-linking of FPAEK 1-3 and FPAES 1-3 was studied by heating the polymer films at either 160° C. in the presence of a free-radical initiator, dicumyl peroxide (1 wt. % relative to the polymers) or at 260° C. in the absence of any initiator for 1 hr. After the cross-linking, all the polymers showed an increase in T$_g$ by about 20° C. When the cured polymer films were soaked in acetone for 3 days, less than 1% weight losses were noticed, indicating the formation of highly cross-linked network and a good chemical resistance of these cured polymers.

Figure 3:
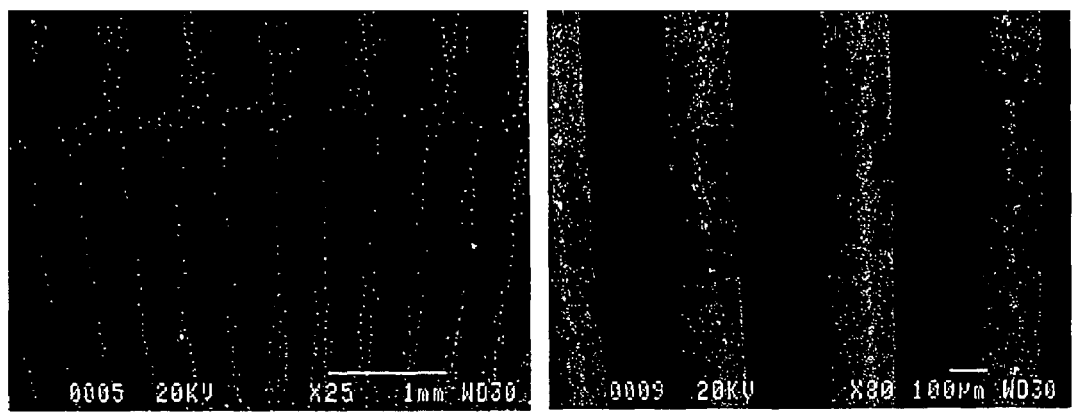
FIG. 3 shows the top views of the scanning electron micrograph (SEM) images obtained with FPAEK 3 thin film after UV irridiation through a mask for 20 min.
Figure 22:
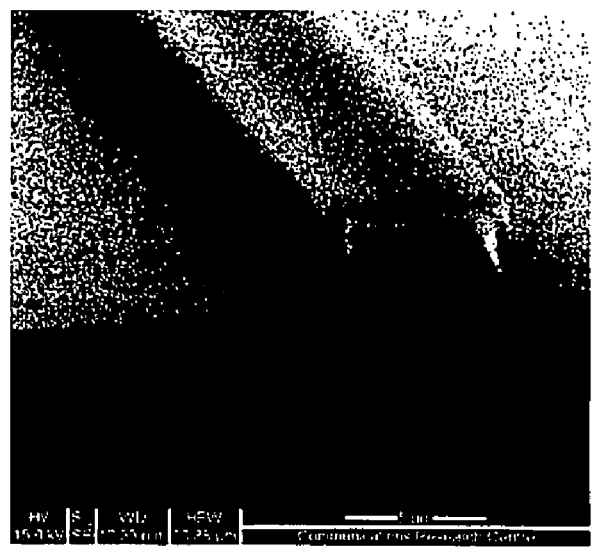
FIG. 22 shows a straight waveguide device fabricated using the UV photo patterning technique. The propagation loss measured by cut-back method is ~0.8 dB for the 8.0×4.5 μm$^2$ waveguide.

The photo cross-linking of FPAEK 1-3 and FPAES 1-3 was realized by exposing the polymer films containing photo acid generator (PAG) to the UV light of 310-400 nm. The use of this region of UV light for photo-irradiation is due to the strong absorption of polymers at wavelengths below 300 nm. A typical DSC curve of the photo cross-linked FPAEK 2 film with the presence of (4-phenylthiophenyl)diphenylsulfonium triflate as PAG is displayed in FIG. 2b. No exothermic transition associated with the thermal cross-linking reaction is obervable on the heating flow, comfirming the occurrence of photo cross-linking reactions. The increase of $T_g$ after photo irradiation for 20 min was found to be 13° C., which is less than the increases (~20° C.) observed in the cases of thermal cross-linking and indicates a moderate cross-linking degree. To be used in direct photolithography, the photo-patterning of the polymers' films was studied with 2-(4-methoxystyryl)-4, 6-bis(trichloromethyl)-1,3,5-triazine (MSTA) being used as the photo acid generator. The maximum absorption of MSTA is at 379 nm that is far away from the absorption region of polymers. Therefore, an efficient acid generation upon exposure of the polymer films to UV light can be realized. FIG. 3 shows the top views of the scanning electron micrograph (SEM) images obtained with FPAEK 3 thin film after UV irradiation through a mask for 20 min. The dark areas are covered with polymer. The resultant image shows a well-defined pattern. FIG. 22 shows that waveguide core with a well-defined structure can be indeed prepared by UV photolithography.

Example 3

Cross-Linkable Bromo-Fluorinated Polymers

Synthesis of Bromo-Containing Fluorinated FPAEK and FPAESs

A typical synthetic method of FPAEK-Br-1 was given as follows: To a solution of decafluorodiphenyl ketone (0.8777 g, 2.42 mmol), 6F-BPA (0.4064 g, 1.21 mmol) and 4Br-BPA (0.6610 g, 1.21 mmol) in anhydrous DMAc (15 mL) were added cesium fluoride (0.02 g, 0.13 mmol) and calcium hydride (0.20 g, 4.76 mmol). The mixture solution was stirred under argon at 70° C. for 4.5 h. After filtration to remove insoluble inorganic salts, the clear solution was added dropwise into a mixture of methanol (200 mL) and hydrochloric acid (8 mL, 2 N). The precipitated white product was collected by filtration, washed thoroughly with methanol three times, and dried at room temperature under vacuum (0.1 mmHg) (1.48 g, 80% yield). FTIR (NaCl, cm$^{-1}$): 1689, (C=O); 1647, 1606 (C=C). $^1$H NMR (400 MHz, Acetone-d$_6$): δ7.70 (4H, s); 7.48 (4H, d, J=8.8 Hz); 7.34 (4H, d, J=8.8 Hz). $^{19}$F NMR (376 MHz, Acetone-d$_6$): δ−63.53 (6F, s); −142.35 (8F, m); −153.08 (4F, m); −156.89 (4F, m).

Synthesis of Crosslinkable Bromo-Fluorinated PAEKs (BFPAEK 1-4)

A typical synthetic method of BFPAEK 1 was given as follows: To a solution of 4Br-BPA (0.1997 g, 0.367 mmol), 6F-BPA (0.2461 g, 0.732 mmol), BHPFS (0.1302 g, 0.271 mmol) and decafluorodiphenyl ketone (0.4987 g, 1.377 mmol) in 10 mL of anhydrous N,N-dimethylacetamide (DMAc) were added CsF (0.02 g, 0.13 mmol) and CaH$_2$ (0.20 g, 4.76 mmol). The mixture was stirred at 65° C. under argon for 4 h. After filtration to remove insoluble inorganic salts, the solution was added dropwise to a mixture of methanol (120 mL) and hydrochloric acid (6 mL, 2N). The resulting polymer was collected by filtration, washed thoroughly with water and methanol, and dried at room temperature under vacuum (0.1 mmHg) (0.80 g, 80% yield). IR (NaCl, cm$^{-1}$): 1689, 1648, 1606. $^1$H NMR (400 MHz, Acetone-d$_6$,): δ7.70 (5.4H, s), 7.48 (11H, d, J=8.8 Hz), 7.34 (11H, d, J=8.8 Hz), 7.08 (12H, m), 6.73 (1H, dd, J=18.0 Hz, 12.0 Hz), 6.08 (1H, d, J=18.0 Hz), 5.78 (1H, d, J=12.0 Hz), 1.82 (8H, s). $^{19}$F NMR (376 MHz, Acetone-d$_6$): δ−63.6 (16F, s), −142.5 (20F, m), −144.5 (2F, m), −153.2 (11F, m), −153.5 (4F, m), −156.5 (2F, m), −157.0 (5F, m).

BFPAEK 2: 81% yield. IR (NaCl, cm$^{-1}$): 1688, 1646, 1607. $^1$H NMR (400 MHz, Acetone-d$_6$,): δ7.70 (8H, s), 7.49 (8H, d, J=8.8 Hz), 7.35 (8H, d, J=8.8 Hz), 7.09 (12H, m), 6.74 (1H, dd, J=18.4 Hz, 12.0 Hz), 6.08 (1H, d, J=18.4 Hz), 5.78 (1H, d, J=12.0 Hz), 1.81 (12H, s). $^{19}$F NMR (376 MHz, Acetone-d$_6$): δ−63.6 (12F, s), −142.5 (20F, m), −144.6 (2F, m), −153.2 (8F, m), −153.5 (4F, m), −156.4 (2F, m), −157.0 (8F, m).

BFPAEK 3: 77% yield. IR (NaCl, cm$^{-1}$): 1688, 1646, 1607. $^1$H NMR (400 MHz, Acetone-d$_6$,): δ7.70 (11H, s), 7.48 (5.5H, d, J=8.8 Hz), 7.34 (5.5H, d, J=8.8 Hz), 7.10 (12H, m), 6.73 (1H, dd, J=18.0 Hz, 12.0 Hz), 6.08 (1H, d, J=18.0 Hz), 5.78 (1H, d, J=12.0 Hz), 1.80 (16H, s). $^{19}$F NMR (376 MHz, Acetone-d$_6$): δ−63.4 (8F, s), −142.4 (20F, m), −144.6 (2F, m), −153.2 (5F, m), −153.5 (4F, m), −156.5 (2F, m), −157.0 (11F, m).

BFPAEK 4: 75% yield. IR (NaCl, cm$^{-1}$): 1689, 1647, 1606. $^1$H NMR (400 MHz, Acetone-d$_6$,): δ7.68 (16H, s), 7.10 (12H, m), 6.72 (1H, dd, J=18.0 Hz, 12.0 Hz), 6.08 (1H, d, J=18.0 Hz), 5.78 (1H, d, J=12.0 Hz), 1.81 (24H, s). $^{19}$F NMR (376 MHz, Acetone-d$_6$): δ−142.6 (20F, m), −144.6 (2F, m), −153.5 (4F, m), −156.5 (2F, m), −157.1 (16F, m).

Synthesis of Crosslinkable Bromo-Fluorinated PAESs (BFPAES 1-4)

A typical synthetic method of BFPAES 1 was given as follows: To a solution of 4Br-BPA (0.2351 g, 0.4322 mmol), 6F-BPA (0.2900 g, 0.8625 mmol), BHPFS (0.1561 g, 0.3249 mmol) and decafluorodiphenyl sulfone (0.6462 g g, 1.6229 mmol) in anhydrous DMAc (11 mL) was added cesium fluoride (0.02 g, 0.13 mmol) and calcium hydride (0.20 g, 4.76 mmol). The mixture was stirred under argon at 60° C. for 4 h. After filtration to remove the insoluble inorganic salts, the polymer solution was added dropwise to a mixture of methanol (150 mL) and hydrochloric acid (6 mL, 2 N). The resulting polymer was collected by filtration, washed thoroughly with distilled water and methanol, and dried at room temperature under vacuum (0.1 mmHg) (1.00 g, 79% yield). IR (NaCl, cm$^{-1}$): 1641, 1606, 1389, 1297. $^1$H NMR (400 MHz, Acetone-d$_6$,): δ7.68 (5.5H, s), 7.45 (11H, m), 7.32 (11H, m), 7.08 (12H, m), 6.72 (1H, dd, J=18.4 Hz, 12.0 Hz), 6.08 (1H, d, J=18.0 Hz), 5.78 (1H, d, J=12.0 Hz), 1.81 (8H, s). $^{19}$F NMR (376 MHz, Acetone-d$_6$): δ−63.6 (16F, m), −137.4 (20F, m), −144.5 (2F, m), −151.8 (11F, m), −152.3 (4F, m), −155.9 (5.4 F, m), −156.4 (2F, m).

BFPAES 2: 78% yield. IR (NaCl, cm$^{-1}$): 1642, 1604, 1393, 1299. $^1$H NMR (400 MHz, Acetone-d$_6$,): δ7.68 (8H, s), 7.45 (8H, m), 7.32 (8H, m), 7.08 (12H, m), 6.73 (1H, dd, J=17.6 Hz, 12.0 Hz), 6.08 (1H, d, J=17.6 Hz), 5.79 (1H, d, J=12.0 Hz), 1.81 (12H, s). $^{19}$F NMR (376 MHz, Acetone-d$_6$): δ−63.6 (12F, m), −137.4 (20F, m), −144.5 (2F, m), −151.9 (8F, m), −152.4 (4F, m), −155.9 (8 F, m), −156.4 (2F, m).

BFPAES 3: 76% yield. IR (NaCl, cm$^{-1}$): 1637, 1604, 1389, 1297. $^1$H NMR (400 MHz, Acetone-d$_6$,): δ7.67 (11H, s), 7.45 (5.5H, m), 7.32 (5.5H, m), 7.09 (12H, m), 6.72 (1H, dd, J=18.4 Hz, 12.0 Hz), 6.08 (1H, d, J=18.4 Hz), 5.78 (1H, d, J=12.0 Hz), 1.81 (16H, s). $^{19}$F NMR (376 MHz, Acetone-d$_6$): δ−63.6 (8F, m), −137.4 (20F, m), −144.5 (2F, m), −151.9 (5F, m), −152.3 (4F, m), −155.9 (11F, m), −156.4 (2F, m).

BFPAES 4: 78% yield. IR (NaCl, cm$^{-1}$): 1637, 1604, 1389, 1297. $^1$H NMR (400 MHz, Acetone-d$_6$,): δ7.67 (16H, s), 7.07 (12H, m), 6.72 (1H, dd, J=18.0 Hz, 11.6 Hz), 6.08 (1H, d, J=18.0 Hz), 5.78 (1H, d, J=12.0 Hz), 1.81 (24H, s). $^{19}$F NMR (376 MHz, Acetone-d$_6$): δ–137.4 (20F, m), –144.5 (2F, m), –152.3 (4F, m), –155.9 (16F, m), –156.4 (2F, m).

Refractive Index Turning by the Introduction of Bromine Atoms.

The development of waveguiding materials typically involves two parts: core and cladding materials. To be applied in practical waveguiding devices, the core and cladding materials need to have matching properties such as refractive indices with a small ($10^{-3}$ to $10^{-2}$) and well-controlled difference between them, and thermal expansion coefficients. An attractive approach to realize these property requirements can be through the development of structurally similar polymers that have a precisely controlled refractive index. Thus, the introduction of hetero atoms such as bromine into the FPAEKs/FPAESs structures appears to be a promising way to fine-tuning the material properties. Since the C—Br bond is known to have a larger polarizability than C—H bond and small overtone absorption at telecommunication wavelengths (1300 and 1550 nm), the introduction of bromo atoms is expected to lead to an increase of refractive index without compromising the good optical transparency of FPAEKs/FPAESs.

The cross-linkable bromo-containing fluorinated polymers (BFPAEK 1-4 and BFPAES 1-4) were synthesized via a one-step polycondensation reaction of tetrabromobisphenol A (4Br-BPA) with 6F-BPA, cross-linker (BHPFS) and perfluorinated monomers (Scheme 5). Although the phenolate of 4Br-BPA are known to have low nucleophilicity, the high reactivity of perfluorinated diphenyls allowed the direct polymerizations in the presence of calcium hydride and cesium fluoride to afford polymers with high molecular weight For instance, the copolymerization of 4Br-BPA and BHPFS with decafluorodiphenyl ketone yielded a polymer (BFPAEK 4) with a $M_n$ of 21,000 (Table 3). In all the bromo-fluorinated polymers, the content of BHPFS was kept constant at 20 mol % (relative to the total bisphenols). GPC analysis indicated that the polymerizations produced polymers with high molecular weights in the region of 17,000-24,000 and polydispersities of the order of 2 to 3 (Table 3). The polymer compositions were confirmed by $^1$H NMR and $^{19}$F NMR, which were found to be in good agreement with the anticipated polymer structures based upon the monomer feed ratios used in the synthesis. All the polymers showed excellent solubility in common organic solvents and can form optical quality thin film by spin-coating.

The thermal properties of the BFPAEKs and BFPAESs were evaluated by DSC and TGA (results shown in Table 3). In comparison with the non-bromo polymers FPAEKs and FPAESs, an increased $T_g$ was observed for the bromo-containing fluorinated polymers. With the increasing 4Br-BPA content from 0 to 80 mol % in polymers, the $T_g$ of BFPAEKs increased from 153° C. to 177° C., while the $T_g$ of BFPAESs increased from 184 to 206° C. The TGA analysis of these polymers indicated that all the polymers had good thermal stability in nitrogen, with all samples having 5% weight loss temperatures above 450° C. in nitrogen. It was also observed that thermal stability decreased slightly as the 4Br-BPA content increased, which is most likely due to the increased content of the less thermally stable C—Br bond[12,13]. Same as non-bromo fluorinated polymers (FPAEKs and FPAESs), the BFPAEKs and BFPAESs can readily undergo cross-linking reaction by either a thermal or photochemical mechanism to form cross-linked polymers due to the presence of tetrafluorostyrol units in the polymer structures.

Figure 5:
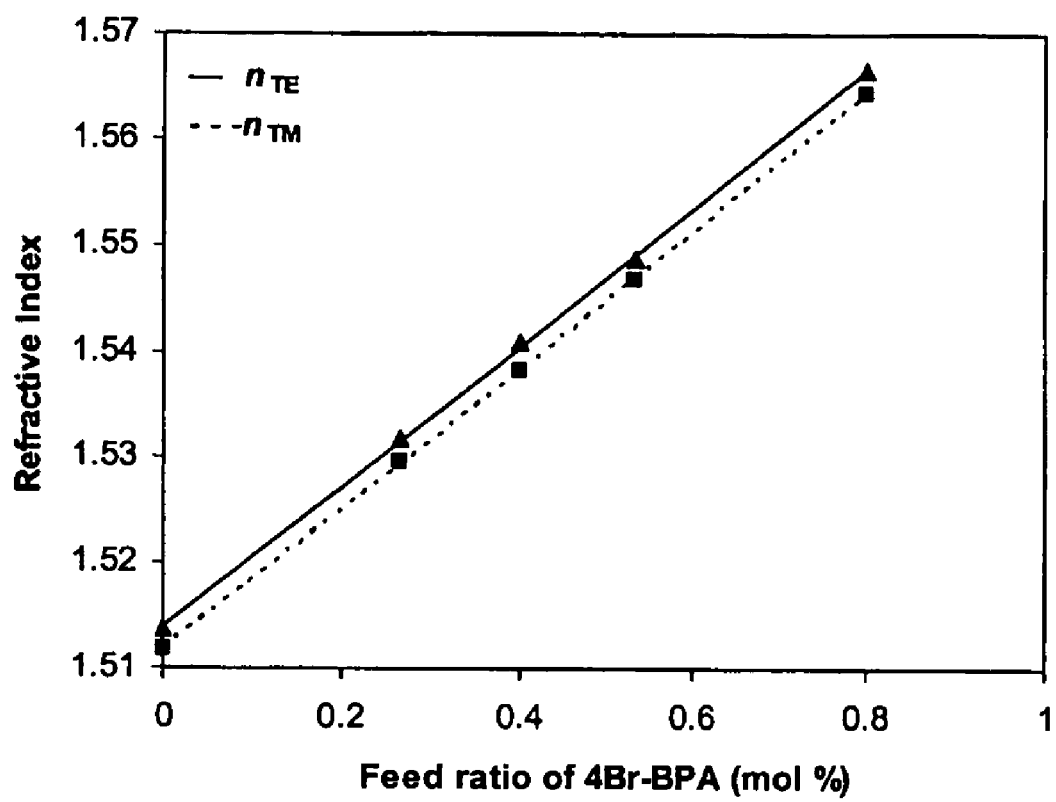
FIG. 5 shows the linear dependence of refractive index of bromo-fluorinated PAEKs (BFPAEKs) on feed molar ratio of 4Br-BPA.

As expected, the bromo-fluorinated polymers have higher refractive indices than those of non-bromo polymers. The refractive indices of the cross-linked thin films of BFPAEKs and BFPAESs measured by the prism coupling technique at 1537 nm were found to be in the range of 1.5318-1.5665 for the BFPAEKs and 1.5348-1.5696 for the BFPAESs (Table 4). The refractive index for both the TE and the TM modes increased with an increase in the bromo content in polymers. In fact a good linear relationship was found between the refractive index of the polymers and the feed ratio of 4Br-BPA used in the preparation. FIG. 5 shows the dependence of the refractive index of the BFPAEKs on 4Br-BPA content. Increasing the 4Br-BPA ratio from 0 to 80 mol % resulted in the refractive index ($n_{TE}$) increasing from 1.5137 to 1.5665. Extrapolation of this linear relationship to 100 mol % 4Br-BPA suggests that a refractive index variability of 0.07 is possible with this polymer system. Since the waveguide structure design depends on the difference in the refractive index between the core and the cladding materials, it is clear that these materials offer tremendous flexibility in tuning the refractive index by controlling the bromo content of the polymer materials. The birefringence of the BFPAEKs and the BFPAESs were also evaluated and found to be around 2.0× $10^{-3}$, which is comparable to those of the non-bromo fluorinated polymers. The presence of the bromo groups in these polymers showed no effect on the birefringence values.

The optical loss of slab waveguide samples for the cross-linked BFPAEKs and BFPAESs was measured at 1550 nm using a high index liquid immersion technique. All the polymers were found to have good transparency at 1550 nm, typically in the range of 0.4-0.5 dB/cm for the BFPAEKs and 0.5-0.6 dB/cm for the BFPAESs. These values are comparable to those obtained with the non-bromo polymers.

Fabrication of Waveguide Devices Using Bromo-Fluorinated PAEKs as Core and Fluorinated PAEKs as Cladding.

Figure 7:
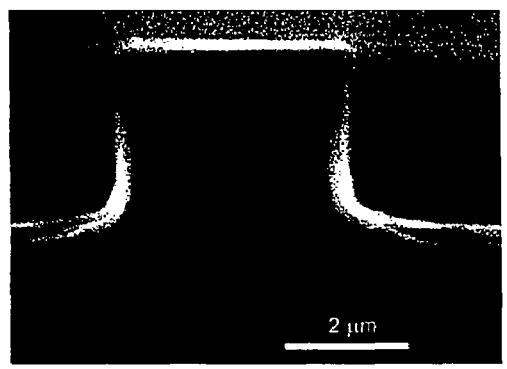
FIG. 7 shows SEM images of waveguide structures fabricated with a bromo-fluorinated polyarylene ether ketone of the invention as the core and a fluorinated polyarylene ether ketone of the invention as the cladding. a) The end-face view of a straight waveguide; b) The top view of a three-channel arrayed waveguide grating.
Figure 7:
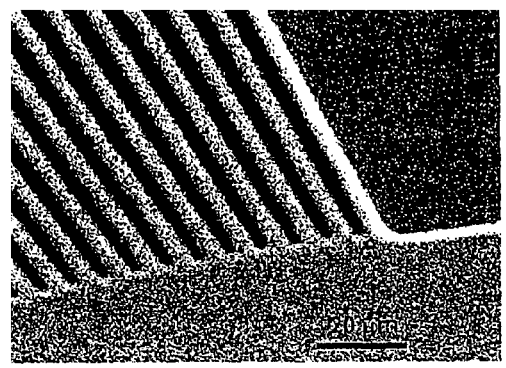

Since these cross-linkable fluorinated polymers have shown excellent processability, good thermal stability, low optical loss and tailorable refractive index, they have been used to fabricate optical waveguide devices. One of the approach taken was to fabricate the core, using a cross-linkable BFPAEK with a refractive index of 1.5290 ($n_{TE}$), which was designed and synthesized based upon the relationship between the refractive index and 4Br-BPA content. The lower and upper cladding materials were applied using a cross-linkable non-bromo fluorinated FPAEK with a refractive index of 1.5090. FIG. 7 shows an end-face view of a straight waveguide and a top view of a three channel arrayed waveguide grating (AWG) fabricated from these materials using the reactive ion etching (RIE) technique. Each waveguide in FIG. 7 has two layers, i.e., a lower cladding and a core layer. Once the top cladding layer was added, the propagation loss of the straight waveguides was evaluated at 1550 nm using the cut-back method. Measurement on a 4×4 µm straight waveguide showed that the propagation loss was low with value around 0.8 dB/cm.

Example 4

Low Temperature Polycondensation for the Preparation of Highly Fluorinated Poly(Arylene Ether Sulfone)s Containing Pentafluorostyrene Moieties for Cross-Linking Polycondensation between a bisphenol and an aromatic difluoride following a nucleophilic aromatic substitution ($S_NAr$) mechanism is the most frequently used reaction for preparing poly(arylene ether)s[14]. In this reaction the phenol was activated by reacting with a base to form a phenoxide, which was further added to the fluoride to form a Meisenheimer complex, followed by the elimination of the fluorine to complete the formation of ether linkage. The formation of the complex is the rate determining reaction of the whole substitution[15]. Any factors stabilizing the negative charge in the Meisenheimer complex will promote the substitution reaction. Apparently an electron-withdrawing group such as ketone or sulfone at the para- or ortho-position (relative to the leaving group) of difluoride will stabilize the complex, therefore activate the monomers[16,17]. Furthermore, when a perfluoro-aromatic ketone/sulfone such as decafluorodiphenyl ketone or decafluorodiphenyl sulfone was used, the additional strong electron-withdrawing effect of fluorine atoms will further activate the monomer. This leads to a very high reactivity of fluorines not only at the para-position but also at the ortho-positions[18,19]. Unfortunately the reaction at the multiple sites of the monomer will result in the formation of branched and even cross-linked structures[20]. In order to prepare polymers with a well-defined linear chain structures, the reaction has to be controlled to suppress the reaction taking place at the ortho-fluorines.

A key factor in suppression of this side reaction is the use of a mild reaction condition such as low temperature. However, a high temperature (>120° C.) has to be applied to the conventional polycondensation due to the use of azeotropic distillation[19-22]. This reaction was promoted by the use of potassium carbonate ($K_2CO_3$) as a base, which, at the same time, produced $CO_2$ and $H_2O$. The latter has to be removed form the solution in order to eliminate side reactions[20,21], so that high temperature azeotropic distillation has to be applied. To solve this problem, Kim et. al. applied a two step procedure for the preparation of fluorinated poly(arylene ether sulfone)s[19c], where the bisphenol was first converted to potassium phenolate by reacting with $K_2CO_3$ using azeotropic distillation at high temperature (120° C.), then the phenolate further reacted with decafluorodiphenyl sulfone at a lower temperature (80° C.) for polymerization. This procedure resulted in an improvement in suppressing the side reaction. Recently, we found the role of $K_2CO_3$ can be performed more efficiently by KF or CsF with the assistance of calcium hydride ($CaH_2$). This system does not produce any $H_2O$, thus no azeotropic distillation is required and the reaction can be done at a low temperature. From these approaches, high molecular weight fluorinated poly(arylene ether ketone)s free of any cross-linked structure with a completely white colour have been prepared. Furthermore, we have now also found this reaction will be further promoted by the use of KF, RbF CsF, $K_2CO_3$ $Rb_2CO_3$ $Cs_2CO_3$ only, while without the addition of $CaH_2$. In this case, the reaction can be completed at very low temperature (i.e. room temperature), where the alkali metal fluoride or carbonate acted as both catalyst and base. This reaction has demonstrated several advantages. First the reaction at such low temperature completely suppressed most side reactions such as cross-linking and hydrolyzing, which are usually found in the conventional $S_NAr$ polycondensation of the fluorinated monomers. Second, no anhydrous condition is required for this reaction. This leads to much easier processing for the polymerization and very easy-to-produce polymers with a very high molecular weight and a narrow molecular weight distribution. Third and the most important, due to the extremely mild reaction condition, this reaction is safe for many functional groups such as vinyl, bromide, amine, sulfonic acid, non-linear optical dyes and so on, so that many of functionalities can readily be introduced into the polymers. We report the reaction for the preparation of fluorinated poly(arylene ether sulfone)s and the reaction for introducing cross-linkable pentafluorostyrene (FSt) moieties into the polymers and their processability for optical waveguide application.

Materials. Anhydrous DMAc was purchased from Sigma-Aldrich Ltd. and used as received. 6F-BPA was purified by recrystallization from toluene. DFPSf was prepared from bis (pentafluorophenyl) sulfide using a reported method, [20b] and purified by recrystallization in hexane/acetone (10:1, v/v) twice. All other chemicals were purchased from Aldrich-Sigma Chemical Ltd. and used as received.

Measurements. Nuclear magnetic resonance (NMR) spectra were recorded using a Varian Unity Inova spectrometer at a resonance frequency 376 MHz for $^{19}F$. The chemical shifts relative to $CFCl_3$ (−63.8 ppm) for $^{19}F$ NMR as internal reference are reported in the ppm scale. Acetone-$d_6$ was used as a solvent for detecting the reaction mixtures in order to botain a better solubility of phenol compounds, while $CDCl_3$ was used for polymer. Molecular weights of polymers were determined by gel permeation chromatography (GPC) using a Waters 515 HPLC pump, coupled with a Waters 410 differential refractometer detector and a Waters 996 photodiode array detector at a wavelength of 260 nm. Thermogravimetric analyses (TGA) and differential scanning calorimetry (DSC) were performed on TA Instruments TGA 2950 and DSC 2920 at a heating rate of 10° C./min in nitrogen. Refractive indices at 1537 nm were measured by a prism-coupling set-up with an uncertainty of 0.0004.

Low temperature polymerization: The polycondensations of BPSO with 6F-BPA were conducted in DMAc at 22° C. or 35° C. Several catalyst systems including 0.00 eq, 0.04 eq, 0.20 eq, and 1.05 eq KF alone; and 0.1 eq KF+1.5 eq $CaH_2$ have been tested for the reaction as described in FIGS. 8 and 9. The following represents a typical polymerization procedure with the results being presented in FIG. 8. BPSO (0.8043 g, 2.02 mmol) and 6F-BPA (0.6725 g, 2.00 mmol) were dissolved in 16 mL DMAc in a 50 mL flask. The solution was divided into 4 portions in equal volume into 4 different test tubes, which was then added 0.0, 2.3, 12.0, and 61.0 mg of KF (0.00, 0.04, 0.2, and 1.05 mmol) respectively. The solution was purged and protected with argon, and stirred at 22° C. for 102 hr. Small aliquots of the reaction solution (~0.2 ml) were removed at assigned reaction times. The solution was passed through a pipette with a Kimwipes plug to filter off the insoluble salts, and then dropped into 0.5 mL of acetone-$d_6$ for $^{19}F$ NMR analysis. The last high MW sample from the reaction with 1.05 mmol KF was also dropped into an acidic methanol to precipitate the polymer for GPC analysis.

Figure 11:
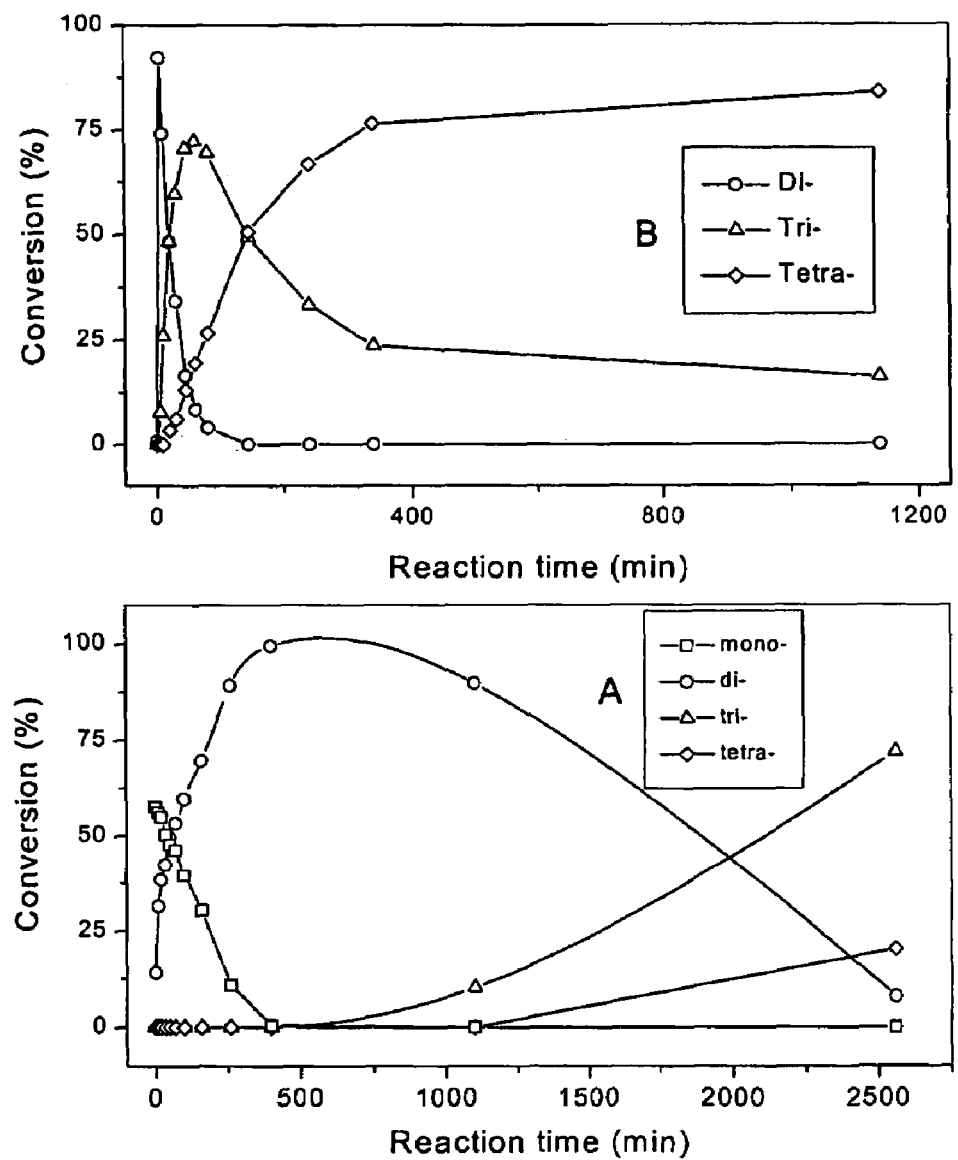
FIG. 11 shows the variation of the conversion with reaction time to the different substituted products of DFPSf when reacted with POPOH in DMAc at 22° C., (A) in the presence of KF (0.1 eq)+CaH$_2$ (1.5 eq) or (B) in the presence of KF (1.05 eq).

Low temperature reaction of BPSO with POPOH: This reaction was tested using two catalyst systems: 1.05 eq KF alone, and 0.1 eq KF+1.5 eq $CaH_2$ have been tested for the reaction. The following represents a detailed procedure. Two DMAc (10 mL) solutions containing BPSO (0.3981 g, 1.00 mmol) and POPOH (0.7448 g, 4.00 mmol) in each were prepared in 50 mL flasks. In one solution 0.244 g KF (4.2 mol) were added for FIG. 11A, and in another 0.023 g KF (0.4 mmol) and 0.26 g $CaH_2$ (6.0 mmol) was added for FIG. 11B. The solutions were purged and protected with argon, and stirred at 22° C. Small aliquots of the reaction solutions (~0.2 ml) were removed at assigned reaction time for $^{19}F$ NMR analysis using a similar procedure as described above.

Kinetics study for the reaction of FSt with 6F-BPA: To a solution of 0.163 g FSt (0.840 mmol), 0.941 g 6F-BPA (2.80 mmol) in 6 mL DMAc in a 20 mL flask were added with 0.064 g KF (1.1 mmol) and 0.28 g $CaH_2$ (6.7 mmol). The solution was purged with argon using a freeze-thaw procedure and then protected with argon. The solution was heated to 125° C. with stirred and kept at this temperature under dark. Small aliquots of the reaction solution (~0.2 ml) were removed at assigned reaction times for $^{19}$F NMR analysis using a similar procedure as described above.

Figure 14:
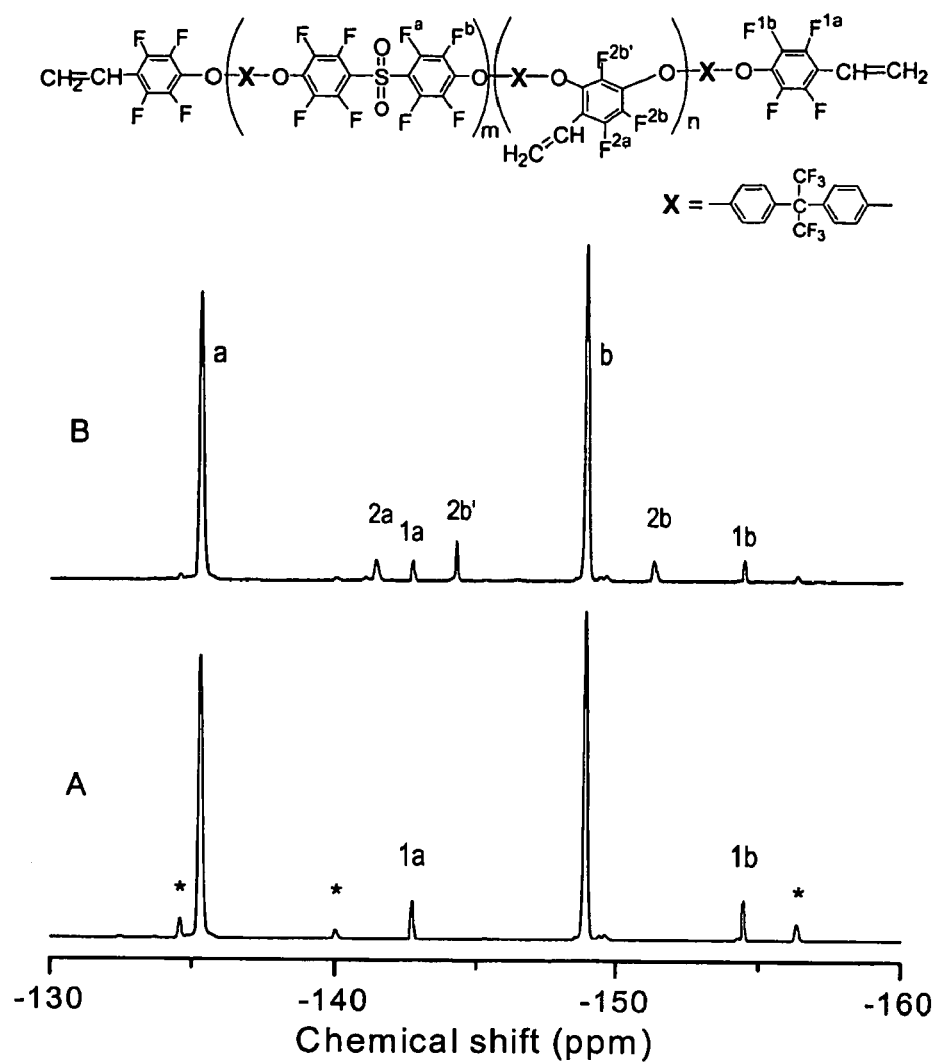
FIG. 14 shows the aromatic region of $^{19}$F NMR spectra of cross-linkable FPASO with FSt as end groups (Polymer A) and as both end groups and inserted units (Polymer B) using the direct method. (Solvent: CDCl$_3$).

Cross-linkable Fluorinated PAESO with low FSt content (Polymer A). To a solution of 6F-BPA (10.087 g, 30.0 mmol), FSt (1.281 g, 6.6 mmol) in DMAc (60 mL) was added with KF (5.23 g, 90.0 mmol). The mixture was purged with argon using a freeze-thaw procedure and then was heated at 125° C. with stirring under dark for 2 hr. The solution cooled to room temperature and was added with BPSO (10.751 g, 27.0 mmol) in 40 mL degassed anhydrous DMAc using a syringe. The solution was heated to 45° C. and maintained at this temperature for 4 hr. After filtration to remove insoluble inorganic salts, the solution was added dropwise into a mixture of methanol (600 ml) and hydrochloric acid (10 mL, 2N). The resulting white precipitate was collected by filtration, washed thoroughly with methanol, and dried at room temperature under vacuum (0.1 mmHg) (16.6 g, 79% yield). $^1$H NMR (400 MHz, CDCl$_3$,): δ7.38 (6F-BPA, d, J=8.6 Hz); 7.31 (6F-BPA-FSt, d, J=8.6 Hz); 7.01 (12H, d, J=8.6 Hz); 6.96 (6F-BPA-FSt, d, J=8.6 Hz); 6.67 (FSt, dd, J=18.0 Hz, 12.0 Hz); 6.11 (FSt, d, J=18.0 Hz); 5.72 (FSt, d, J=12.0 Hz); $^{19}$F NMR (376 MHz, CDCl$_3$, see FIG. 14): δ–63.8 (—CF$_3$, s); –135.3 (a, m); –142.7 (1a, m); –144.2 (2b', m); –148.9 (b, m); –154.5 (1b, m).

Cross-linkable Fluorinated PAESO with high FSt content: To a solution of 6F-BPA (9.415 g, 28.0 mmol), FSt (1.630 g, 8.4 mmol) in anhydrous DMAc (60 mL) were added KF (0.32 g, 8.4 mmol) and CaH$_2$ (1.77 g, 24.0 mmol). The mixture was purged with argon using a freeze-thaw procedure and then was heated at 125° C. with stirring under dark for 6 hr. The solution cooled to room temperature and was added with BPSO (0.836 g, 21 mmol) in 40 mL degassed anhydrous DMAc using a syringe. The solution was heated to 65° C. and maintained at this temperature for 4 hr. The polymer has been collected and purified using a same procedure as described above (15.8 g, 87% yield). $^1$H NMR (400 MHz, CDCl$_3$,): δ7.38 (6F-BPA, d, J=8.6 Hz); 7.31 (6F-BPA-FSt-end, d, J=8.6 Hz); 7.29 (6F-BPA-FSt-insert, d, J=8.6 Hz); 7.01 (6F-BPA, d, J=8.6 Hz); 6.96 (6F-BPA-FSt-end, d, J=8.6 Hz); 6.86 (6F-BPA-FSt-insert, d, J=8.6 Hz); 6.67 (FSt-end, dd, J=18.0 Hz, 12.0 Hz); 6.61 (FSt-insert, dd, J=18.0 Hz, 12.0 Hz); 6.11 (FSt-end, d, J=18.0 Hz); 6.08 (FSt-insert, d, J=18.0 Hz); 5.72 (FSt-end, d, J=12.0 Hz); 5.63 (FSt-insert, d, J=12.0 Hz); $^{19}$F NMR (376 MHz, CDCl$_3$, see FIG. 14): δ–63.8 (—CF$_3$, s); –135.3 (a, m); –141.4 (2a, m); –142.7 (1a, m); –144.2 (2b', m); –148.9 (b, m) –151.3 (2b, m); –154.5 (1b, m).

1. The Function of KF and CaH$_2$ in the Reaction.

As we have shown previously[21c], the polycondensation of activated perfluorodiphenyl monomers such as decafluorodiphenyl ketone with hexafluorobisphenol-A (6F-BPA) in DMAc catalyzed by KF or CsF and CaH$_2$ could be completed at a low temperature (<80° C.). This reaction condition effectively prevents side reactions that were usually found in the conventional reactions so that polymers with white colour and free of any cross-linked gel particles have been prepared. Due to the higher reactivity of decafluorodiphenyl sulfone (DFPSf) for the S$_N$Ar reaction, a lower reaction temperature is expected for the reaction between DFPSf and 6F-BPA under a similar condition as described in Scheme 6. It is found that DFPSf reacted with 6F-BPA in DMAc at room temperature even without using any catalyst and base. The reaction was investigated in detail regarding the roles KF and CaH$_2$ played in the reaction with results demonstrated in FIG. 8 and FIG. 9.

The reactions as shown in Scheme 6 were monitored by $^{19}$F NMR. During the reaction, about 0.1 mL solution was taken and mixed with 0.5 ml acetone-d$_6$, then $^{19}$F NMR spectra was collected. The peak was assigned based on a theoretical chemical shift analysis[23]. As polymerization proceeded, two new peaks at –137.4 (a) and –152.1 (b) appeared and increased in intensity. These two peaks are attributed to the ortho- and meta-fluorine atoms (related to the sulfone unit) on the main chain. Meanwhile, three other peaks at –137.0 (a'), 144.0 (c') and –159.9 (b') ppm decreased in intensity, which were attributed to ortho-, para- and meta-fluorines of DFPSf as well as the DFPSf end-unit in the polymer. By comparing the integral intensity of the peaks of the fluorines on the main chain to those on the end-unit, the conversion of the reaction, which was defined as the molar percentage of the para-fluorine was consumed at a specific reaction time, can be measured[21c] and a number average molecular weight (M$_n$) can be further calculated with the results demonstrated in FIG. 8.

Figure 8:
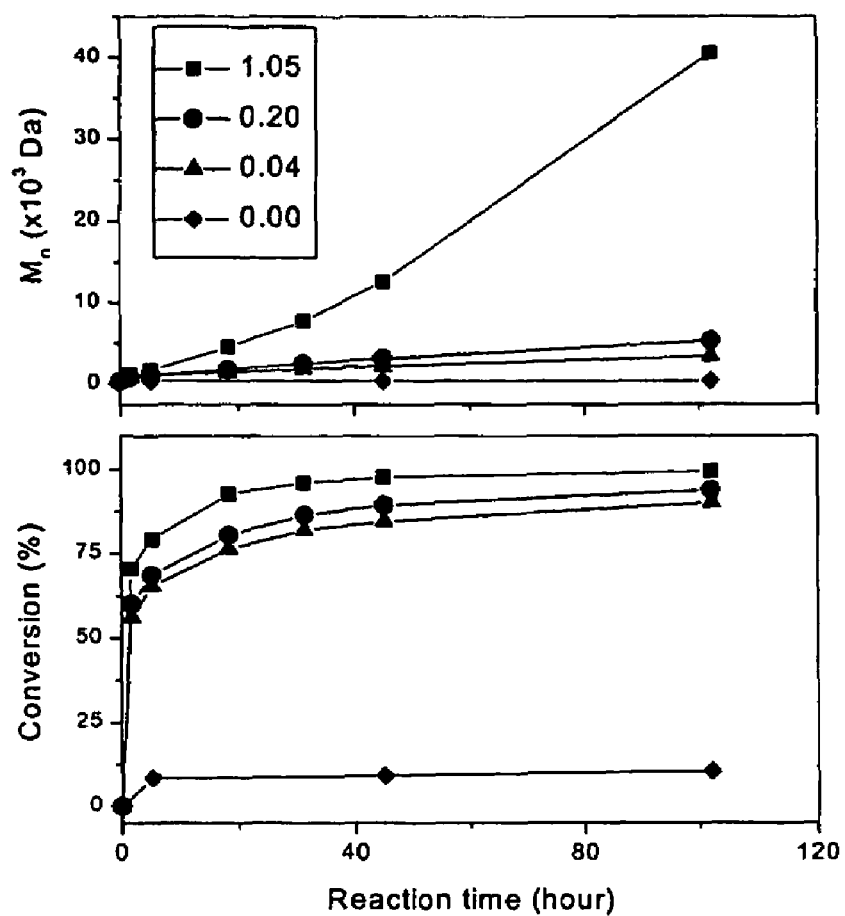
FIG. 8 shows the effect of different amount of KF (0.00 eq, 0.04 eq, 0.20 eq, 1.05 eq, vs. phenol groups) on the reaction of DFPSf with 6F-BPA at 22° C.
Figure 9:
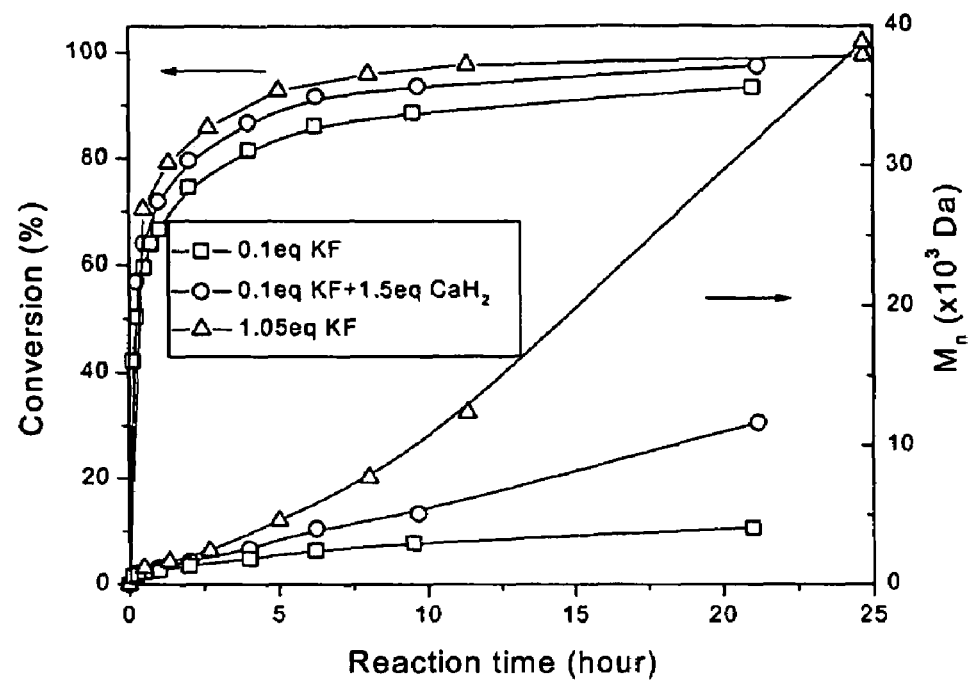
FIG. 9 shows the influence of different catalytic systems on the polycondensation of DFPSf with 6F-BPA in DMAc at 35° C.

The results for the reactions of DFPSf with 6F-BPA in DMAc at 22° C. with the use of different amount of KF are illustrated in FIG. 8. It can be seen, even for the reaction without using any KF, about 8% para-fluorine reacted with phenol to form ether linkage in about 5 hr at room temperature. However, the conversion of this reaction is very low, and is only about 10% even when the reaction time was increased to 102 hr. This result indicates the reactivity of DFPSf for the S$_N$Ar reaction is very higher. The reaction can occur at very low temperature without any catalyst and base. But, under this condition, the reaction reaches its equilibrium quickly, and the conversion was only kept at a very low level (~10%). This situation was improved by adding a trace amount of KF (0.04 eq, vs. phenol group) into the reaction. Under this reaction condition, the conversion reaches about 60% quickly in about 1.5 hr, and then the conversion curves leveled off was kept around 90% after 50 hr, at which time only oligomers with molecular weight of ~2000 Da have been produced. The equilibrium was completely changed when 1.05 eq KF was added into the reaction. In this case, a polymer with very high molecular weight (Mn=40,500 Da, PDI=3.2) has been produced. This result means that KF acts not only as a catalyst, but also a base to neutralize HF that is schematically produced from the condensation reaction so that the equilibrium was removed. It was reported the alkali fluorides including KF and CsF can form a stable complex with HF, and were successfully used in the polycondensation reaction at high temperature to adsorb HF for the preparation of regular poly(arylene ether)s[22]. The result from FIG. 8 clearly showed that 1.05 eq KF is sufficient to neutralize the reaction system to push the reaction to completion.

This neutralization effect of KF was compared with that of CaH$_2$, in this reaction CaH$_2$ was used as a base and a trace of KF was remained in the solution as a catalyst. The results in the terms of conversion and M$_n$ varied with the reaction time at 35° C. were illustrated in FIG. 9, where three catalyst systems: 0.1 eq KF, 1.05 eq KF, and 0.1 eq KF+1.5 eq CaH$_2$ have been compared. The reactions using 0.1 eq KF, 1.05 eq KF displayed a similar features with the reactions conducted at 22° C. The reaction using 0.1 eq KF was equilibrated at the stage corresponding to an M$_n$ of 4,000 Da. This equilibrium was removed by increasing the amount of KF to 1.05 eq, where a high MW polymer (Mn=38,800 Da and PDI=3.0) has been produced. With the use of CaH$_2$, a steady increase of the molecular weight of the polymer with reaction time was found, and a polymer with $M_n$ of 24,400 Da and PDI of 2.4 was obtained eventually in 70 hr. This phenomenon is understandable because $CaH_2$ is a strong base, and is available to neutralize HF for the removal of the equilibrium. However, compared to the reaction using 1.05 eq KF alone, this reaction showed a much lower speed, which is in same scale as that of the reaction at 22° C. using 1.05 eq KF alone. This phenomenon cannot be explained by the difference of the neutralization effect of the two reaction systems. Because $CaH_2$ is a stronger base than KF, if the neutralization effect was taken into account, a higher reaction speed of the reaction with $CaH_2$ is expected. Another possible explanation is the catalytic effect of KF for the reaction. Compared to the reaction using 1.05 eq KF, only 0.1 eq KF was used for this reaction. However, a further study of a reaction using 1.05 eq KF+1.5 eq $CaH_2$ revealed a similar reaction speed (not shown), indicating the difference in the amount of KF is not a real cause. Actually, a solubility test showed that even 0.1 eq KF was used for the reaction, insoluble KF was already found in the solution, indicating only trace of KF can be dissolved in the solution during the reaction. Therefore, the low reaction speed must be caused by the presence of $CaH_2$ in the solution. It leads to the formation of Ca phenoxide salt, which may have lower reactivity for the polycondensation.

2. Suppression of the Reaction on Ortho-Position of DFPSf.

Figure 10:
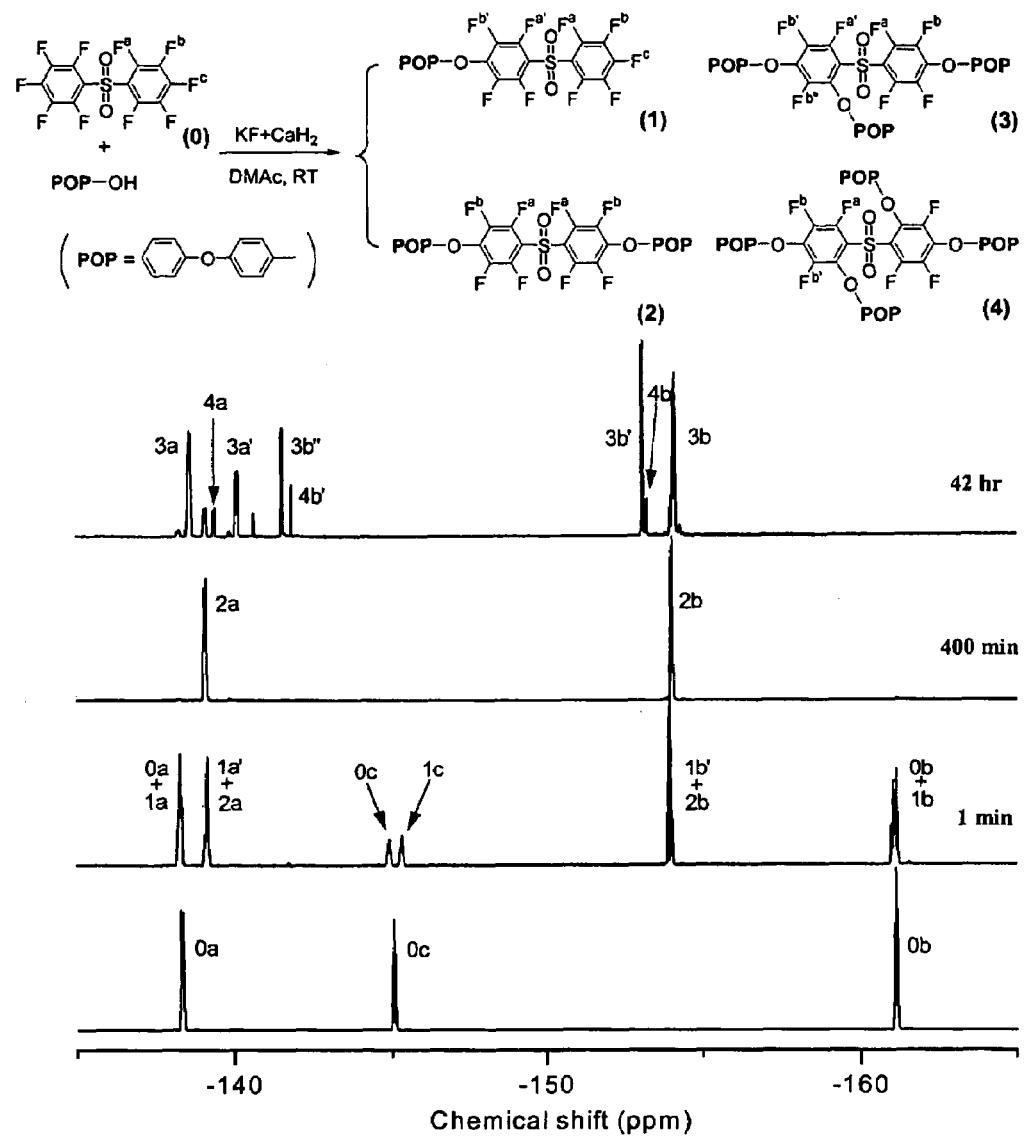
FIG. 10 shows the aromatic region of $^{19}$F NMR spectra of DFPSf and its reacting products with POPOH at different times in DMAc at 22° C. in the presence of KF (0.1 eq) and CaH$_2$ (1.5 eq). The numerical symbols, 0, 1, 2, 3, and 4 represent DFPSf and its mono-, di- tri- and tetra-substituted products respectively from the reaction with POPOH: (Solvent: acetone-d$_6$).

The selectivity of the reaction on the para-fluorines against the ortho-fluorines of DFPSf has been studied using a larger excess of phenol (i.e. [OH]/[DFPSf]=4:1), so that at least 2 eq phenol groups are accessible for ortho-fluorines of DFPSf. However, under this molar ratio, the reaction of 6F-BPA onto the multiple sites of DFPSf will produce cross-linked structures, which is impossible for analysis. Therefore, a model compound, 4-phenoxy phenol (POPOH) has been used to replace 6F-BPA for the reaction with DFPSf. The reaction was monitored by $^{19}F$ NMR measurement in a similar manner as for monitoring the polymerization discussed above. Examples of $^{19}F$ NMR spectra for this reaction in DMAc at 22° C. were demonstrated in FIG. 10, where the reaction was catalyzed by 0.1 eq KF+1.5 eq $CaH_2$. During the reaction, 4 major product species, mono-, di-, tri- and tetra-substituted compounds was found, and were represented by numerical symbols of 1, 2, 3 and 4 respectively with the structures illustrated in FIG. 10. At the same time, the starting material, DFPSf was represented by 0. All these four products and DFPSf are easily identified from the $^{19}F$ NMR spectra and the peaks have been assigned as shown in the figure. By comparing the integral intensities of the peaks, the conversions to each species at any reaction time in a value of molar percentage against to the initial amount of DFPSf can be calculated. The variation of the conversions with the reaction time is plotted in FIG. 11. It can be seen POPOH only reacted with the para-fluorines of DFPSf to product mono- and di-substituted compounds until the reaction time reached 400 min. At this time about 99.5% of DFPSf was converted to the di-substitute compound. The tri-substituted product was only formed after 400 min at a very low reaction rate, and the tetra-substituted product was found after 1100 min. This result indicated a very high selectivity of the reaction under this condition. Meanwhile, similar to the polymerization as discussed above, the reaction using KF alone proceeded much fast. All of DFPSf was converted in less than 5 min. At this time about 90% di-substituted compound, and 10% tri-substituted compound have already formed. Because the reaction rate is too high, it is difficult to evaluate the selectivity from this set of the data. However, based on the polymerization results, which show both the polymerizations with or without the use of $CaH_2$ yield high molecular weight polymers with a low polydispersity (<3.2), it is reasonable to deduce that the reaction by the use of KF alone has a similar selectivity as the reaction using 0.1 eq KF+1.5 eq $CaH_2$, where 99.5% of the para-fluorines of DFPSf has been reacted before a trace of reaction product with ortho-fluorines can be found by $^{19}F$ NMR.

3. The Introduction of Cross-Linkable FSt Moieties.

A cross-linking capability of the polymers is required for the fabrication of many thin film devices including optical waveguides. Traditionally this functionality was introduced into the fluorinated poly(arylene ether)s by attaching a phenyl ethynyl or an ethynyl moiety onto the polymer chain end[19,25]. However, it required a very high temperature to crosslink phenyl ethynyl (350° C.) or ethynyl groups (250° C.). At these temperatures, yellowing of the polymer film was usually found and the quality of the polymer film degraded. Recently, we reported a reaction procedure to introduce FSt moieties into the polymers by reacting FSt with 6F-BPA under a modified conventional polycondensation reaction condition[20b,c]. This functional group is ready for thermal or UV cross-linking in a wide temperature range[20,26]. Furthermore, like the reaction of DFPSf with 6F-BPA, a detailed study revealed that the reaction of FSt with 6F-BPA can also be efficiently catalyzed by KF. Consequently it resulted in a much simple procedure for the preparation of the cross-linkable polymers by a two-step reaction finished in one-pot as illustrated in Scheme 7.

Scheme 7 showed a typical procedure for the preparation of Polymer A, which included a reaction of FSt with an excess amount of 6F-BPA in the presence of KF in DMAc at 125° C. for 2 hr, followed by the addition of DFPSf and the second step reaction for 4 hr at a much lower temperature (45° C.). KF demonstrated a great advantage for the first step reaction, where after 100% FSt was converted to the mono-substituted product in 2 hr, no more reaction was found even when the time was extended to 4 hr. This feature ensures the formation of the FSt end-capped structure of Polymer A. In this case, the molecular weight of the formed polymer and the content of FSt are not adjustable independently. A higher FSt content will lead to a lower molecular weight of the polymer.

If the first step reaction was allowed to produce mono- and di-substituted products, Polymer B with FSt moieties both at the chain-end and inside the chain will be produced. In this case, its molecular weight and the FSt content can be adjusted independently by controlling the feed ratio of the starting materials and the conversion of the first step reaction. On the other hand, it implies that monitoring and controlling the first step reaction to a desired conversion are critical for well controlling the structure of the polymers.

Figure 12:
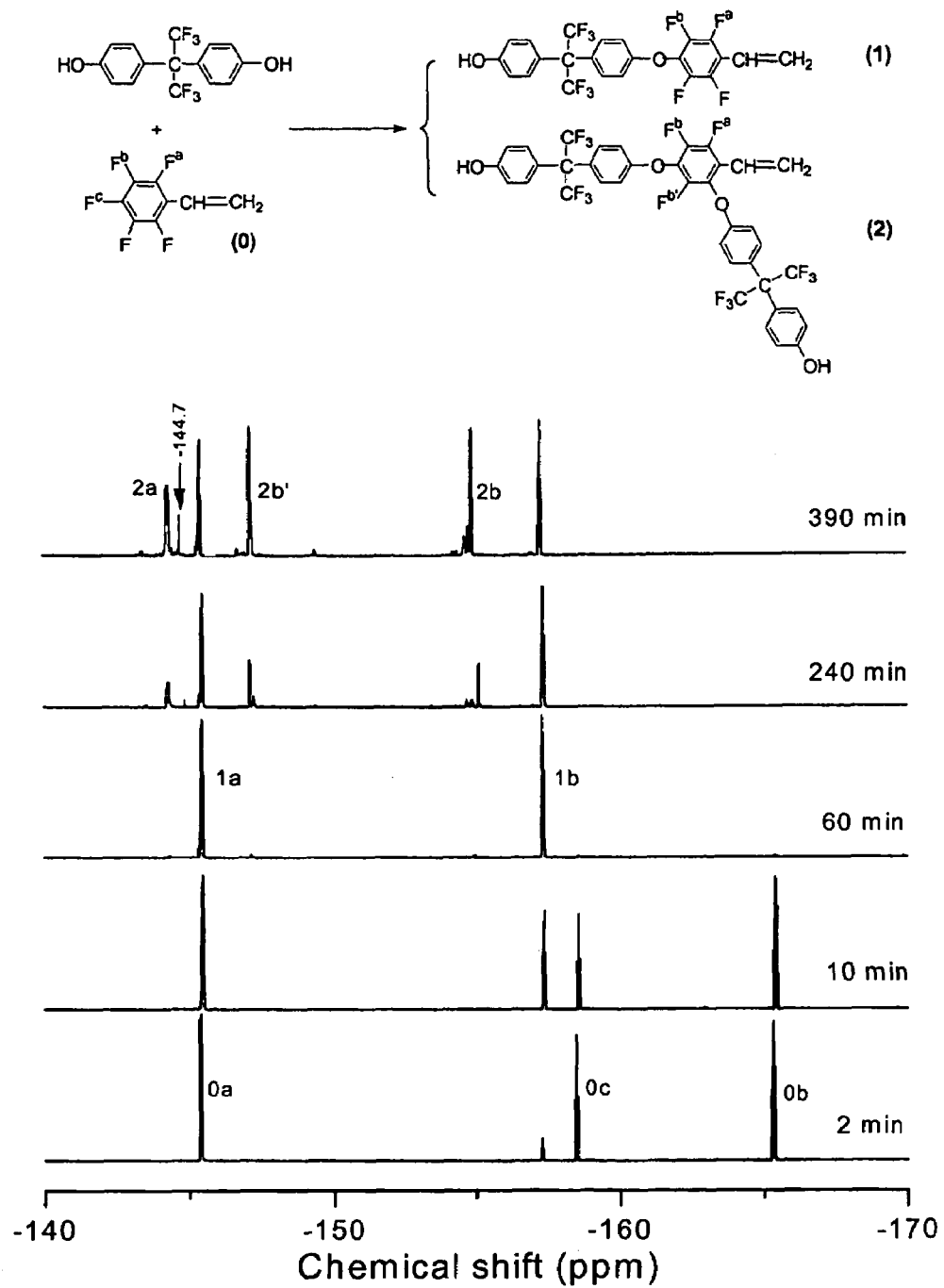
FIG. 12 shows $^{19}$F NMR spectra of the reaction mixture taken at different times from the reaction of FSt (8 eq) with 6F-BPA (28 eq) in the presence of KF (0.2 eq) and CaH$_2$ (1.2 eq) in DMAc at 125° C. The numerical symbols, 0, 1, and 2 represent FSt, and its mono- and bi-substituted product respectively. (Solvent: acetone-d$_6$).

Fortunately, this step of the reaction is easily monitored by $^{19}F$ NMR, where FSt and its mono- and di-substituted products in the reaction mixture are easily identified and their relative contents can be easily calculated from the peak intensities of the spectrum. FIG. 12 demonstrated the monitoring of the first step reaction for the preparation of Polymer B. The reaction mixtures for NMR measurement were taken at the reaction times of 2, 10, 60, 240, and 390 min, and the peaks were assigned by using 0, 1 and 2 to represent FSt and its mono- and di-substituted products respectively.

Figure 13:
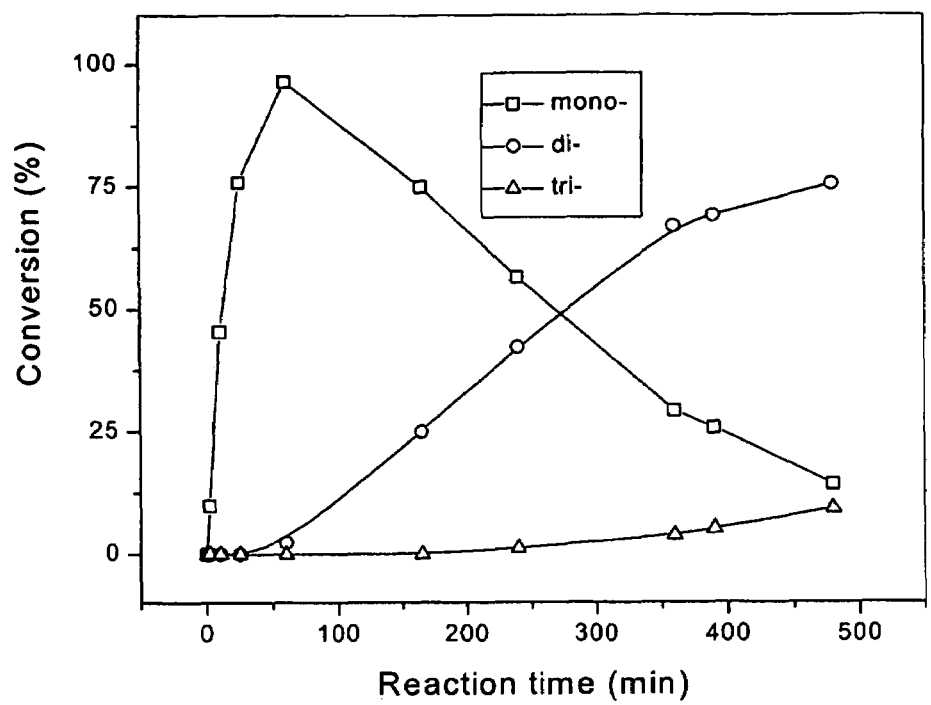
FIG. 13 shows the variation of conversion with the reaction time to the mono-di- and tri-substituted products of FSt for the reaction of FSt (8 eq) with 6F-BPA (28 eq) in the presence of KF (0.2 eq) and CaH$_2$ (1.2 eq) in DMAc at 125° C. The data are calculated from the $^{19}$F NMR measurement as demonstrated in FIG. 12.

Compared to activated monomers such as DFPSf, FSt is a less reactive compound for the $S_NAr$ condensation reaction. It required a much higher reaction temperature (125° C.) for the reaction of its para-fluorine with 6F-BPA in the presence of KF, and it becomes much more difficult for the reaction of its ortho-fluorines. However, in the contrary to the reaction of DFPSf with 6F-BPA at low temperature as discussed in the first part of Discussion, KF+CaH$_2$ catalytic system appeared a higher activity than KF alone for the reaction of FSt with 6F-BPA at 125° C. By the use of KF+CaH$_2$, FSt was completely converted to mono-substituted product in 40 min, and then it further converted to di-substituted product. Only trace of tri-substituted product was found in the reaction as indicated by a small single peak at −144.7 ppm in the 390 min spectrum. From this measurement, the conversion to mono-, di- and tri-substituted products in the reaction mixture at different reaction times can be calculated and the results were plotted in FIG. 13. It can be seen that the designed di-/monomolar ratio of 2:6 was reached at 390 min. This reaction followed by the addition of DFPSf and heating at 70° C. for 4 hr produced Polymer B.

Characterization of the Polymers

The polymers have been characterized regarding their molecular weight and thermal properties with the data listed in Table 5. GPC measurement shows that both polymers have a molecular weight very close to the designed value, and a low molecular weight polydispersity, indicating the polymerizations are clean and controlled well. This was also verified by the $^{19}$F NMR measurement as demonstrated in FIG. 14. For Polymer B with high FSt content, besides two major peaks at −135.3 and −148.9 ppm, ascribed to the two major fluorines on the main chain, 5 small peaks are also found. These peaks are assigned to the FSt moieties at the chain ends (−142.7 and −154.5 ppm) as well as inside the chain (−141.4, −144.2, and −151.3 ppm) as indicated in the figure. From the integral intensity of these peaks, it was calculated the ratio of the inserted FSt unit to end-capped FSt unit being 3, which is coincident with the designed value. Meanwhile, for the Polymer A with a low FSt content, $^{19}$F NMR only shows two small peaks besides the two major peaks of the fluorines on main chain, These two small peaks are obviously attributed to the fluorines on the FSt end units. In addition, there are also three very small peaks that were marked with a star in this spectrum. Compared to the $^{19}$F NMR spectrum of the starting materials, they are easy assigned to the fluorines of the DFPSf end unit. It indicates that not all of the polymer chains were capped with FSt unit. From the peak intensity, it is estimated that about 20% of the polymer chain end was free of cross-linkable FSt moieties.

The thermal properties of these two polymers before and after cross-linking are compared in Table 5. As reported previously, FSt units are easily cross-linked by thermal heating or UV irradiation in a wide temperature range using an appropriate thermal or photo-initiator[26a,b]. In order to create a homogeneous cross-linking structure, a temperature close to the $T_g$ of the polymer is applied to the sample for the cross-linking, so that a high temperature initiator, dicumyl peroxide has been used[27]. The polymer was cross-linked following a procedure as: the polymer was mixed with 1% dicumyl peroxide (related to the polymer) in a 20% chloroform solution. It was cast onto a glass plate and the solvent was evaporated at room temperature for 5 hr. The polymer film on the glass plate was then put in a vacuum oven, and was heated at 160° C. for 2 hr and 180° C. for 0.5 hr. After cross-linking, $T_g$ of the polymer film increased about 23° C. for Polymer B, and about 18° C. for Polymer A. However, the cross-linking did not show any significant influence to decomposition temperature from TGA measurement. Due to the better film formation property, only the Polymer B with high FSt content has been tested for its optic properties including optical loss and refractive index. In this case, cyclohexanone instead of chloroform was used as the solvent due to an easy processability for spin-coating. In order to avoid extra optical attenuation induced by surface and sidewall roughness due to waveguide fabrication processes, slab samples were used to evaluate the materials optical loss. 3-6 µm thick polymer films were coated on a 15 µm thick silica layer (with a refractive index of 1.4452) on a silicon substrate. The optical propagation attenuation at 1550 nm was measured using a high index liquid immersion technique described in reference[28]. Briefly, slab waveguide samples approximately 5×40 mm$^2$ were mounted on a rotating stage, and light from a diode laser at 1550 nm was coupled into the polymer waveguide film via a high index glass prism. The sample was slowly immersed into a liquid with a refractive index slightly higher than that of the guiding film. The guided light is out coupled at the liquid-film interface. By measuring the intensity of the out coupled light as a function of the propagation distance, the propagation loss in the waveguide was calculated to be 1.2 dB/cm. This value is much higher than the data reported by Kim et. al. (0.37 dB/cm) for a very similar polymer[19c]. The reason for the high optical loss is not clear yet. But it may relate to the poor adhesion of the polymer with the substrate. Delaminating spots were usually found in the sample after it was cross-linked at high temperature.

Figure 15:
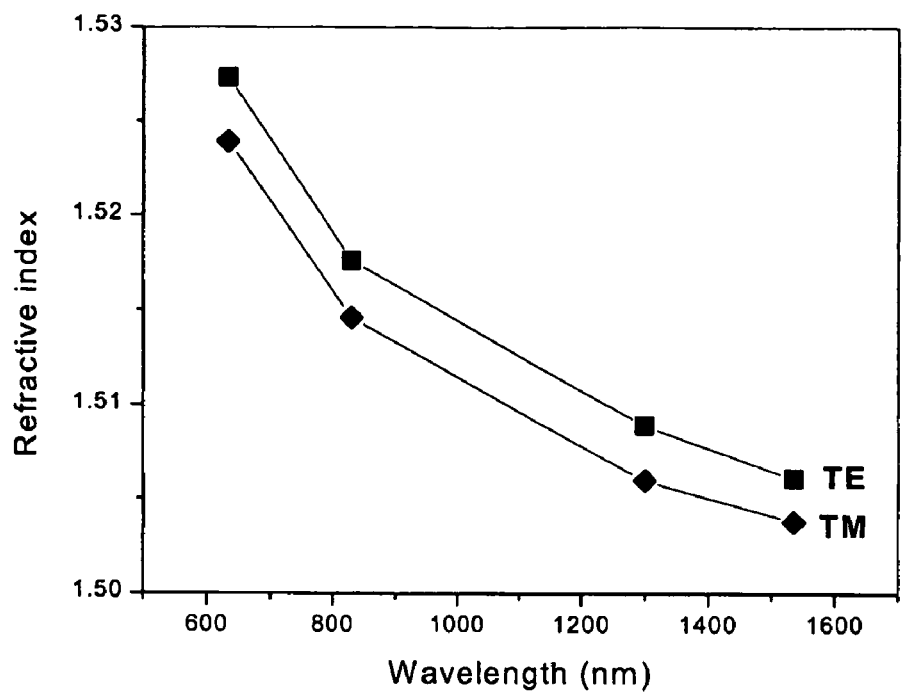
FIG. 15 shows the reflective index of the cross-linked film of Polymer A.

The refractive index of the film on a silicon substrate was measured in the wavelength range from 640 to 1537 nm by the prism coupler method with the results shown in FIG. 15. The birefringence of the film in the whole range is about 3×10$^{-3}$, with the refractive index at 1537 nm being 1.5061 (TE) and 1.5038 (TM).

The perfluoro-monomer, DFPSf displayed a very high reactivity to $S_N$Ar condensation with phenols. It readily reacted with 6F-BPA at room temperature even without the presence of any catalyst. KF is a very efficient catalyst for the reaction, and the reaction speed is increased for about 10 folders when only 0.04 eq KF was used. KF can also act as a base for this reaction to remove the equilibrium of the condensation. In this case, more than 1 eq KF is required for the reaction. This role of KF can be played by the use of CaH$_2$. The addition of 0.1 eq KF and 1.5 eq CaH$_2$ into the reaction gives a similar effect as the use of 1.05 eq KF alone, however at a lower reaction speed. Both catalytic systems gave completely white high molecular weight polymers ($M_n$=24.4~40.5 kDa) with narrow molecular weight distribution ($M_w/M_n$=2.4~3.2). These systems are also worked very well for the reaction of FSt with 6F-BPA, which was used to introduce a cross-linking capability into the polymer by incorporating FSt in the polymers. To achieve these polymers, FSt was first reacted with excess amount of 6F-BPA, which was followed by a further reaction with DFPSf. The reaction of FSt with 6F-BPA can be easily controlled to the mono-substitution stage when KF was used, which will lead to a polymer containing FSt units as end-capping groups. This reaction also can be controlled to yield a mixture of mono- and di-substitution at a desired ratio when KF+CaH$_2$ was used, and leading to a polymer containing FSt units both as end-capping and inserting group. Cross-linked film from the latter demonstrated an excellent performance for the waveguide application with a refractive index of 1.5061 (TE) and 1.5038 (TM).

Film Preparation for Optical Measurements

Slab waveguides were prepared as follows. A solution of each polymer in a suitable solvent (e.g. ~20% w/v in cyclohexanone) containing dicumylperoxide (1 wt % relative to polymer) as a thermal initiator for cross-linking was filtered through a Teflon syringe filter with a pore size of 0.2 µm. Thin films of thickness typically 2-7 µm were formed by spin-coating the polymer solution onto a silicon, or oxidized silicon substrate. The films were dried at 130° C. for 30 minutes. Thermal curing of the polymer films was carried out by heating the films at 180° C. under vacuum for 2 hours.

Refractive Index Measurements

Refractive indexes of thin polymer films were measured using the prism coupling method. Light from a laser source at 1537 nm was collimated and directed through polarization control optics towards an equilateral glass prism clamped to a polymer thin film on a $SiO_2$/Si wafer and mounted on a dual rotation stage. Light incident on one face of the prism is coupled into and out of the thin film and monitored by a power meter mounted on the outer rotation stage. The data collected from the power meter were analyzed and the refractive index for the TE and TM modes were calculated, giving a final accuracy of ±0.0004.

Optical Loss Measurement[11]

Slab waveguide samples approximately 5 mm×40 mm were mounted on a rotating stage, and light from a diode laser at 1550 nm was coupled into the polymer waveguide film via a high index glass prism. The sample was slowly immersed into a liquid with an index of refraction slightly higher than that of the guiding film. The guided light is outcoupled at the liquid-film interface, and by measuring the intensity of the outcoupled light as a function of the propagation distance, the propagation loss in the waveguide was calculated.

Fabrication of polymer waveguide devices

These polymer materials can be used for the fabrication of a variety of photonic devices. A photonic device manipulates light, changing its path, its intensity or its phase. A ridge waveguide is a simple photonic devices, guiding the light and directing it along a specific path. By patterning more complex patterns, light in two or more ridge waveguides can be made to interfere. By tightly controlling ridge waveguide widths, path lenghs and waveguide separations, as well as material refractive indices, devices to separate light with different wavelengths, to divide optical signals into parts with specified powers, or to attenuate the intensity of an optical signal can be fabricated. Two example devices have been fabricated and are described below.

(a) Photolithography/reactive ion etching

Figure 16:
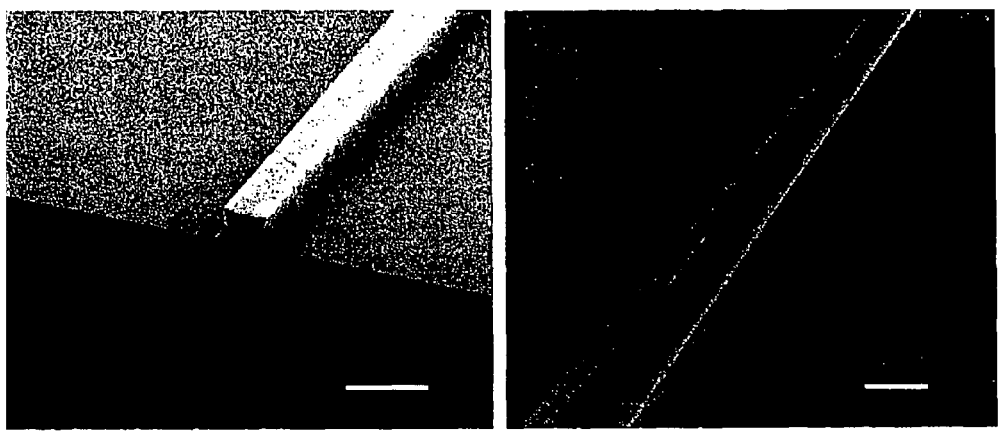
FIG. 16 shows the core structures of demonstrating waveguide from cross-linked Polymer A.
Figure 17:
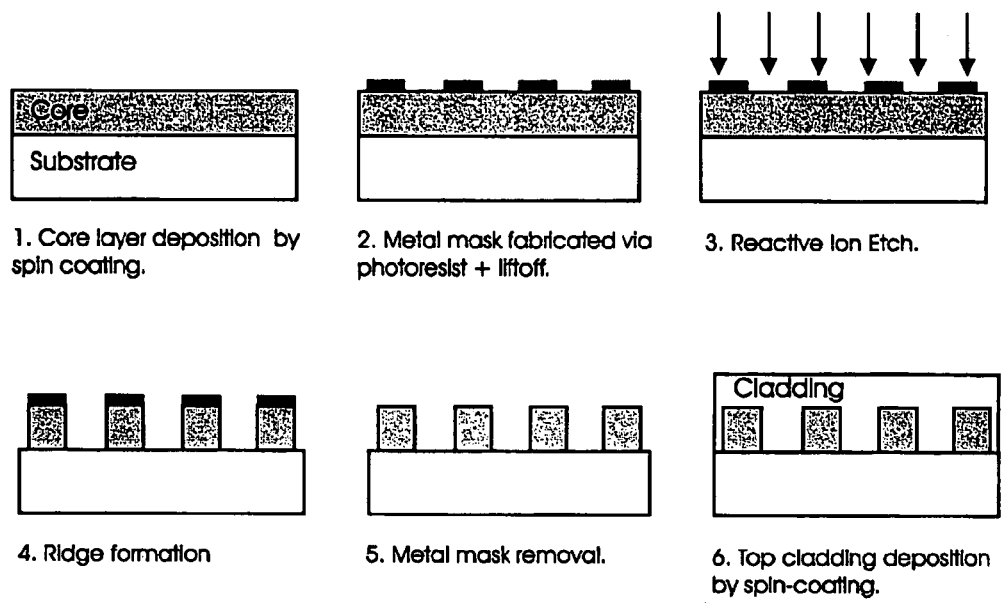
FIG. 17 shows the waveguide fabrication process—photolithography/reactive ion etching

The waveguide fabrication process using photolithography and reactive ion etching (RIE) is shown schematically in FIG. 17. A film of core polymer (typically 3-6 µm) was first deposited on a 15 µm silica layer on a silicon substrate by spin coating. After thermal crosslinking of the film, a standard negative photo-resist lift-off method was used to pattern a nickel mask on the polymer layer, and ridges were then formed using an $O_2$/$CHF_3$ reactive ion etch (RIE) process. After removal of the metal mask, a top cladding layer of a polymer with a suitable refractive index was then deposited by spin-coating and thermally crosslinked to complete the waveguide structure. A ridge waveguide is shown in FIG. 16.

Example (i)

Bimodal Interference Coupler[28]

Figure 18:
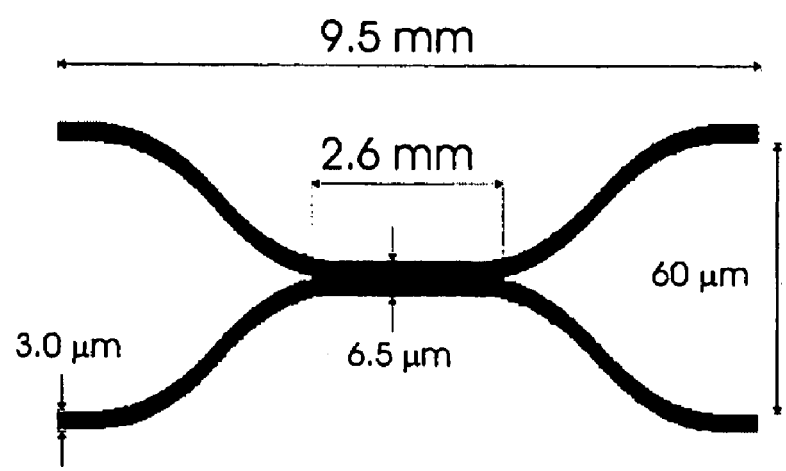
FIG. 18 shows the layout of a 2×2 bimodal interference coupler showing typical dimensions.
Figure 19:
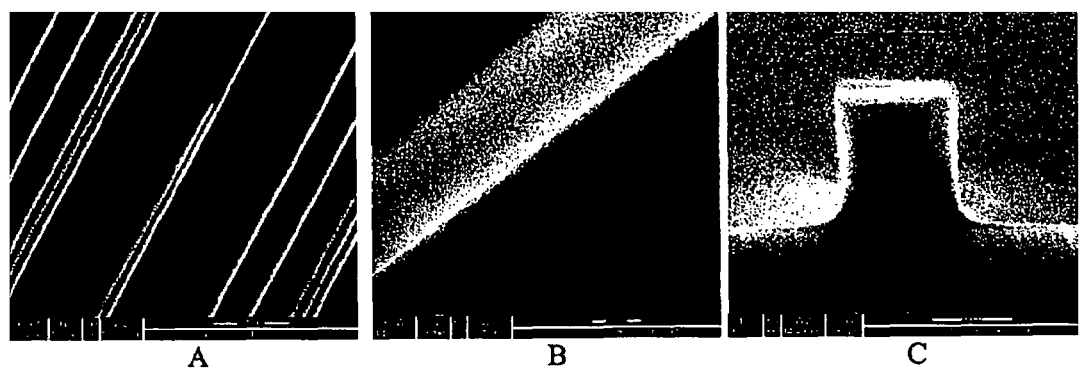
FIG. 19 shows SEM images of a 2×2 interference coupler in FPAEK: A) overview; B) sidewall; C) endface profile.

These devices are designed as 2×2 bimodal interference couplers. They can be described as two waveguides that join into a single, wider section of a determined length after which they separate again. In the joined section, two modes are excited and beat together periodically throughout its length. The output powers of both ports have thus a sine dependence on this length. The structure of the device is shown in FIG. 18. A SEM image of a 2×2 bimodal interference coupler fabricated using FPAEK polymers is presented in FIG. 19.

These devices are not intended to perform as optimized switching devices; rather they have been designed to have significant sensitivity to fabrication and operational variables, and provide convenient vehicles for testing the polymer fabrication process. For a given length, the output state of the device is sensitive to the width of the midsection and the structure's refractive indices. The structure is also weakly dependent on the wavelength and the thickness of the device core. The output state of the finished device, having all other parameters determined, provides an independent confirmation of the value of the refractive index of the core.

Figure 20:
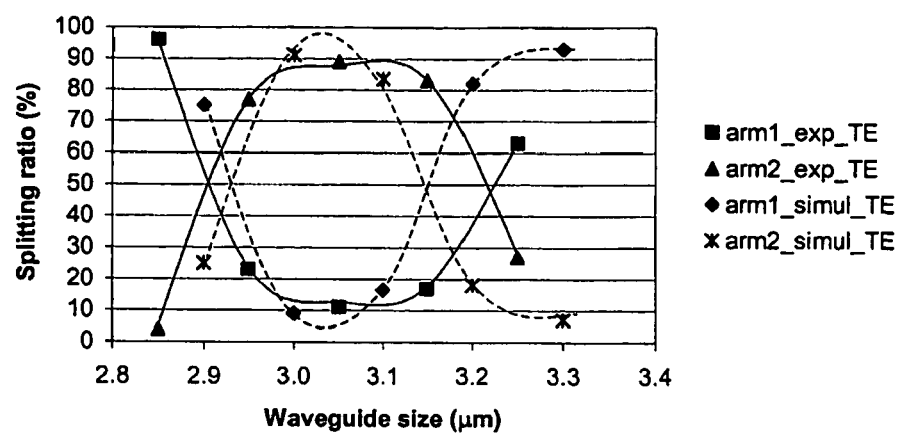
FIG. 20 shows calculated (x and ♦) and experimental (■ and ▲) output powers for 2×2 FPAEK coupler (TE mode) as a function of fabricated ridge waveguide size.

FIG. 20 shows the experimental and calculated responses of a 2×2 bimodal interference coupler in FPAEK polymer. The close agreement between experiment and simulation suggests that these sensitive couplers are operating as intended, and that the waveguide fabrication process offers potential for further design and fabrication of more complex optimized switching or coupling devices.

Example (ii)

Arrayed Waveguide Grating (AWG) Demultiplexer Fabricated with Bromo-Fluorinated Poly (Arylene Ether Ketone)

Figure 21:
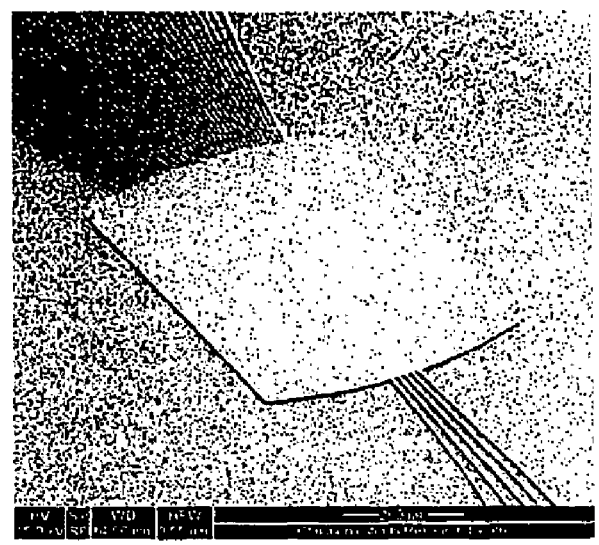
FIG. 21 shows an arrayed waveguide grating in brominated-FPAEK patterned using direct uv exposure and wet etching.

Wavelength division multiplexers based on an AWG structure have been fabricated with bromine-containing FPAEK polymers. A fluorinated polymer solution having a refractive index of 1.509 was prepared by mixing two polymers with similar molecular structure, and was coated on a 15 µm oxidized silicon wafer as a lower cladding layer. After full crosslinking of this layer in a vacuum oven, a bromo-FPAEK polymer with refractive index 1.530 was then coated on top as the waveguide core layer and thermally cured. A thin film of silicon dioxide was deposited on the polymer surface by rf sputtering or e-beam evaporation, then patterned by photolithography to serve as a mask for reactive ion etching. The waveguide ridges were then formed using an $O_2$/$CHF_3$ reactive ion etch (RIE) process. Three etching steps with different ratios of CHF3 and O2 were used to pattern the $SiO_2$, etch the polymer layer and finally remove the $SiO_2$ layer. This mask process is particularly effective for patterning these polymer materials since it allows the mask to be patterned using a dry etch, thus avoiding the swell and shrinkage in the polymer layers that typically result from wet processing such as the lift-off method used to pattern a metal mask. Sequential patterning of the mask and waveguides by RIE without removing the sample from the evacuated chamber also reduces the number of steps required compared to a standard metal mask process. A top cladding layer of a polymer with a refractive index matching that of the lower cladding was then deposited by spin-coating and thermally crosslinked to complete the AWG structure. A typical AWG is shown in FIG. 21.

Fabrication of these two example devices illustrates the potential of these polymer materials for the fabrication of a range of photonic devices. The process can be well-controlled to produce waveguides in tightly specified geometries that can enable the interference and coupling of optical fields, thus facilitating a range of optical functionalities in devices such as wavelength filters, power splitters, optical switches and variable optical attenuators.

(b) Direct Patterning by uv-Crosslinking/Wet Etch

Direct photo-patterning of waveguide structures was achieved using a solution of 25 wt % cross-linkable fluorinated polymers in cyclohexanone. This solution contained a photoinitiater, 2-(4-methoxystyryl)-4,6-bis(trichloromethyl)-1,3,5-triazine (3 wt %, relative to the polymer) and a photosensitizer, 2-chlorothioxanthen-9-one (~1 wt %, relative to the polymer). The solution was filtered through a Teflon syringe filter (pore size 0.2 µm). A thin film was spin coated on a silica/silicon wafer and then soft-baked at 140° C. for 3 minutes. Exposure to UV light (365 nm) through a photomask for 10 minutes, followed by a post-baking at 140° C. for 10 min and development with tetrahydrofuran and acetone for 15 seconds and 2 seconds respectively, resulted in smooth, well-defined ridge structures. Optical propagation losses in these ridge waveguides were typically 0.8 dB/cm. An example is shown in FIG. 22.

New Substrates and Waveguide Cutting and End-Face Preparation[8]

Silicon wafers are often used as substrates for polymer photonic devices. However, the large mismatch of coefficients of thermal expansion between polymeric materials and silicon leads to birefringence in the polymer layers, and results in temperature sensitive devices. Athermal and polarization insensitive polymer devices can be fabricated by employing a plastic substrate with a coefficient of thermal expansion (CTE) matching that of the waveguide layers[29,30]. Polymer substrates offer low cost, and good potential for patterning on-chip packaging and alignment features such as fiber attach grooves. A major drawback of the use of plastic substrates is that conventional cutting, polishing and cleaving techniques often cannot be used to dice and prepare facets. We have fabricated all-polymer photonic devices, and used excimer laser micromachining for end-face preparation and dicing of the devices. With careful control of cutting conditions, smooth vertical cuts through several mm of substrate material have been achieved, in conjunction with smooth optical surfaces on the waveguide endfaces. This technique is promising as a routine processing step in the fabrication of all-polymer optical components.

Ridge waveguides were fabricated with FPAEK polymer on a commercially available plastic (CR39-ADC™) substrate. A 6 μm thick film of FSt-FPAEK was first deposited on the substrate by spin coating. A standard negative photo-resist lift-off method was used to pattern a nickel mask on the polymer layer, and ridges were then formed using an $O_2/CHF_3$ reactive ion etch (RIE) process. A top cladding, with a typical thickness of 10 μm, was deposited over the waveguide ridges by spin coating.

Figure 23:
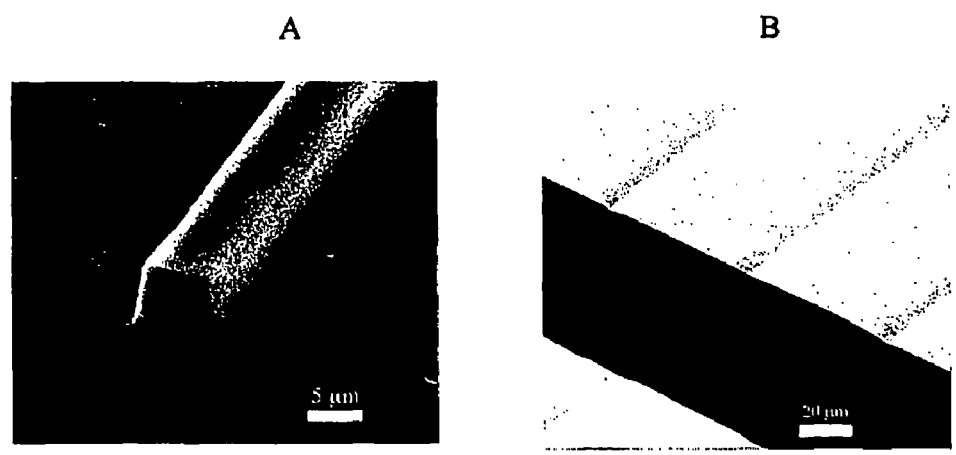
FIG. 23 shows unclad (A) and clad (B) FPAEK ridge waveguides cut using excimer laser micromachining.

A pulsed ArF excimer laser ($\lambda$=193 nm) was used for micromachining the all-polymer waveguide devices. The beam was focussed using a single planar-convex spherical lens with a focal length of 140 mm. The polymer waveguide sample was placed on a motorized translation stage, substrate side toward and normal to the beam, close to the focus. The beam was apertured in order to reduce the number of higher-order transverse modes exiting the laser cavity, which created collateral damage during initial tests. The beam size at the surface of the waveguide sample was typically 0.38 mm×1.9 mm. In order to minimize problems due to beam non-uniformity and to ensure repeatable cuts, the sample was scanned back and forth horizontally relative to the beam using a sweep rate of 0.05 mm/s. The process was divided into two stages: an aggressive and rapid high-fluence ablation through approximately 90% of the substrate followed by a low repetition rate, low fluence ablation to create a high quality surface on the waveguide endfaces. This sequence of cutting optimized the cut quality through both the substrate and waveguide materials, which have widely differing absorption coefficients at 193 nm (26 cm$^{-1}$ and >1×10$^4$ cm$^{-1}$ respectively). Also, by cutting through the substrate first, redeposition of ablation products on the waveguide layer is minimized. FIG. 23 shows a SEM image of all-polymer waveguides in FPAEK cut using excimer laser micromachining. The coupling losses achieved between single mode fiber and the excimer laser micromachined endfaces of these polymer waveguides are 0.7 to 1.2 dB higher than the theoretical values. This difference can be lowered to between 0.4 and 0.9 dB through the use of index matching fluid, and similar results could be expected using uv curable epoxy for a fiber-attach process. This convenient method of preparing high quality waveguide facets will allow more complex all-polymer waveguide devices to be efficiently characterized and fully packaged with optimized insertion losses.

REFERENCES 1. (a) Blythe, A. R.; Vinson, J. *Polym. Adv. Technol.* 2000, 11, 601. (b) Ma, H.; Jen, A. K.-Y.; Dalton, L. R., *Adv. Mater.* 2002, 14, 1339. (c) Zhou, M. *Opt. Eng.,* 2002, 41, 1631.
2. (a) Pitois, C.; Vukmirovic, C.; Hult, A. *Macromolecules* 1999, 32, 2903. (b) Liang, J.; Toussaere, E.; Hierle, R.; Levenson, R.; Zyss, J.; Ochs, A. V.; Rousseau, A.; Boutevin, B. *Opt. Mater.* 1998, 9, 230. (c) Kang, S. H.; Luo, J.; Ma, H.; Barto, R. R.; Frank, C. W.; Dalton, L. R.; Jen, A. K.-Y. *Macromolecules* 2003, 36, 4355. (d) Jöhnck, M.; Müller, L.; Neyer, A.; Hofstraat, J. W. *Eur. Polym. J.* 2000, 36, 1251.
3. (a) Ando, S.; Matsuura, T.; Sasaki, S. *Macromolecules* 1992, 25, 5858. (b) Han, K.; Jang, W.-H.; Rhee, T. H. *J. Appl. Polym. Sci* 1999, 74, 107. (c) Han, K.; Jang, W.-H.; Rhee, T. H. *J. Appl. Polym. Sci.* 2000, 77, 2172. (d) Ando, S.; Sawada, T.; Sasaki, S. *Polym. Adv. Technol.* 1999, 10, 169. (e) Badara, C.; Wang, Z. Y. *Macromolecules.* 2004, 37, 147. (f) Onah, E. *J. Chem. Mater.* 2003, 15, 4104.
4. (a) Wong, S.; Ma, H.; Jen, A. K.-Y. *Macromolecules.* 2003, 36, 8001. (b) Smith, D. W. Jr.; Chen, S.; Kumar, S. M.; Ballato, J.; Topping, C.; Shah, H. V.; Foulger, S. H. *J. Adv. Mater.* 2002, 14, 1585. (c). Babb, D. A.; Ezzell, B.; Clement, K.; richey, W. *J. Polym. Sci., Part A: Polym. Chem.* 1993, 31, 3465. (d) Smith, D. W. Jr.; Babb, D. A. *Macromolecules* 1996, 29, 852. (e) Smith, D. W. Jr.; Babb, D. A.; Shah, H. V.; Hoeglund, R.; Traiphol, D.; boone, H. W.; Langhoff, C.; Radler, M. *J. Fluorine Chem.* 2000, 104, 109.
5. (a) Pitois, C.; Wiesmann, D.; Lindgren, M.; Hult, A. *Adv. Mater.* 2001, 13, 1483. (b) Lee, H.-J.; Lee, E.-M.; Lee, M.-C.; OH, J.-H.; Ahn, S. G.; Han, H. G.; Kim, J. *J. Polym. Sci., Part A: Polym. Chem.* 1998, 36, 2881. (c) Kim, J.-P.; Lee, W.-Y.; Kang, J.-W.; Kwon, S.-K.; Kim, J.-J.; Lee, J.-S. *Macromolecules* 2001, 34, 7817. (d) Han, K.-S.; Jang, W.-H.; Kim, E.-J.; Rhee, T.-H. 2000, U.S. Pat. No. 6,136, 929.
6. Lee, H.-J.; Lee, M.-H.; OH, M.-C.; Ahn, J.-H.; Han, S. G. *J. Polym. Sci. A: Polym. Chem.* 1999, 37, 2355. (b) Kim, J.-P.; Kang, J.-W.; Kim, J.-J.; Lee, J.-S. *J. Polym. Sci. A: Polym. Chem.* 2003, 41, 1497. (c) Kim, J.-P.; Kang, J.-W.; Kim, J.-J.; Lee, J.-S. *Polymer* 2003, 44, 4189.
7. (a) Jiang, J.; Callender, C. L.; J. P.; Noad, Walker, S.; Mihailov, S.; J.; Ding, J.; Day, M. *IEEE Photonic Technology Letter,* 2004, 16, 509 (b) Jiang, J.; Callender, C. L.; Blanchetiere, C.; Noad, J. P.; Ding, J.; Qi, Y.; Day, M. *Opt. Mater.* Accepted.
8. (a) Ding, J.; Liu, F.; Zhou, M.; Li, M.; Day, M.; Vuillaume, P. U.S. Provisional Patent 2003, Ser. No. 60/433,574
9. (a) Ding, J.; Day, M.; Robertson, G. P.; Roovers, J. *Macromol. Chem. & Phys.* Accepted. (b) Ding, J.; Liu, F.; Li, M.; Day, M.; Zhou, M. *J. Polym. Sci.; Part A: Polym. Chem.* 2002, 40, 4205.
10. Liu, F.; Ding, J.; Li, M.; Day, M.; Robertson, G.; Zhou, M. *Macromol. Rapid Commun.* 2002, 23, 844.
11. Teng, C.-C. *Applied Optics* 1993, 32, 1051.
12. (a) Guiver, M. D.; Kutowy, O.; ApSimon, J. W. *Polymer* 1989, 30, 1137. (b) Botvay, A; Máthé, Á; Pöppl, L; Rohonczy, J.; Kubatovics, F. *J. Appl. Polym. Sci.* 1999, 74, 1.
13. (a) Dai, Y.; Guiver, M. D.; Robertson, G. P.; Kang, Y. S.; Lee, K. *J. Macromolecules* 2003, 36, 6807. (b) Dai, Y.; Guiver, M. D.; Robertson, G. P.; Kang, Y. S.; Lee, K. J.; Jho, J. Y. *Macromolecules* 2004, 37, 1403.
14. (a) R. J. Cotter, "*Engineering Plastics: A Handbook of Polyarylethers*", Gorden and Breach Publishers, Amsterdam 1995, p1. (b) J. L. Hedrick, J. W. Labadie, "*Step-Growth Polymers for High-performance Materials: New Synthetic Methods*", ACS Symposium Series, V64, ACS, Washington D.C., 1996, p210.

15. (a) Labadie, J. W.; Hedrick J. L. Macromolecules, 1990 23, 5371-5373. (b) Atwood, T. E.; Newton, A. B.; Rose, J. B. Br. Polym. J. 1972, 4, 391. (c) Chung, I. S. Kim, S. Y.; J. Am. Chem. Soc. 2001, 123, 11071-11072. (d) Hedrick, J. L. Macromolecules 1991, 24, 812.
16. (a) Smith, M. B.; March, J. *March's Advanced Organic Chemistry*, 5th ed., John Wiley & Son, Inc,: New York, 2001; p850. (b) Rose, J. B. In *High-Performance Polymers: The Origin and Development*; Seymour, R. B.; Kirchenbaum, G. S. Eds.; Elsevier: New York, 1986; p169. (c) Kricheldorf, H. R. In *Handbook of Polymer Synthesis*; Kricheldorf, H. R. Ed.; Marcel Dekker: New York, 1992; p 545.
17. (a) Hedrick, J. L.; Labadie, J. W. Macromolecules 1990, 23, 1561.(b) Hilborn, J. G.; Labadie, J. W.; Hedrick, J. L. Macromolecules 1990, 23, 2854 (c) Singh, R.; Hay, A. S. Macromolecules 1992, 25, 1025. (d) Hedrick, J. L. Twieg, R. Macromolecules 1992, 25, 2021. (e) Carter, K. R.; Miller, R. D.; Hedrick, J. L. Macromolecules 1993, 26, 2209. (f) Hedrick, J. L.; Twieg, R. J.; Matray, T.; Carter, K. R. Macromolecules 1993, 26, 4833. (g) Carter, K. R.; Hedrick, J. L. Macromolecules 1994, 27, 3426. (h) Twieg, R.; Matray, T.; Hedrick, J. L. Macromolecules 1996, 29, 7335. (j) Herbert, C. G.; Bass, R. G.; Watson, K. A.; Connell, J. W. Macromolecules 1996, 29, 7709. (k) Fink, R.; Frenz, C.; Thelakkat, M.; Schmidt, H. W. Macromolecules 1997, 30, 8177.
18. (a) Mercer, F.; Goodman, T.; Wojtowicz, J.; Duff, D. *J. Polymer Sci.: Part A: Polymer Chem.* 1992, 30, 1767-1770. (b) Goodwin, A. A.; Mercer, F. W.; McKenzie, M. T. Macromolecules 1997, 30, 2767-2774. (c) Mercer, F. W.; Fone, M. M.; Reddy; V. N.; Goodwin, A. A. Polymer 1997, 38, 1989-1995.
19. (a) Lee, H.-J.; Lee, E.-M.; Lee, M.-H.; Oh, M.-C.; Ahn, J.-H.; Han, S. G.; Kim, H. G. *J. Polym. Sci., Part A, Polym. Chem.* 1998, 36, 2881-2887. (b) Lee, H.-J.; Lee, M.-H.; Oh, M.-C.; Ahn, J.-H. Han, S. G. *J. Polym. Sci., Part A, Polym. Chem.* 1999, 37, 2355-2361. (c) Kim, J.-P.; Kang, J.-W.; Kim, J.-J.; Lee, J.-S. *Polymer,* 2003, 44, 4189-4195. (d) Kim, J.-P.; Kang, J.-W.; Kim, J.-J.; Lee, J.-S. *J. Polym. Sci., Part A, Polym. Chem.* 2003, 41, 1497-1503. (e) Kim, J.-P. Lee, W.-Y. Kang, J._W., Kwon, S.-K.; Kim, J.-J. Lee, J.-S. *Macromolecules* 2001, 34, 7817-7821.
20. (a) Kimura, K.; Tabuchi, Y.; Yamashita, Y.; Cassidy, P. E.; Fitch III, J. W.; Okumura, Y. *Polym. Adv. Technol.,* 2000, 11, 757-765. (b) Liu, F.; Ding, J.; Li, M.; Day, M.; Robertson, G.; Zhou, M. *Macromol. Rapid. Commun.* 2002, 23, 844-848. (c) Ding, J.; Liu, F; Li, M; Day, M; Zhou, M; *J. Polym Sci, Part A: Polym. Chem.* 2002, 40, 4205-4216.
21. (a) Hoffmann, U., F. Helmer-Metzmann, F., Klapper, M., Muellen, K., *Macromolecules,* 1994, 27, 3575-357. (b) Kricheldorf, H. R., Böhme, S., Schwarz, G., Krüger, R.-P., Schulz, G., *Macromolecules* 2001, 34, 8886-8893. (c) Ding, J.; Day, M.; Robertson, G., P.; Roovers, J. *Macromol. Chem. Phys.* 2004, 205 1070-1079.
22. (a) Attwood, T. E.; Barr, D. A.; King, T; Newton, A. B.; and Rose, J. B. *Polymer,* 1977, 18,359-364. (b) Imai, Y., Yamanaka, K., Ishikawa, H., and Kakimoto, M., *Macromol. Chem. Phys.* 1999, 200, 95-99. (c) Imai,Y., Ishikawa, H., Park, K.-H., Kakimoto, M.-A., *J. Polym. Sci. Part A: Polym. Chem.* 1997, 35, 2055-206.
23. S. Berger, S. Braun, H.-O. Kalinowski, *"NMR Spectroscopy of the Non-Metallic Elements"*, John Wiley & Sons, New York, 1996; p452.
24. Elias, N-G. "Macromolecules.2". Plenum Press, New York, 1977, p 599.
25. (a) Ahn, J.-H.; Lee, H.-J.; Hwang, W.-Y.; Oh, M-C.; Lee, M.-H.; Han, S. G.; Kim, H.-G.; Yim, C. H. *IEICE Trans. Electron.* 1999, E82-C, 354-356. (b) Min, Y. H.; Lee, M.-H.; Do, J. Y. *IEEE Photonics Technol. Lett.* 2000, 12, 1483-1485. (c) Kang, J.-W.; Kim, J.-P.; Lee, W.-Y.; Kim, J.-S.; Lee, J.-S.; Kim, J.-J. *J. Lightwave Technol.* 2001, 19, 872-875. (c) Oh, M.-C.; Lee, M.-H.; Ahn, J.-H.; Han, S. G. *IEEE Photonics Technol. Lett.* 1998, 10, 813-815.
26. (a) Jiang, J.; Callender, C. L.; J. P.; Noad, Walker, R.; Mihailov, S.; Ding, J.; Day, M. *IEEE Photonics Technology Letters,* 2004; 16, 509-511. (b) Qi, Y.; Ding, J.; Day, M.; Jiang, J.; Callender, C. L.; Chem. Mater, Accepted. (c) Pitois, C.; Wiesmann, D.; Lindgren, M.; Hult, A, Adv. Mater. 2001, 13, 1483-1487.
27. Lazár, M.; Kleinová, A.; Fiedlerová, A; Janigová, I.; Borsig, E. *J. Polym. Sci., Part A Polym. Chem,* 2003, 42, 675-688,
28. Teng, C.-C. *Applied Optics* 1993, 32, 1051.

TABLE 1

Characterization of Fluorinated Polymers Containing Tetrafluorostyrol Unit (FPAEKs and FPAESs).

| Polymers | Content of BHPFS (mol. %)[a] | $M_n$[b] | $M_w/M_n$ | $T_g$ (° C.)[c] | $T_d$ (° C.)[d] |
|---|---|---|---|---|---|
| FPAEK 1 | 12.5 | 35,400 | 4.6 | 154.0 | 485.0 |
| FPAEK 2 | 20.0 | 29,100 | 3.8 | 153.8 | 485.5 |
| FPAEK 3 | 25.0 | 25,900 | 3.6 | 153.6 | 481.5 |
| FPAES 1 | 12.5 | 25,200 | 2.6 | 183.8 | 474.2 |
| FPAES 2 | 20.0 | 29,000 | 4.3 | 186.5 | 466.9 |
| FPAES 3 | 25.0 | 26,300 | 3.0 | 181.4 | 466.3 |

[a]Molar ratio of BHPFS relative to the total bisphenols.
[b]Number average molecular weight determined by GPC.
[c]Glass transition temperature measured by DSC with a heating rate of 10° C./min in nitrogen.
[d]Onset temperature for 5% weight loss measured by TGA with a heating rate of 10° C./min in nitrogen.

TABLE 2

The Optical Properties of FPAEKs and FPAESs.

| Polymers | $n_{TE}$[a] | $n_{TM}$[a] | $n_{TE} - n_{TM}$ ($\times 10^{-3}$) | Optical Loss[b] (dB/cm) |
|---|---|---|---|---|
| FPAEK 1 | 1.5097 | 1.5072 | 2.4 | 0.35 |
| FPAEK 2 | 1.5137 | 1.5116 | 2.1 | / |
| FPAEK 3 | 1.5168 | 1.5143 | 2.5 | 0.40 |
| FPAES 1 | 1.5131 | 1.5108 | 2.3 | 0.50 |
| FPAES 2 | 1.5175 | 1.5151 | 2.4 | / |
| FPAES 3 | 1.5204 | 1.5179 | 2.5 | 0.55 |

[a]Refractive index at 1537 nm.
[b]Slab loss at 1550 nm.

TABLE 3

Characterization of Bromo-fluorinated Polymers BFPAEKs and the BFPAESs.

| Polymers | 4Br-BPA content[a] | BHPFS content[b] | $M_n$[c] | $M_w/M_n$ | $T_g$ (° C.)[d] | $T_d$ (° C.)[e] |
|---|---|---|---|---|---|---|
| BFPAEK 1 | 26.6% | 20.0% | 24000 | 2.5 | 164.0 | 473.8 |
| BFPAEK 2 | 40.0% | 20.0% | 19700 | 2.2 | 166.6 | 469.5 |
| BFPAEK 3 | 53.3% | 20.0% | 17600 | 2.6 | 170.2 | 462.4 |
| BFPAEK 4 | 80.0% | 20.0% | 21000 | 3.0 | 177.6 | 452.2 |
| BFPAES 1 | 26.6% | 20.0% | 22900 | 2.9 | 194.5 | 465.6 |
| BFPAES 2 | 40.0% | 20.0% | 17200 | 2.3 | 195.8 | 458.4 |
| BFPAES 3 | 53.3% | 20.0% | 22500 | 2.1 | 197.9 | 453.7 |
| BFPAES 4 | 80.0% | 20.0% | 18500 | 2.7 | 205.6 | 449.6 |

[a]Feed molar ratio of 4Br-BPA relative to the total bisphenols.
[b]Feed molar ratio of BHPFS relative to the total bisphenols.
[c]Number average molecular weight determined by GPC.

TABLE 3-continued

Characterization of Bromo-fluorinated Polymers BFPAEKs and the BFPAESs.

| Polymers | 4Br-BPA content[a] | BHPFS content[b] | $M_n$[c] | $M_w/M_n$ | $T_g$ (° C.)[d] | $T_d$ (° C.)[e] |
|---|---|---|---|---|---|---|

[d]Glass transition temperature measured by DSC with a heating rate of 10° C./min in nitrogen.
[e]Temperature for 5% weight loss measured by TGA with a heating rate of 10° C./min in nitrogen.

TABLE 4

The Optical Properties of BFPAEKs and BFPAESs.

| Polymers | $n_{TE}$[a] | $n_{TM}$[b] | $n_{TE} - n_{TM}$[c] (×10$^{-3}$) |
|---|---|---|---|
| BFPAEK 1 | 1.5318 | 1.5295 | 2.3 |
| BFPAEK 2 | 1.5408 | 1.5381 | 2.7 |
| BFPAEK 3 | 1.5486 | 1.5467 | 1.9 |
| BFPAEK 4 | 1.5665 | 1.5644 | 2.1 |
| BFPAES 1 | 1.5348 | 1.5419 | 2.9 |
| BFPAES 2 | 1.5425 | 1.5398 | 2.7 |
| BFPAES 3 | 1.5516 | 1.5493 | 2.3 |
| BFPAES 4 | 1.5696 | 1.5670 | 2.6 |

[a]Refractive index of the TE mode at 1537 nm.
[b]Refractive index of the TM mode at 1537 nm.
[c]Birefringence at 1537 nm.

TABLE 5

Characterization of FSt-FPASO with low (A) and high (B) FSt content

| Polymer | m | n | $M_n$(Da) desgn | $M_n$(Da) meas | $M_w/M_n$ | $T_g$ (° C.)[a] | $T_d$ (° C.)[b] |
|---|---|---|---|---|---|---|---|
| A | 9 | 0 | 6,930 | 7,100 | 1.7 | 172.3(190.1) | 456(457) |
| B | 21 | 6 | 18,200 | 15,200 | 2.4 | 182.7(205.0) | 452(454) |

Note:
[a,b]the numbers in the bracket are the values from the polymer film after cross-linking.

Scheme 3. Synthesis of Cross-linkable Bisphenol (BHPFS)

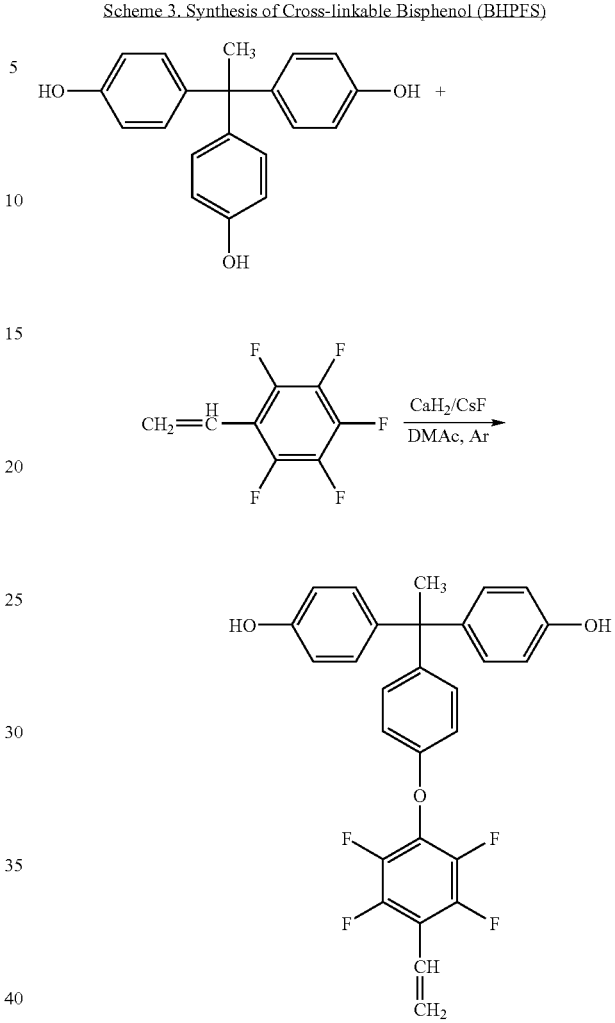

Scheme 4. Reaction scheme for the preparation of cross-linkable flourinated polymers (FPAEKs and FPAESs).

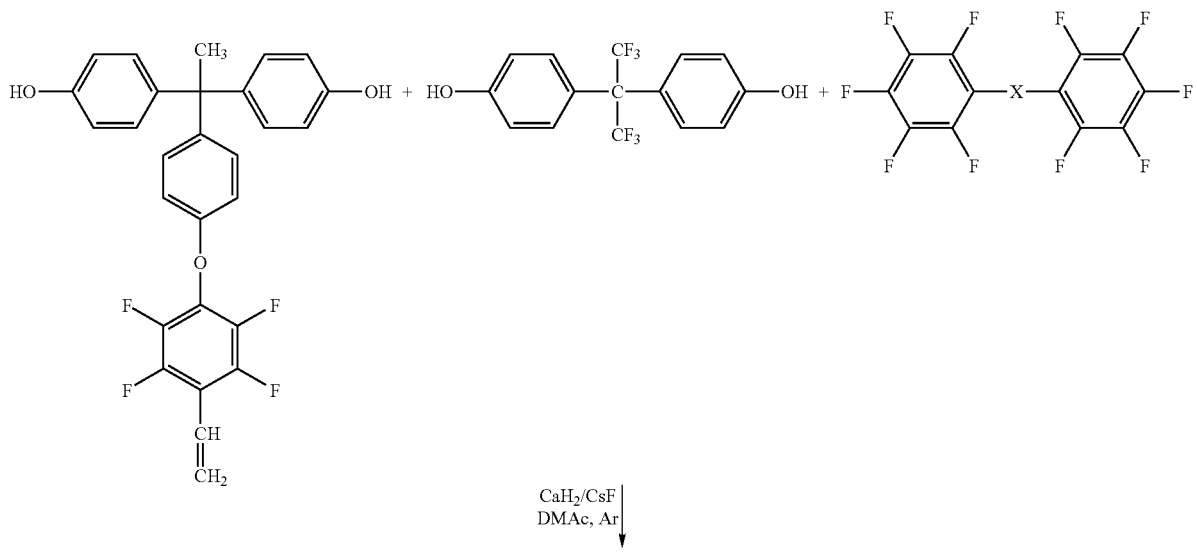

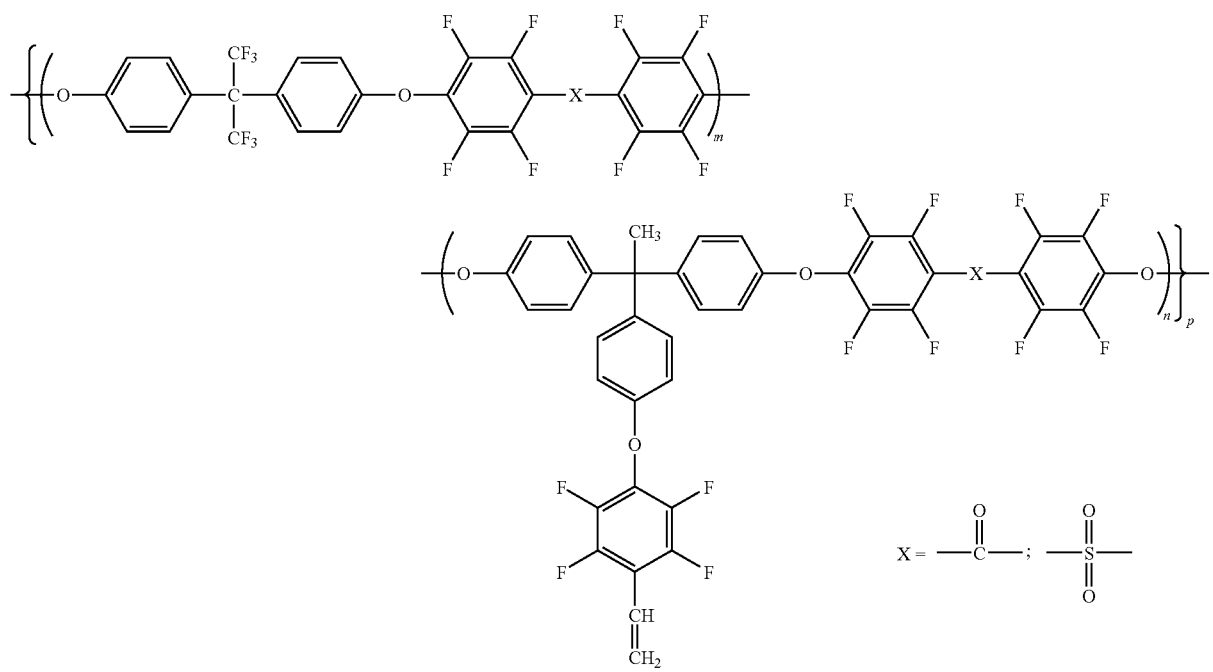
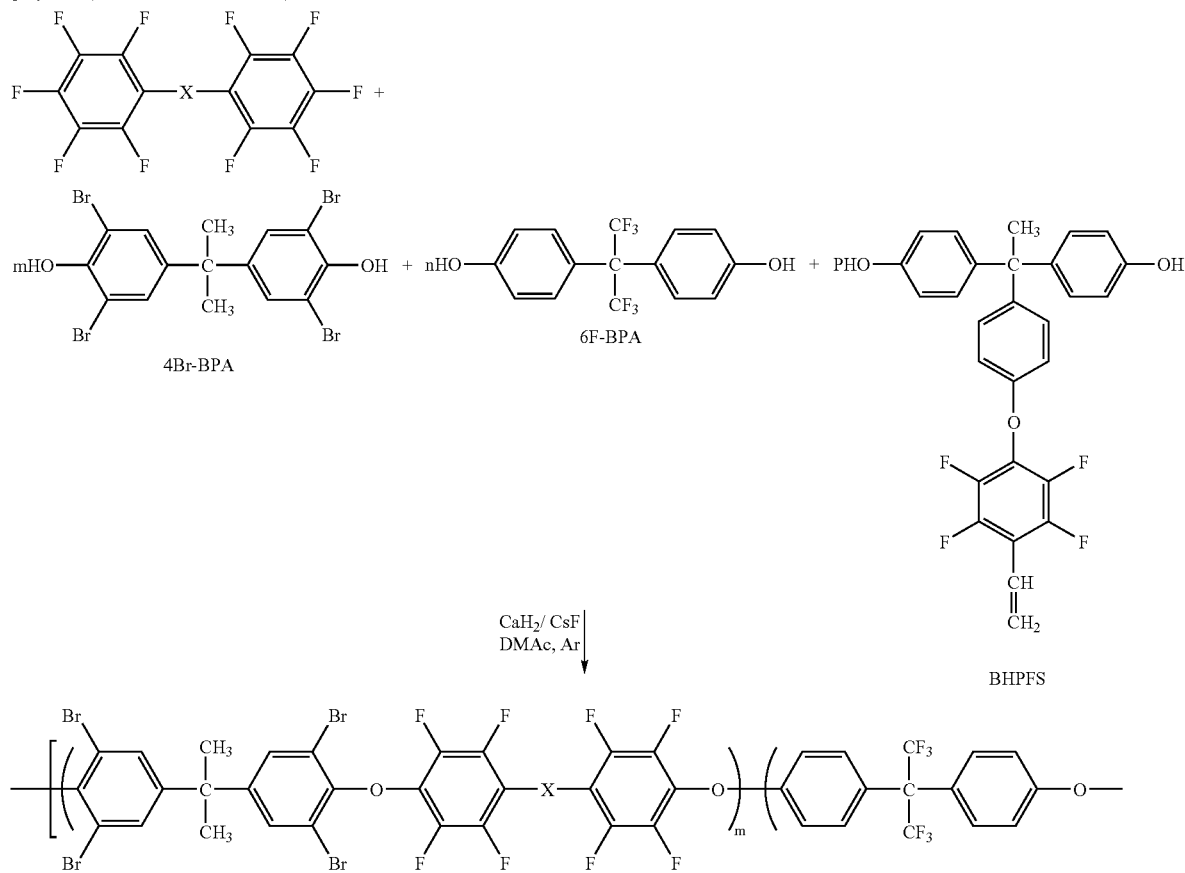
Scheme 5. Reaction scheme for the preparation of cross-linkable bromo-flourinated polymers (BFPAEKs and BFPAESs).

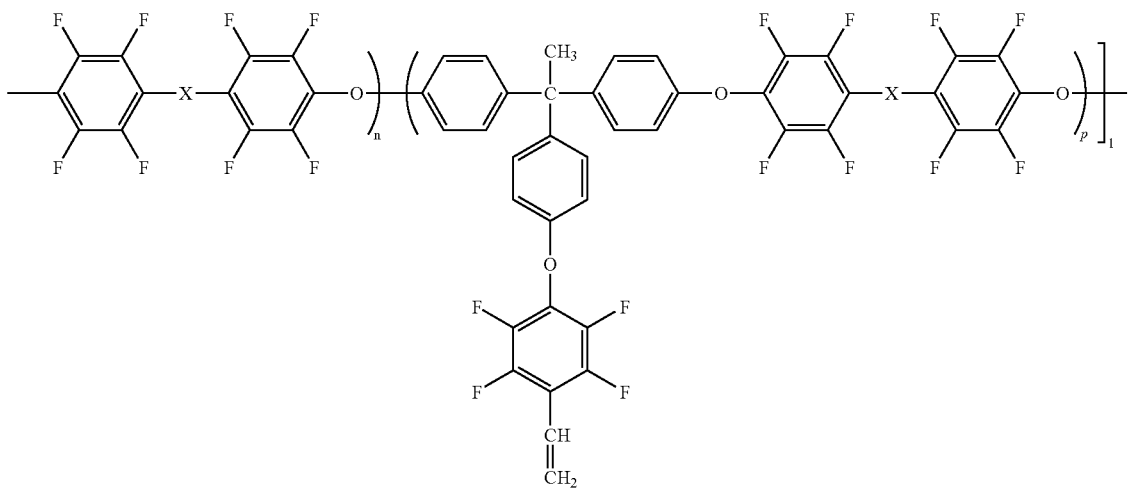
Scheme 6. Reaction scheme for the preparation of fluorinated poly(arylene ether sulfone)s
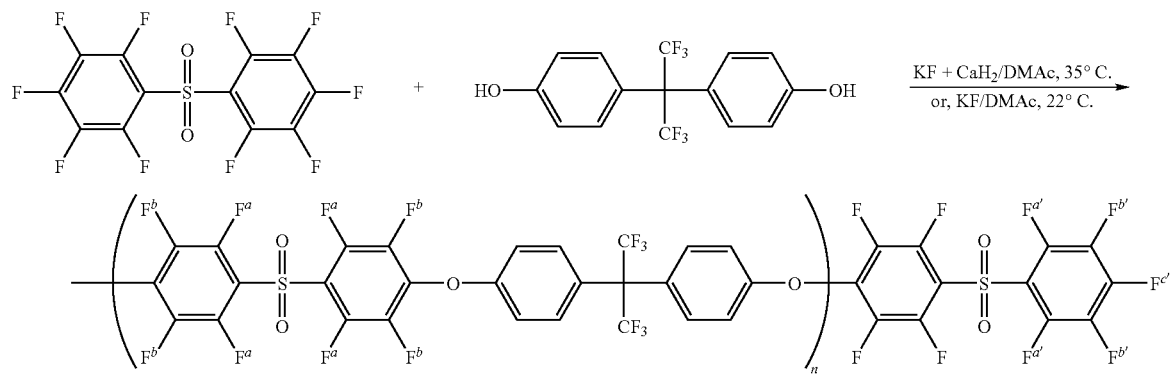
Scheme 7. Reaction scheme for the preparation of cross-linkable polymers
1. Polymer A
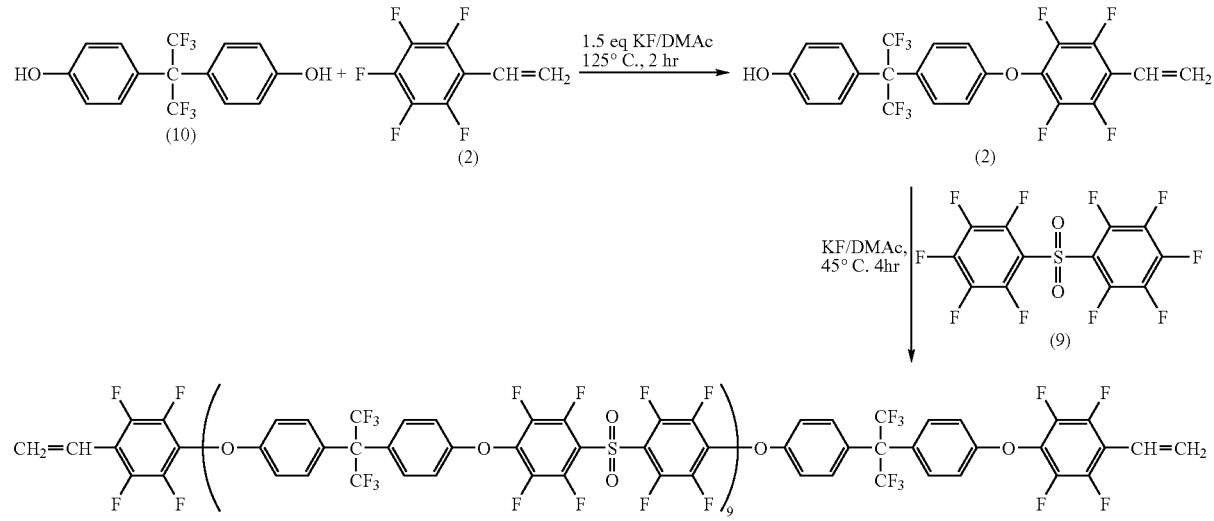

2. Polymer B
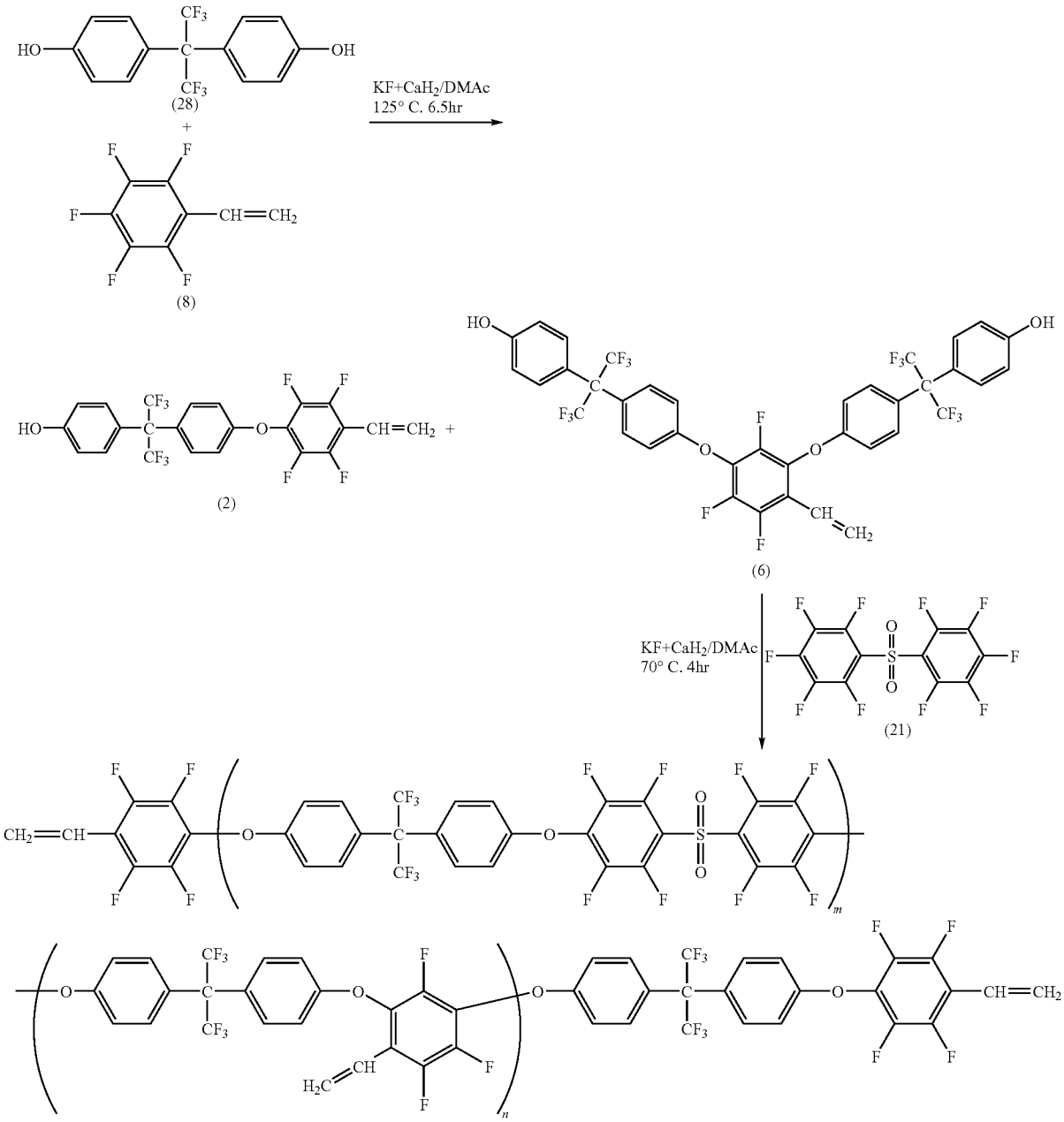
What is claimed is:
1. A compound of formula I:
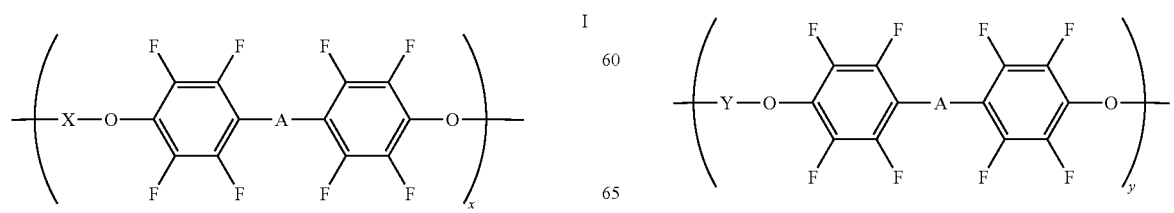

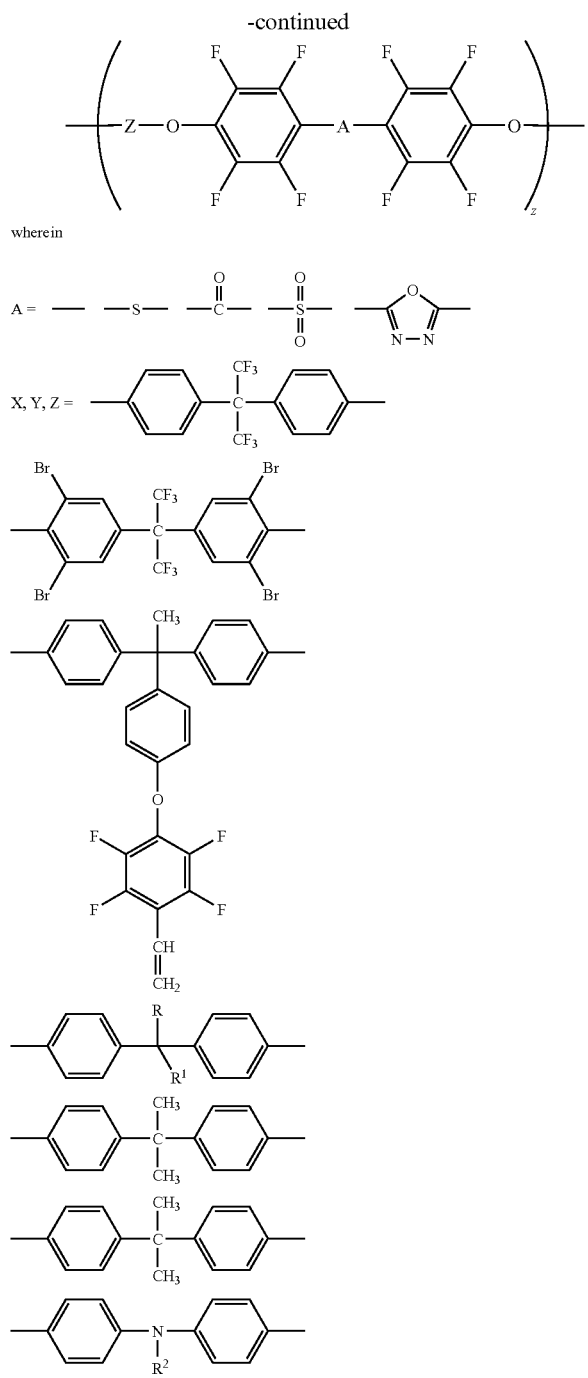

wherein

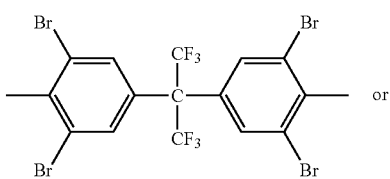

x+y+z=1 and x=0 to 1, y=0 to 1, z=0 to 1 and R is CH₃ or CF₃ and R¹ and R² each represent a functional group with the proviso that the content of brominated bisphenol is at least 20 mol % relative to total bisphenols.

2. The compound of claim 1 wherein A is selected from

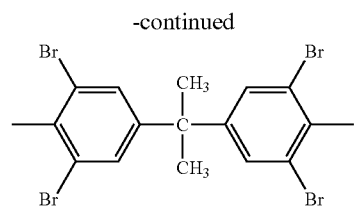

3. The compound of claim 1 wherein X, Y or Z is

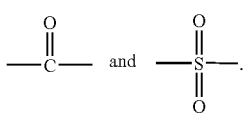

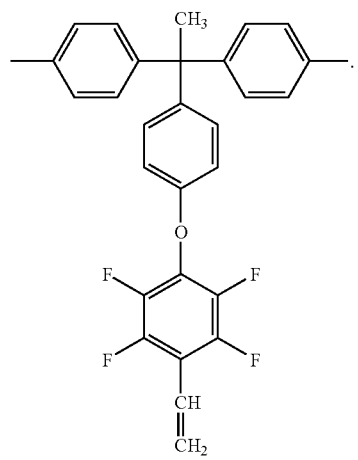

4. The compound of claim 1 wherein X, Y or Z is selected from the group consisting of

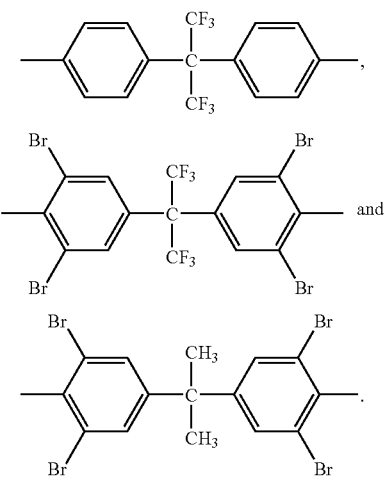

5. The compound of claim 1 wherein X, Y and Z are selected from the group consisting of

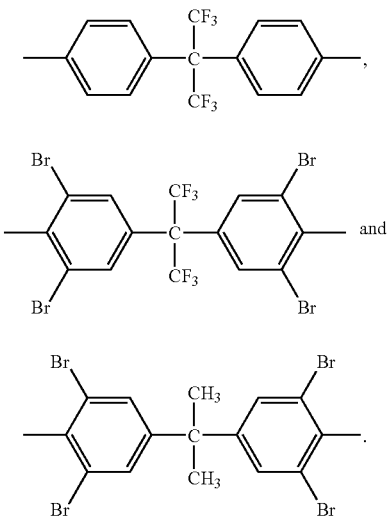

6. The compound of claim 1 wherein at least one of X, Y and Z is other than

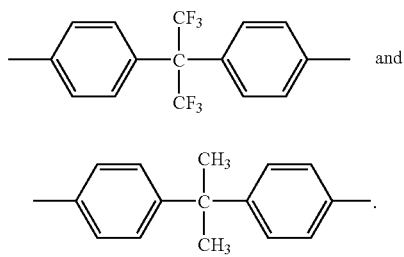

7. The compound of claim 1 wherein $R^1$ and $R^2$ each represent a functional group selected from the group consisting a non-linear optical dye and an ionic polymer chain.

8. The compound of claim 1 wherein the number average molecular weight is between 4,000 and 50,000.

9. The compound of claim 1 wherein said compound is cross-linkable.

10. The compound of claim 9 wherein said compound is cross-linked.

11. A film comprising a cross-linked compound according to claim 10.

12. A waveguide comprising a cross-linked compound according to claim 10.

13. A photonic device comprising a cross-linked compound according to claim 10.

14. The photonic device of claim 13, wherein said photonic device is a waveguide.

15. The waveguide of claim 14, wherein said waveguide comprises a multilayer waveguide structure comprising two or more said cross-linked compounds having specific different refractive indices.

16. The waveguide of claim 14, wherein said waveguide further comprises a substrate made of one of a plastic, polymer and organic material.

17. The waveguide of claim 14, wherein said waveguide is a ridged waveguide.

18. The photonic device of claim 14, wherein said photonic device is a wavelength filter.

19. The photonic device of claim 14, wherein said photonic device is a power splitter.

20. A bimodal interference coupler comprising a cross-linked compound according to claim 10.

21. An arrayed waveguide grating demultiplexer comprising a cross-linked compound according to claim 10.

22. A process for preparing a compound of formula I:

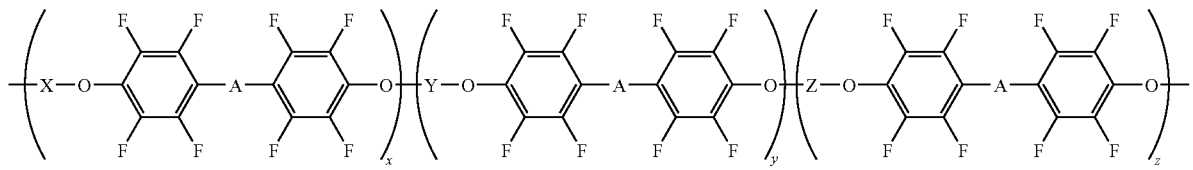

wherein

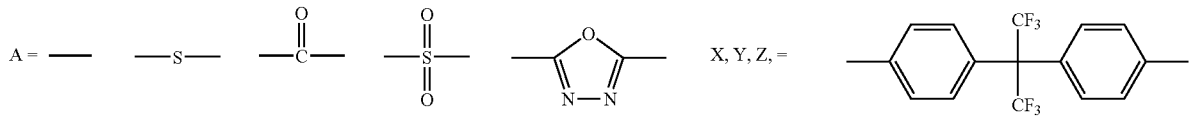

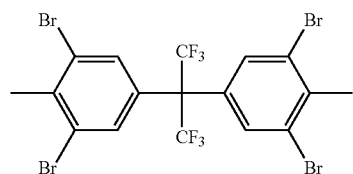
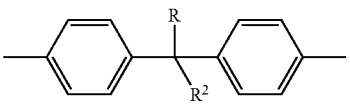
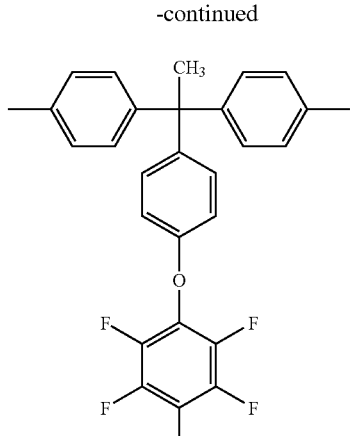
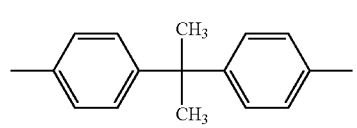
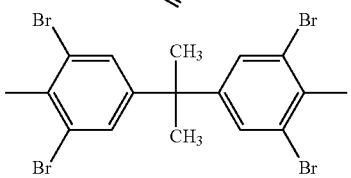
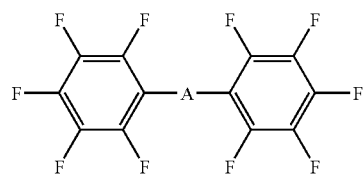

x+y+z=1 and x=0 to 1, y=0 to 1, z=0 to 1 and R is CH₃ or CF₃ and R¹ and R² each represent H or a functional group, with the proviso that the content of brominated bisphenol

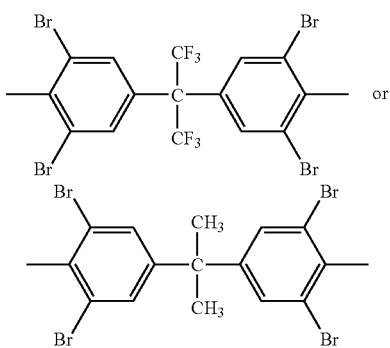

is at least 20 mol % relative to total bisphenols; which process comprises reacting at least one bisphenol compound of the formulae HO—X—OH, HO—Y—OH and HO-Z-OH with a decafluorodiphenyl-compound of the formula wherein X, Y, Z and A are as defined above in the presence of an alkali metal fluoride or alkali metal carbonate and an aprotic solvent at a temperature of about 20 to 120° C.

23. The process according to claim 22 wherein alkali metal fluoride is present as a catalyst.

24. The process according to claim 22 wherein alkali metal carbonate is present as a catalyst.

25. The process according to claim 22 wherein alkali metal fluoride is present in association with CaH₂ as a catalyst.

26. The process according to claim 22 wherein alkali metal carbonate is present in association with CaH₂ as a catalyst.

27. The process according to claim 22 wherein the alkali metal fluoride is potassium fluoride, rubidium fluoride, or cesium fluoride.

28. The process according to claim 22 wherein the alkali metal carbonate is potassium carbonate, rubidium carbonate, or cesium carbonate.

29. The process according to claim 22 wherein the aprotic solvent is selected from the group consisting of N, N-dimethylacetamide, N,N-dimethylformamide, dimethylsulphoxide, N-Methyl-2-pyrrolidone, tetrahydrofuran and propylene carbonate.

30. The process of claim 22 wherein the reaction is complete within 1 to 120 hours.

31. The process of claim 22 wherein there are 2 to 3.5 equivalents of alkali metal fluoride for each equivalent of bisphenol or decafluoro-compound.

32. The process of claim 22 wherein there are 2 to 3.5 equivalents of alkali metal carbonate for each equivalent of bisphenol or decafluoro-compound.

33. The process of claim 26 wherein there are more than 0.04 equivalents of alkali metal fluoride with more than 2.0 equivalents of calcium hydride for each equivalent of bisphenol or decafluoro-compound.

34. The process of claim 26 wherein there are more than 0.04 equivalents of alkali metal carbonate with more than 2.0 equivalents of calcium hydride for each equivalent of bisphenol or decafluoro-compound.

* * * * *

UNITED STATES PATENT AND TRADEMARK OFFICE
CERTIFICATE OF CORRECTION

PATENT NO. : 7,531,620 B2  Page 1 of 1
APPLICATION NO. : 11/132240
DATED : May 12, 2009
INVENTOR(S) : Jianfu Ding It is certified that error appears in the above-identified patent and that said Letters Patent is hereby corrected as shown below:

Column 45, claim 1, line 48, delete " 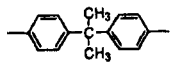 " and insert therefor -- 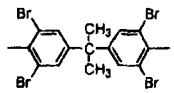 --

Signed and Sealed this

Sixteenth Day of November, 2010

David J. Kappos
*Director of the United States Patent and Trademark Office*